(12) United States Patent
Palli et al.

(10) Patent No.: US 8,342,857 B2
(45) Date of Patent: Jan. 1, 2013

(54) MAGNETIC AND LOCKING CABLE CONNECTORS

(76) Inventors: Craig Palli, Needham, MA (US); Ralph F. Osterhout, Reno, NV (US); John D. Haddick, Berkeley, CA (US)

( * ) Notice: Subject to any disclaimer, the term of this patent is extended or adjusted under 35 U.S.C. 154(b) by 0 days.

(21) Appl. No.: 12/963,802

(22) Filed: Dec. 9, 2010

(65) Prior Publication Data

US 2011/0136350 A1  Jun. 9, 2011

Related U.S. Application Data

(63) Continuation of application No. 12/343,089, filed on Dec. 23, 2008, now Pat. No. 7,963,773.

(60) Provisional application No. 61/016,535, filed on Dec. 24, 2007, provisional application No. 61/029,519, filed on Feb. 18, 2008, provisional application No. 61/033,072, filed on Mar. 3, 2008, provisional application No. 61/057,044, filed on May 29, 2008, provisional application No. 61/108,719, filed on Oct. 27, 2008.

(51) Int. Cl.
*H01R 33/00* (2006.01)

(52) U.S. Cl. ............................................ 439/38; 439/39

(58) Field of Classification Search ............... 439/38–40
See application file for complete search history.

(56) References Cited

U.S. PATENT DOCUMENTS

| 4,686,530 | A | * | 8/1987 | Schneider et al. | ........ 340/870.31 |
|---|---|---|---|---|---|
| 4,969,834 | A | * | 11/1990 | Johnson | ......................... 439/141 |
| 5,784,511 | A | * | 7/1998 | Kikuchi et al. | .................. 385/57 |
| 6,231,361 | B1 | * | 5/2001 | Ko et al. | ......................... 439/172 |
| 6,897,370 | B2 | * | 5/2005 | Kondo et al. | .................. 136/243 |
| 6,904,110 | B2 | * | 6/2005 | Trans et al. | .................... 375/350 |
| 2001/0034147 | A1 | * | 10/2001 | Kerr et al. | ....................... 439/141 |
| 2003/0229900 | A1 | * | 12/2003 | Reisman | .......................... 725/87 |
| 2004/0224539 | A1 | * | 11/2004 | Boyd et al. | ....................... 439/39 |
| 2007/0072442 | A1 | * | 3/2007 | DiFonzo et al. | ................. 439/39 |

* cited by examiner

*Primary Examiner* — Tho D Ta
(74) *Attorney, Agent, or Firm* — The Webb Law Firm

(57) ABSTRACT

In embodiments of the present invention improved capabilities are described for a cable connector. The cable connector may have magnetic properties and/or a locking mechanism. The cable connector may be an HDMI connector and the cable may be an HDMI cable. Further, the connector may be plugged into the corresponding male/female connector port and be held in position by the magnetic properties associated with the connector and the port and/or by a lock lever mechanism. The magnetic array may be moved various distances in various directions. In addition, the connector and/or cable may include a processor, an integrated circuit, an indicator, an LED and/or a user interface.

18 Claims, 58 Drawing Sheets

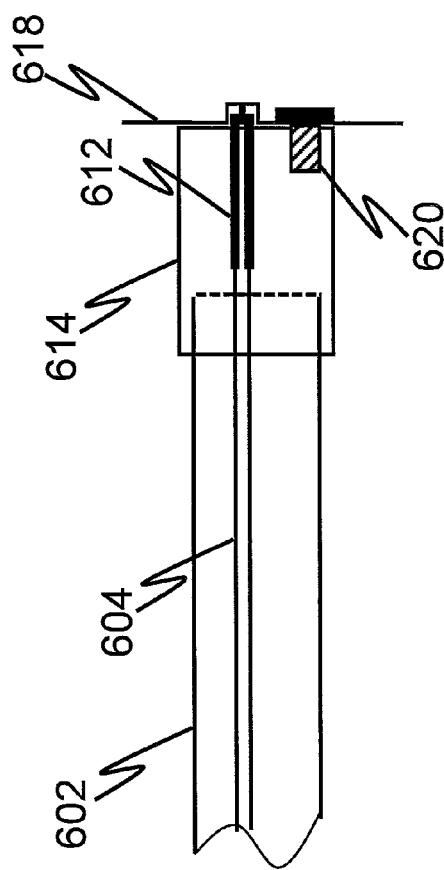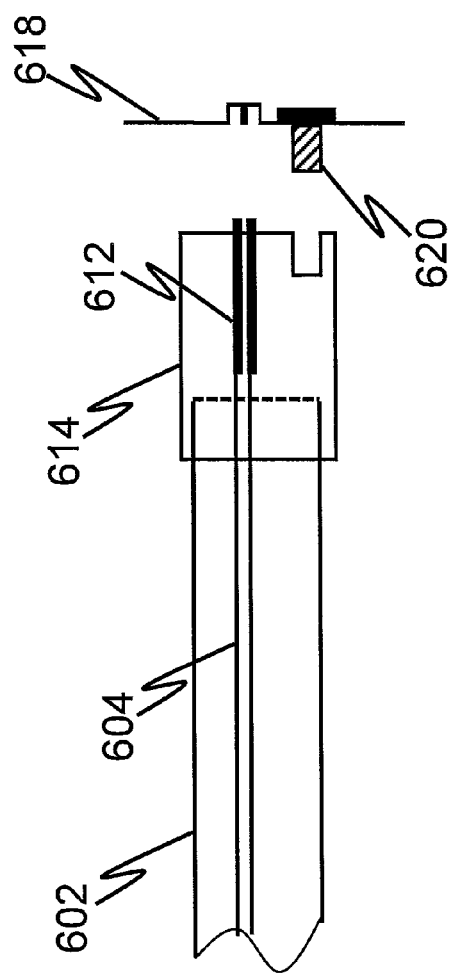
Fig. 7A
Fig. 7B

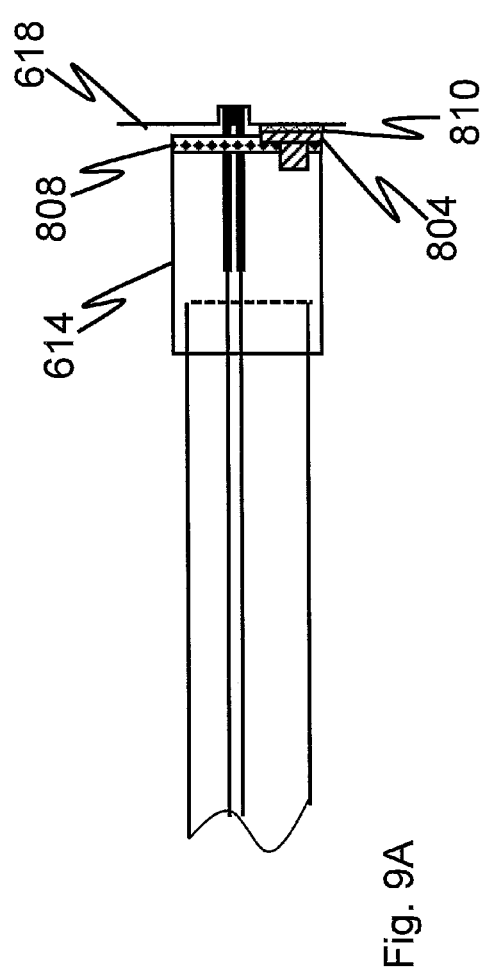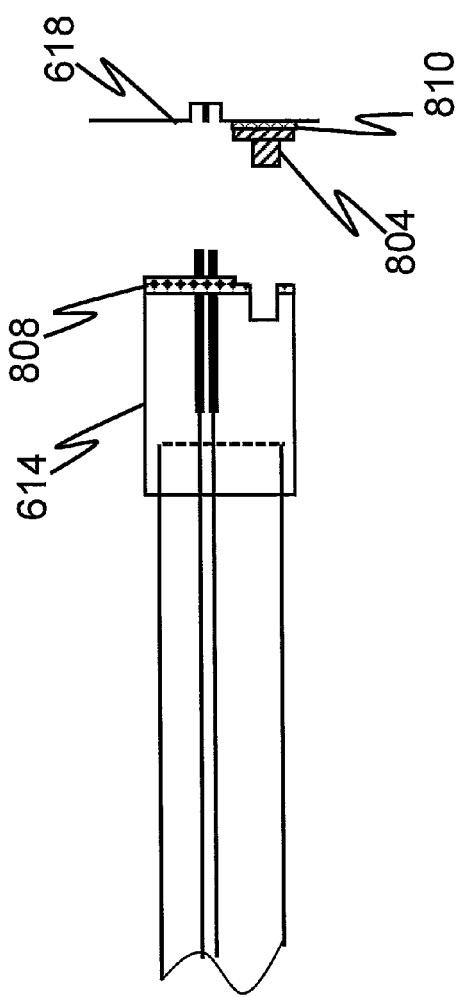

HDMI without adjustable sleeve

| Item # | 1 | 2 | 3 | 4 |
|---|---|---|---|---|
| Plug PM | N50 | N50 | N50 | N50 |
| Back plug | 1010 | 1010 | 1010 | 1010 |
| Attraction plate /Att. PM | N50 | N50 | 1010 | N50 |
| Cup | 1010 | 1010 | 1010 | 1010 |
| Shim | None | None | None | Yes |
| Sleeve | 1010 | Air | 1010 | 1010 |
| Force [N] | 50 | 43.5 | 52 | 53 |

| Comparison | Description of Change | Change in Force (+/-) (cumulative) | Summary of effects observed |
|---|---|---|---|
| Baseline | Baseline: N50 PM plug + ferromagnetic attraction plate | | |
| 1 | Similar volume PM | | ?? |
| 2 | Similar volume PM, sleeve not ferromagnetic | -6.5N | Effect of sleeve material |
| 3 | Cup to PM ratio changed | +3N (MAX) | Effect of cup back thickness |
| 4 | Attraction device all ferromagnetic | +2N | Cheapest, easiest to mnf |

| Material | ρ [kg/m³] | E [N/mm²] | ν | $\sigma_y$ [MPa] | $\sigma_u$ [MPa] | CTE [μm/m K] | λ [W/m K] | $C_p$ [J/kg K] |
|---|---|---|---|---|---|---|---|---|
| AISI 1010 | 7872 | 190000-210000 | 0.27-0.3 | 285 | 330 | 12.6 | N/A | 481 |
| N50 | 7600 | 150000 | 0.3 | 290* | 940** | 6.9 //, -1.7 ⊥ | 6.2 //, 6.7 ⊥ | 460 |

2700

ρ      density
E      Young modulus
ν      Poisson's ratio
$\sigma_y$   Yield strength
NA    Not Available $\sigma_u$   Ultimate strength
CTE   Coefficient of thermal expansion
λ      Thermal conductivity
$C_p$   Specific heat
* Bending strength, ** Compressive strength

Fig. 27

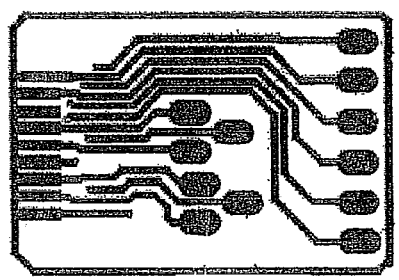
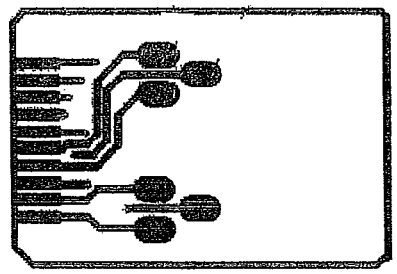
Fig. 38

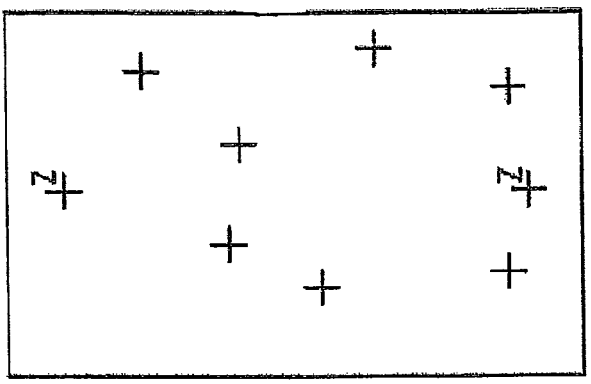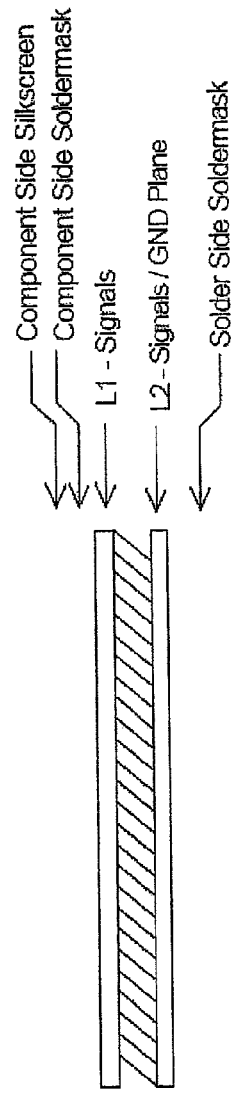
Fig. 44

MAGNETIC AND LOCKING CABLE CONNECTORS

CROSS-REFERENCE TO RELATED APPLICATIONS

This application is a continuation of U.S. patent application Ser. No. 12/343,089 and claims the benefit of the following provisional applications, each of which is hereby incorporated by reference in its entirety: U.S. Provisional App. No. 61/016,535 filed Dec. 24, 2007; U.S. Provisional App. No. 61/029,519 filed Feb. 18, 2008; U.S. Provisional App. No. 61/033,072 filed Mar. 3, 2008; U.S. Provisional App. No. 61/057,044, filed May 29, 2008; and U.S. Provisional App. No. 61/108,719 filed Oct. 27, 2008.

BACKGROUND OF THE INVENTION

1. Field of the Invention

The present invention relates to cable connectors for connecting different devices and, more particularly to magnetic and locking cable connectors.

2. Description of the Related Art

As the amount of information and data grows, so too does the number of devices and the interconnections between those devices. Current cabling technology for connection those devices is deficient in many respects. A need exists for improved cable designs.

SUMMARY OF THE INVENTION

Aspects of the present invention relate to systems and methods for improving cable connections and improving signal data processing capabilities between devices connected by cables. The improved connections and processing may be presented as an integral part of the cable or as an additional component designed to interoperate with a pre-existing cable. For example, in an embodiment, a magnetic connector may be supplied that includes an adhesive. Alternatively, the magnetic connector may be supplied without adhesive. The magnetic connector may be presented on a cable as an integral component or it may be presented as a retrofit solutions as a compatible device. In either situation, in embodiment, the magnetic material may be placed over the connector end of the cable such that when the cable is connected to a device, the adhesive sticks to the device and the magnet secures the cable end to the device. In other embodiments, a processor is included in the cable for processing of data. The processor may likewise, for example, be associated with the cable through an integral connection, such as within the cable connector end, or as an add-on device. The cable may include one or more items from the group consisting of an LED, a processor, a microprocessor, an integrated circuit, a magnetic connector, a locking connector and the like.

The various embodiments of the present invention provide a connector for optimizing magnetic force concentration, the connector comprising a plurality of magnets and a shunt plate arranged in the form of an array. The plurality of magnets may comprise a protrusion. Further, each recess of the plurality of recesses may be configured to receive a magnet of the plurality of magnets to form an array of magnets. Furthermore, the protrusion of the magnet may lock the magnet onto the recess.

In other embodiments, a method and system may be provided for strengthening the magnetic field by adjusting the size of the gap between the cable connector and the device. In an embodiment the gap may be adjusted between 0 mm and 4 mm. The sliding component may be part of the cable or part of the port to which the cable may be mated. The sliding component may or may not be magnetic or have magnetic properties. The port or cable, as applicable, with which the sliding component mates may or may not be magnetic or have magnetic properties. The gap adjustment may be used with or without a magnet. The gap adjustment may improve the fit and create a tighter connection between a cable and a port. The addition of a magnet or magnetic properties may serve to increase the strength of the connection.

In embodiments, a cable connector or a device port may contain a moveable magnetic array. The magnet array may be moved in such a manner as to increase the magnetic connection between the cable connector and the device port. In embodiments either the cable connector or the device port or both may include a magnetic array. In embodiments either the cable connector or the device port or both may have magnetic properties.

The magnetic array may be associated or attached to a jelly-like substance which permits movement of the magnetic array. The magnetic array, or an array with magnetic properties (such as an array including a metal, but not a magnet), may be attached to the jelly-like substance and as such may be permitted to move in any direction. In embodiments the distance and/or direction of motion may be limited in certain or all directions. In other embodiments movable sides of the magnet array may be provided for accommodating the gap. In embodiments, an optional flare may be provided to the movable sides. The optional flare may increase the surface area for the magnetic force between the cable connector and the device port. In embodiments, a method and system may be provided for correcting direction of polarity of the magnets and maximizing surface area of contact.

In an aspect of the invention, a system and method may comprise presenting a length of cable with a connector on at least one end, presenting a magnetic element in association with the connector, associating the magnetic element of the connector with a sleeve for sliding the magnetic element along the connector, attaching the connector to a mating connector of a device, wherein the sleeve overlaps the opposing magnet or plate on the device and wherein the magnetic properties of the magnetic element secure the connector to the magnetic element or plate of the device. In the system and method, the cable may be an HDMI cable. In the system and method, the connector may be an HDMI connector. In the system and method, the at least one material with magnet properties may be a magnet. In the system and method, the at least one material with magnet properties may be a material that is attracted to a magnet. The material may be a metal. In the system and method, the at least one material with magnet properties may be an electromagnet. In the system and method, the connector may be a retrofitted connector. In the system and method, the at least one material with magnet properties may be retrofitted. In the system and method, the at least one material with magnet properties may be secured with an adhesive. In the system and method, at least one of the connector and cable may include a processor. In the system and method, at least one of the connector and cable includes a microprocessor. In the system and method, at least one of the connector and cable includes an integrated circuit. In the system and method, at least one of the connector and cable includes a user interface. In the system and method, at least one of the connector and cable includes a display. In the system and method, at least one of the connector and cable includes an LED.

In one particular embodiment of the system and method, the distance between opposing magnets, or magnets and opposing metallic plate, may be adjustable by sliding the sleeve along the connector to ensure there is a surface contact and not an air gap. In the system and method, the sleeve may overlap the opposing magnet, or plate, and provide a return path for the magnetic field lines that bridge the seam between the two sides. In the system and method, the sleeve may fill the gap between the connector and the device, reducing the lever arm and the amount of torque on the connector. In the system and method, the sleeve may enclose the opposing side of the magnet assembly and helps even more to reduce the connector's deflection from torque.

The following disclosure includes many new innovations relating to the improvements in cable connections, cable processing, cable performance feedback, cable sales and marketing strategies associated with the new designs.

In embodiments, methods and systems for a cable connector with separable magnet may be provided. The methods and systems may include a cable having a data transmission wire, a device connector mechanically attached to the device connector end, and a magnetic element having a shape suitable for mating with a device side of the device connector, wherein the cable has a device connector end. The device connector may have at least one pin electrically associated with the data transmission wire. A first side of the magnetic element may be magnetically connected to a portion of the device connector and a second side may be positioned to magnetically connect to a device. The magnetic element may be separable from the device connector.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal that has magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, and a processor mode. In embodiments, the change in processor mode may be related to a signal processing mode, electromagnetic interference control parameters, radio frequency interference control parameters, a voltage, a current, a power regulation, or a similar parameter.

In embodiments, methods and systems for providing a cable connector with separable adhesive backed element for making a magnetic connection to the cable connector may be described. The methods and systems may include a cable having a data transmission wire, a device connector mechanically attached to the device connector end, a magnetic element having a shape suitable for mating with a device side of the device connector, and a double-sided adhesive element having a shape suitable for mating with the magnetic element. The cable may have a device connector end. One side of the double-sided adhesive element may be adhered to the magnetic element, and the other side of the adhesive element may be used for adhering to a device. The device connector may have at least one pin electrically associated with the data transmission wire. The magnetic element may be magnetically connected to a portion of the device connector.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or a similar parameter.

In embodiments, the methods and systems may include a cable having a data transmission wire, a device connector mechanically attached to the device connector end, a magnetically attractive element having a shape suitable for mating with a device side of the device connector, and a double-sided adhesive element having a shape suitable for mating with the magnetically attractive element. The cable may have a device connector end. The device connector may have a magnetic portion and at least one pin electrically associated with the data transmission wire. The magnetically attractive element may be magnetically connected to the magnetic portion of the device connector. One side of the double-sided adhesive element may be adhered to the magnetically attractive element, and the other side of the adhesive element may be used for adhering to a device.

In embodiments, a device connector for a data cable may be provided. The device connector may have a metal portion, a magnetic element with a shape adapted to mate with the device connector and magnetically connect to the metal portion, and a double-sided adhesive element. The double-sided adhesive element may be adhered to the magnetic element and positioned to adhere to a device.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facility. In embodiments, the change in processor mode may be related to a signal processing mode, electromagnetic interference control parameters, radio frequency interference control parameters, a voltage, a current, a power regulation, or to a similar parameter.

In embodiments, a device connector for a data cable may be provided. The device connector may include a magnetic portion, a magnetically attractive element with a shape adapted to mate with the device connector and magnetically connect to the magnetic portion, and a double-sided adhesive element. The double-sided adhesive element may be adhered to the magnetically attractive element and positioned to adhere to a device.

In embodiments, a data cable may be provided. The data cable may include a device connector having a metal portion, a magnetic element with a shape adapted to mate with the device connector and magnetically connect to the metal portion, and a double-sided adhesive element. The double-sided adhesive element may be adhered to the magnetic element and positioned to adhere to a device.

In embodiments, a data cable may be provided. The data cable may include a device connector having a magnetic portion; a magnetically attractive element with a shape adapted to mate with the device connector and magnetically connect to the magnetic portion and a double-sided adhesive element. The double-sided adhesive element may be adhered to the magnetically attractive element and positioned to adhere to a device.

In embodiments, methods and systems for attaching a data cable to a device may be provided. The methods and systems may include adhering a double-sided adhesive element to a magnetic element, leaving an exposed side of the magnetic element and an adherence side of the adhesive element, magnetically attaching the exposed side of the magnetic element to a device connector of the data cable and pressing the device connector onto a data port of a device such that the adherence side adheres to one of the device and the data port.

In embodiments, the device connector may be pulled from the device with a force sufficient to break the magnetic connection. The double-sided adhesive element may maintain its connection between the magnetic element and at least one of the device and the data port.

In embodiments, a method of attaching a data cable to a device may be provided. The methods and systems may include adhering a double-sided adhesive element to a magnetically attractive element, leaving an exposed side of the magnetically attractive element and an adherence side of the adhesive element, magnetically attaching the exposed side of the magnetically attractive element to a magnetic portion of a device connector of the data cable, and pressing the device connector onto a data port of a device such that the adherence side adheres to at least one of the device and the data port.

In embodiments, the methods and systems may further include pulling the device connector from the device with a force sufficient to break the magnetic connection. The double-sided adhesive element may maintain its connection between the magnetically attractive element and the at least one of the device and the data port.

In embodiments, the device connector may be pulled from the device with a force sufficient to break the magnetic connection. The double-sided adhesive element may maintain its connection between the magnetically attractive element and the at least one of the device and the data port.

In embodiments, methods and systems for cable connector with slidable housing is provided. The methods and systems may include a cable having a data transmission wire, a device connector mechanically attached to the device connector end, and the device connector having a slidable housing for enhanced connection quality. The cable may have a device connector end. The device connector may have at least one pin electrically associated with the data transmission wire. The slidable housing may slide to increase and decrease the exposure of a data pin of the device connector.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or a similar parameter.

In embodiments, the methods and systems may include a cable having a data transmission wire, a device connector mechanically attached to the device connector end, and the device connector having a slidable housing for enhanced connection quality. The slidable housing may slide to increase and decrease the exposure of a data pin of the device connector. The cable may have a device connector end. The device connector may have at least one pin electrically associated with the data transmission wire.

In embodiments, methods and systems may include a cable having a data transmission wire, a device connector mechanically attached to the device connector end, and the device connector having a slidable housing for enhanced connection quality. The slidable housing may slide to increase and decrease the exposure of a mechanical attachment portion of the device connector. The cable may have a device connector end. The device connector may have at least one pin electrically associated with the data transmission wire.

In embodiments, methods and systems for connecting the device connector to the device may be provided. The methods and systems may include engaging a pin of a device connector with a device port to form an electrical connection, sliding a mechanical attachment portion of the device connector relative to the pin along the axis of the pin in response to the engagement, and mechanically connecting the device connector to the device. The pin may be electrically associated with a data transmission wire of a cable that may be mechanically attached to a cable exit end of the device connector.

In embodiments, methods and systems may include a cable having a data transmission wire, a device connector mechanically attached to the device connector end, and the device connector having a slidable housing for enhanced connection quality. The slidable housing may slide to increase and decrease the exposure of a data pin of the device connector and a mechanical attachment portion of the device connector. The cable has a device connector end. The device connector may have at least one pin electrically associated with the data transmission wire.

In embodiments, the methods and systems may include a device connector for mechanically attaching to a device connector end of a cable and the device connector having a slidable housing for enhanced connection quality. The device connector may have at least one pin for electrically associating with a data transmission wire of the cable. The slidable housing may slide to increase and decrease the exposure of a data pin of the device connector and a mechanical attachment portion of the device connector.

In embodiments, methods and systems for cable connector with slidable housing may be provided. The methods and systems may include a cable having a data transmission wire, a device connector mechanically attached to the device connector end, the device connector having a slidable housing for enhanced connection quality, and a magnetic element attached to the device connector. The cable may have a device connector end. The device connector may have at least one pin electrically associated with the data transmission wire. The slidable housing may slide to increase and decrease an exposure of a data pin of the device connector. The magnetic element may be arranged to magnetically couple to at least one of a device and a device port.

In embodiments, the magnetic element may be attached to a non sliding portion of the housing. In embodiments, the slidable housing may slide to increase and decrease an exposure of the magnetic element.

In embodiments, the system may comprise a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and an integrated circuit. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or a similar parameter.

In embodiments, methods and systems for a device connector may be provided. The methods and systems may include a pin of a device connector having an end for engaging a device port, a slidable portion of the device connector for sliding relative to the pin along the axis of the pin, and a magnetic element associated with the slidable portion of the device connector for magnetically connecting the slidable portion of the device connector to the device.

In embodiments, the pin may include a receptacle end for forming an electrical connection with a data transmission wire of a cable that includes a device connector end for mechanically attaching to a cable exit end of the device connector.

In embodiments, the magnetic element may comprise multiple attached magnets. The multiple magnets may move relative to each other while maintaining physical and magnetic connection therebetween. The multiple magnets may also move in response to a torque applied to the device connector.

In embodiments, methods and systems may be provided for engaging a pin of a device connector with a device port. The pin may be electrically associated with a data transmission wire of a cable that is mechanically attached to a cable exit end of the device connector. The device connector may include a magnetic element. The engagement may facilitate sliding a portion of the device connector relative to the pin along the axis of the pin. Further, a magnetic connection may be provided between the device connector and the magnetic element to the device.

In embodiments, the magnetic element may move with the sliding portion in response to the engagement.

In embodiments, the magnetic element may comprise multiple attached magnets. The multiple magnets may move relative to each other while maintaining physical and magnetic connection between magnetic element and the device connector. Further, the multiple magnets may move in response to a torque applied to the device connector.

In embodiments, methods and systems may provide a cable connector with slidable housing and adhesive backed magnet. The methods and systems may include a cable having a data transmission wire, a device connector mechanically attached to the device connector end, the device connector having a slidable housing for enhanced connection quality, and a magnetic element with a first side for magnetically coupling to the device connector and a second side attached to an adhesive element. The cable may have a device connector end. The slidable housing may slide to increase and decrease the exposure of a data pin of the device connector.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or to a similar parameter.

In embodiments, methods and systems may include a cable having a data transmission wire, a device connector mechanically attached to the device connector end, the device connector having a slidable housing for enhanced connection quality, a magnetic element mechanically attached to the device connector, and a magnetically attractive element with a first side for magnetically coupling to the device connector and a second side attached to an adhesive element. The adhesive element may be arranged with an adherence surface in a position to adhere to at least one of a device and a device port. The cable may have a device connector end. The device connector may have at least one pin electrically associated with the data transmission wire. The slidable housing may slide to increase and decrease the exposure of a data pin of the device connector. The magnetic element may be disposed to present a magnetic attraction field at a device end of the device connector.

In embodiments, a device connector may be provided. The device connector may include a device connector for a data cable, a magnetic element with a shape adapted to mate with the device connector and magnetically connect to the magnetically attractive portion, and a double-sided adhesive element. The double-sided adhesive element may be adhered to the magnetic element and positioned to adhere to a device. The device connector may have a slidable housing for enhanced connection quality. The slidable housing may slide to increase and decrease the exposure of a data pin of the device connector. The device connector may have a magnetically attractive portion.

In embodiments, a device connector for a data cable may be provided. The device connector may include a magnetic portion, a slidable housing for enhanced connection quality, a magnetically attractive element with a shape adapted to mate with the device connector and magnetically connect to the magnetic portion and a double-sided adhesive element. The double-sided adhesive element may be adhered to the magnetically attractive element and may be positioned to adhere to a device. The slidable housing may slide to increase and decrease the exposure of a data pin of the device connector.

In embodiments, methods and system for a cable with electromagnet may be provided. The methods and systems may include a cable having a data transmission wire and a power wire, a device connector mechanically attached to the device connector end, and an electromagnet charged through the power wire. The cable may have a device connector end. The device connector may have at least one pin electrically associated with the data transmission wire. The electromagnet may be connected to the device connector.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or a similar parameter.

In embodiments, the methods and systems may include a cable having a data transmission wire and a power wire, a device connector mechanically attached to the device connector end, a magnetically attractive element having a shape suitable for mating with a device side of the device connector, and a double-sided adhesive element having a shape suitable for mating with the magnetically attractive element. The cable may have a device connector end. The device connector may have an electromagnet charged through the power wire and at least one pin electrically associated with the data transmission wire. The magnetically attractive element may be magnetically connected to the electromagnet. One side of the double-sided adhesive element may be adhered to the magnetically attractive element, and the other side of the adhesive element may be used for adhering to a device.

In embodiments, a device connector for a data cable may be provided. The device connector may include an electromagnet powered by an electrical connection between the device connector and a device, a magnetically attractive element with a shape adapted to mate with the device connector and magnetically connect to the electromagnet, and a double-sided adhesive element. The double-sided adhesive element may be adhered to the magnetically attractive element and may be positioned to adhere to the device.

In embodiments, a data cable may be provided. The data cable may include a device connector, a magnetically attractive element with a shape adapted to mate with the device connector and magnetically connect to the electromagnet, and a double-sided adhesive element. The device connector may have an electromagnet powered by an electrical connection between the device connector and a device. The double-sided adhesive element may be adhered to the magnetically attractive element and may be positioned to adhere to the device.

In embodiments, methods and system for attaching a data cable to a device may be provided. The methods and systems may include adhering a double-sided adhesive element to a magnetically attractive element, leaving an exposed side of the magnetically attractive element, and an adherence side of the adhesive element; aligning the magnetically attractive element between a device connector with an electromagnet and a data port of a device so that the adherence side may be positioned to adhere to at least one of the device and the data port, pressing the device connector and the aligned magnetically attractive element to the device port, attaching the adherence side of the double-sided adhesive element to the at least one of the device and the data port and energizing the electromagnet through an electrical connection formed thereby magnetically attaching the exposed side of the magnetically attractive element to the device connector in response to pressing the device connector onto the data port.

In embodiments, the methods and systems may further include de-energizing the electromagnet thereby breaking the magnetic connection. The double-sided adhesive element may maintain its connection between the magnetically attractive element and the at least one of the device and the data port.

In embodiments, the methods and systems may include a cable having a data transmission wire and a power wire, a device connector mechanically attached to the device connector end, and an electromagnet attached to the device connector and disposed to magnetically couple to at least one of a device and a device port. The cable may have a device connector end. The device connector may have a slidable housing for enhanced connection quality. The device connector may have at least one pin electrically associated with the data transmission wire and at least one pin electrically associated with the power wire. The slidable housing may slide to increase and decrease an exposure of a data pin of the device connector. The electromagnet may be powered by an electrical signal passed from the device port to the at least one pin electrically associated with the power wire.

In embodiments, the electromagnet may be attached to a non sliding portion of the housing. The slidable housing may slide to increase and decrease an exposure of the electromagnet.

In embodiments, the methods and systems may include a cable having a data transmission wire, a device connector mechanically attached to the device connector end, the device connector having a slidable housing for enhanced connection quality, an electromagnet mechanically attached to the device connector and a magnetically attractive element with a first side for magnetically coupling to the electromagnet and a second side attached to an adhesive element. The adhesive element may be arranged with an adherence surface in a position to adhere to at least one of a device and a device port. The device connector may have at least one pin electrically associated with the data transmission wire and having at least one pin for powering an electromagnet. The slidable housing may slide to increase and decrease the exposure of a data pin of the device connector. The electromagnet may be disposed to present a magnetic attraction field at a device end of the device connector.

In embodiments, a device cable connector may be provided. The device cable connector may include a data pin electrically connected to a data wire and a rigid pin alignment platform having a guide hole through which the data pin is aligned. The data pin may be mounted in a resilient material which may allow the data pin to flexibly move from side to side. The guide hole may be sized to allow the data pin to flexibly move from side to side within a predetermined tolerance.

In embodiments, the systems may include a Digital Visual Interface cable, a Video Graphic Array cable, a Universal Serial Bus cable, a High Definition Multimedia Interface cable, television cables, a DVD cable, a VCR cable, a portable media player cable, a component video cable, an audio cable, an S-video cable, a cell phone cable, a media server interface cable, and the like.

In embodiments, the cable may include a shielding. The shielding may be at least one of a ferrite shielding, a mylar shielding, a copper shielding, or some other type of shielding.

In embodiments, the device connector may be a HDMI connector. The HDMI connector may provide a communication link. The communication link may be associated with a LAN, a MAN, a WAN, the Internet, or some other type of network.

In embodiments, the HDMI connector may be of Type A. The Type A connector may support SDTV mode, EDTV mode, HDTV mode, or some other mode.

In embodiments, the HDMI connector may be of Type B. The Type B connector may support high-resolution displays. The high-resolution display may be WQUXGA.

In embodiments, the HDMI connector may be of Type C.

In embodiments, the magnetic element may be made of metal having magnetic properties, a magnet, an electromagnet, and the like.

In embodiments, the device connector may include a processor, a microprocessor, and the like. The processor may provide impedance matching. The impedance matching may be achieved by adjusting attributes associated with the cable. In embodiments, the processor may perform signal equalization. In embodiments, the processor may adjust signal strength. The strength of the signal may be increased. In embodiments, the processor may regulate heat transfer. In embodiments, the processor may regulate thermal management, reduce cross talk, reduce noise and electromagnetic interference, facilitate switching among various circuits, provide status information, and the like.

In embodiments, the status information may be provided by an indicator. The indicator may be a screen, an LCD, and the like. In embodiments, the status information may be provided by a display. The display may include at least an LED. The LED may be multi-colored LED and may provide a feedback information to a user.

In embodiments, the device connector may include an integrated circuit and a user interface. The user interface may include a button, a touch screen, a dial, a switch, a capacitive switch, a processor mode, or some other facilities. In embodiments, the change in processor mode may be related to a signal processing mode, electromagnetic interference control parameters, radio frequency interference control parameters, a voltage, a current, a power regulation, or a similar parameter.

In embodiments, a device cable connector may be provided. The device cable connector may include a data pin electrically connected to a data wire and a rigid pin alignment layer having a guide hole through which the data pin is aligned. The data pin may be mounted in a resilient material allowing the data pin to flexibly move from side to side. The guide hole may be sized to allow the data pin to flexibly move from side to side within a predetermined tolerance.

In embodiments, a method and system for a device cable connector may be provided. The methods and systems may include a cable having a data transmission wire, a device connector mechanically attached to the device connector end, a rigid pin alignment feature disposed within the device connector and a magnetic element having a shape suitable for mating with a device side of the device connector. A first side of the magnetic element may be magnetically connected to a portion of the device connector and a second side may be positioned to magnetically connect to a device. The magnetic element may be separable from the device connector. The cable may have a device connector end. The device connector may have at least one pin electrically associated with the data transmission wire. The at least one pin mounted in a resilient material may allow the pin to flexibly move from side to side. The feature may have a guide hole through which the pin is aligned. The guide hole may be sized to allow the pin to flexibly move from side to side within a predetermined tolerance.

In embodiments, the pin alignment feature may be a platform, a layer, and the like.

In embodiments, methods and systems for a device cable connector may be provided. The methods and systems may include a cable having a data transmission wire, a device connector mechanically attached to the device connector end, a pin mounted in a resilient material which may allow the pin to flexibly move from side to side, a rigid pin alignment feature disposed within the device connector, a magnetic element having a shape suitable for mating with a device side of the device connector, and a double-sided adhesive element having a shape suitable for mating with the magnetic element. The one side of the double-sided adhesive element may be adhered to the magnetic element, and the other side of the adhesive element may be used for adhering to a device. The cable may have a device connector end. The device connector may have at least one pin electrically associated with the data transmission wire. The feature may have a guide hole through which the pin is aligned. The guide hole may be sized to allow the pin to flexibly move from side to side within a predetermined tolerance. The magnetic element may be magnetically connected to a portion of the device connector.

In embodiments, the pin alignment feature may be a platform, a layer, and the like.

In embodiments, methods and systems for a device cable connector may be provided. The methods and systems may include a cable having a data transmission wire, a device connector mechanically attached to the device connector end, a rigid pin alignment feature disposed within the device connector, and the device connector having a slidable housing for enhanced connection quality. The slidable housing may slide to increase and decrease the exposure of a data pin of the device connector. The cable may have a device connector end. The device connector may have at least one pin electrically associated with the data transmission wire. The pin may be mounted in a resilient material which may allow the pin to flexibly move from side to side. The feature may have a guide hole through which the pin is aligned. The guide hole may be sized to allow the pin to flexibly move from side to side within a predetermined tolerance.

In embodiments, the pin alignment feature may be a platform, a layer, and the like.

In embodiments, methods and systems for a device cable connector may be provided. The methods and systems may include a cable having a data transmission wire, a device connector mechanically attached to the device connector end, a rigid pin alignment feature disposed within the device connector and a magnetic element attached to the device connector and arranged to magnetically couple to at least one of a device and a device port. The cable may have a device connector end. The device connector may have a slidable housing for enhanced connection quality. The device connector may have at least one pin electrically associated with the data transmission wire. The pin may be mounted in a resilient material allowing the pin to flexibly move from side to side. The feature may have a guide hole through which the pin may be aligned. The guide hole may be sized to allow the pin to flexibly move from side to side within a predetermined tolerance. The slidable housing may slide to increase and decrease an exposure of a data pin of the device connector.

In embodiments, the pin alignment feature may be a platform, a layer, and the like.

In embodiments, the magnetic element may be attached to a non sliding portion of the housing. The slidable housing may slide to increase and decrease an exposure of the magnetic element.

In embodiments, methods and systems for a device cable connector may be provided. The methods and systems may include a cable having a data transmission wire, a device connector mechanically attached to the device connector end, a rigid pin alignment feature disposed within the device connector, a magnetic element with a first side for magnetically coupling to the device connector and a second side attached to an adhesive element. The cable may have a device connector end. The device connector may have at least one pin electrically associated with the data transmission wire. The pin mounted in a resilient material may allow the pin to flexibly move from side to side. The feature may have a guide hole through which the pin may be aligned. The guide hole may be sized to allow the pin to flexibly move from side to side within a predetermined tolerance. The device connector may have a slidable housing for enhanced connection quality. The slidable housing may slide to increase and decrease the exposure of a data pin of the device connector. The adhesive element may be arranged with an adherence surface in a position to adhere to at least one of a device and a device port.

In embodiments, the pin alignment feature may be a platform, a layer, and the like.

In embodiments, methods and systems for a device cable connector may be provided. The methods and systems may include a cable having a data transmission wire and a power wire, a device connector mechanically attached to the device connector end, a rigid pin alignment feature disposed within the device connector and an electromagnet charged through the power wire. The cable may have a device connector end. The feature may have a guide hole through which the pin is aligned. The guide hole may be sized to allow the pin to flexibly move from side to side within a predetermined tolerance. The electromagnet may be connected to the device connector.

In embodiments, the pin alignment feature may be a platform, a layer, and the like.

In embodiments, methods and systems for a device cable connector may be provided. The methods and systems may include a cable having a data transmission wire and a power wire, a device connector mechanically attached to the device connector end, a rigid pin alignment feature disposed within the device connector, and an electromagnet attached to the device connector and disposed to magnetically couple to at least one of a device and a device port. The cable may have a device connector end. The device connector may have at least one pin electrically associated with the data transmission wire and at least one pin electrically associated with the power wire. The device connector may have a slidable housing for enhanced connection quality. The slidable housing may slide to increase and decrease an exposure of a data pin of the device connector. The pins may be mounted in a resilient material which may allow the pins to flexibly move from side to side. The feature may have a guide hole through which the pins are aligned. The guide hole may be sized to allow the pins to flexibly move from side to side within a predetermined tolerance. The electromagnet may be powered by an electrical signal passed from the device port to the at least one pin electrically associated with the power wire.

In embodiments, the pin alignment feature may be a platform, a layer, and the like.

In embodiments, the electromagnet may be attached to a non sliding portion of the housing. In embodiments, the slidable housing may slide to increase and decrease an exposure of the electromagnet.

These and other systems, methods, objects, features, and advantages of the present invention may be apparent to those skilled in the art from the following detailed description of the preferred embodiment and the drawings. All documents mentioned herein are hereby incorporated in their entirety by reference.

BRIEF DESCRIPTION OF THE DRAWINGS

The invention and the following detailed description of certain embodiments thereof may be understood by reference to the following figures:

FIG. 7A depicts the connector system of FIG. 6 assembled and connected to a device.

FIG. 7B depicts the connector system of FIG. 6 after removal from the device.

FIG. 9A depicts an alternate embodiment of the connector system of FIG. 7A including double-sided adhesive.

FIG. 9B depicts an alternate embodiment of the connector system of FIG. 7B including double-sided adhesive.

FIG. 24 depicts a table reporting a comparison for four different configurations of sliding sleeve.

FIG. 27 depicts a summary of the materials analysis data shown in the graphs of FIGS. 25 and 26.

FIGS. 38-45 depict various embodiments of the printed circuit board of the invention.

DETAILED DESCRIPTION OF THE PREFERRED EMBODIMENT(S)

Figure 1:
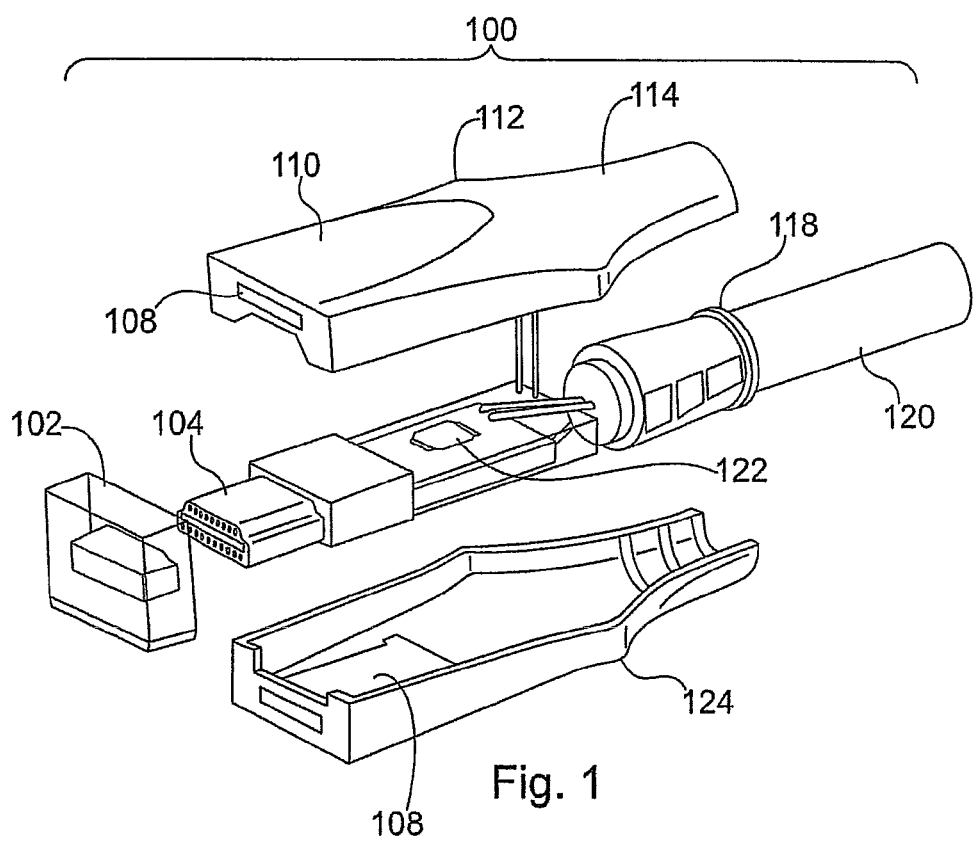
FIG. 1 depicts an embodiment of a connector with magnetic properties showing the various components

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. an open transition). The term "coupled" or "operatively coupled" as used herein, is defined as connected, although not necessarily directly, and not necessarily mechanically.

Standard protocols and the use of electrical specifications for signaling, pin-out, electrical and mechanical requirements of cables and connectors are well known in the art. Examples of standard protocols and standards may include High Definition Multimedia Interface (HDMI) specification, DisplayPort standard, Digital Visual Interface (DVI) standard and other types of standards.

Conventional standards do not specifically disclose the level of physical connection between a connector and a port and in some cases the connection between a cable and a device is weak resulting in the cable being disconnected from the device. There is a need for cable connector systems having magnetic properties that will establish a stronger connection between the cable and the device. Devices such as video game consoles, set-top boxes, personal computers, televisions, electronic devices in general, and the like may have varying clearance around cable connection ports. As such, there is a need for cable connector systems with magnet properties in which at least a portion of the cable connector system can be moved or adjusted to reduce the distance to the device. As a result the strength of the magnetic connection between the device and the cable connector system may be increased.

Therefore, in light of the above discussions there is a need for methods and systems that provide magnetic and locking connections between cables and devices. In addition, there is a need for methods and systems that allow the at least a portion of the cable connector system with magnetic properties to move and adjust to vary the gap between the cable connector system and the port.

The invention discloses, among other things, a magnetic connector mechanism. A cable may have one or more connectors. A connector may plug into one or more ports. For example, the connector may be plugged to one or more ports on a device. In a specific embodiment, a device may be a computer, television, DVD player, stereo, personal digital assistant, phone or the like. Further, the connector may be a male connector, a female connector, a male-male adapter, a female-female adapter, a unisex connector, and the like. Correspondingly, the ports that the connector may be plugged into may be female, male, or unisex ports. A cable connector system may include a device connector or connector.

The cable connector system or the port or both may include a magnet or a material with magnetic properties. The connector may include a magnet and the device port may be magnetically attractive. Alternatively, the connector may be magnetically attractive and the device port may magnetic. In yet another alternative, a magnet may interface a connector that is magnetically attractive to a port that may or may not be magnetically attractive. Similarly, a magnetized connector may be interfaced to a port through a magnetically attractive element. The magnetic properties may enable the cable connector system to be held in contact with the port due to magnetic forces. Moreover, the connector may be magnetic and the port that it is connected to may be surrounded by a material that magnetically attracts the connector in order for both to remain attached. The material that surrounds the port may be a metal, a magnet of opposite polarity that may attract the magnetic connector, and the like. A magnetically connectable port as described herein may be integrated into a device. The port may be magnetic. The port may be capable of being attracted by a magnet.

The port for magnetic connection of a connector to a device may be retrofitted into a device. The retrofitting may be accomplished through the use of a plate. The plate may be a metal or magnetic plate that surrounds the port. The plate may be glued, taped or attached by some other mechanism to the port or device surface. The plate may be held in place using adhesive tape or by some other means. In alternate embodiments, the retrofitting may be accomplished by magnetizing the port. In alternate embodiments, the retrofitting may be accomplished through the use of an adapter or dongle that provides a magnetic connection to a cable connector and which may be securely attached to an existing port, or some other means. The adaptor or dongle may be magnetic or may be capable of being attracted by a magnet. In embodiments, a secure attachment to the device or device port may be accomplished using an adhesive tape, one or more clamps, one or more screws, and any other type of cable to device securing means, and the like.

The cable connector system may include a connector to facilitate magnetic connection to a device integrated with a cable to form a device connector cable. The connector may have magnetic properties. The connector may be retrofitted onto a cable. The retrofitting may be accomplished through the use of a plate, such as a metal or magnetic plate, that surrounds an existing connector on the cable. The plate may be glued or taped in place. Alternatively, the plate may be held in place using an adhesive tape or backing. Further, the plate may be attached in place by another mechanism. The retrofitting may be accomplished by magnetizing the connector of the cable. The retrofitting may be accomplished through the use of an adapter or dongle that facilitates magnetic connection to a device or device port and may be securely attaches to an existing connector of a cable. The adaptor or dongle may be magnetic or may be capable of being attracted by a magnet. In embodiments, a secure attachment may be accomplished using adhesive tape, one or more clamps, one or more screws, and the like. The adhesive may be placed on one side of a magnetically attractive plate or a magnetic element and then the plate or element may be pressed against the end of an existing cable connector, thereby transforming the existing cable connector into a cable connector that facilitates magnetic connection to a device.

To retrofit a device with adhesive, the adhesive may be facing away from the existing cable connector so that when the connector is pressed into a mating connector on a device, the adhesive sticks to the device holding the plate or magnetic element in place on the device. The magnetic property of the magnetic element secures the element itself to an existing cable connector that is magnetically attractive. With this arrangement, the connector would be more securely attached to the device mating connector through the adhesion to the device and the magnetic connection to the cable.

The cable connector system that facilitates magnetic connection to a device may be integrated with a shield of the connector. The shield of the connector may form a continuous shield through connection to a shield of a cable. The magnetic connection may be integrated with the connector shield. The shielding of the connector and/or the cable may include a ferrite core. The shielding and/or the ferrite core may facilitate the magnetic connection capability of the cable connector system. Therefore, when connected to a device port that includes shielding, the magnetic connection elements of the cable connector system may contribute to shielding of the signals passing through the port and reduce interference including electromagnetic interface, a radio frequency interference and the like. Similarly, a retrofitted plate as herein described may contribute to shielding and reduce interference, including electromagnetic, radio frequency interference and the like. In addition, in embodiments, the cable and/or magnet may include shielding, such as magnetic shielding, utilizing at least one of ferrite, extruded ferrite, mylar, copper and the like.

FIG. 1 depicts an embodiment of the cable connector system that facilitates magnetic connection to a device and shows certain of the various components that may be included. In an example, also shown in FIG. 1, a High-Definition Multimedia Interface (HDMI) cable 120 may be connected to an HDMI plug 104. The HDMI plug 104 may include an integrated circuit 122 associated with it as shown in FIG. 1. Further, a strain relief 118 may be provided on the HDMI cable 120 for relieving the cable of the strain so the associated cables can be easily affixed to the HDMI plug 104. The interconnection of the HDMI plug 104 and the HDMI cable 120 may covered by ABS shells consisting of an ABS shell on the top 112 and an ABS shell on the bottom 124. The ABS shell on the top 112 that forms the top level covering may include an LED 114, an epoxy label 110 and a magnet 108 attached at the front of the top ABS shell 112. Similarly, the ABS shell on the bottom 124 may include a magnet 108 at its front end. A magnet plate for HDMI receptacle 102 may be used for connecting the connector. All the components may be assembled to form the connector. The connector housing may be an ABS shell and/or an over-mold made from at least one of PVC, PE, polyvinylchloride, polyethylene or the like. The magnetic array, such as the magnetic array depicted in FIG. 1 may contain any number of magnets. In embodiments, the magnetic array may be located on a cable connector and/or a cable port. The array may include 2 magnets, 4 magnets, 6 magnets, 8 magnets, 10 magnets, 12 magnets and the like. Alternatively, the ABS shells may include magnetic elements, such as magnetic particles that may render the shell, or a portion of the shell magnetic. Alternatively, the ABS shell may be produced with sufficient metal particles (or other magnetically attractive particles) that may render the shell, or a portion of the shell to be magnetically attractive.

The male terminal of a cable connector of the cable connector system of FIG. 1 may be elongated in order to allow room for the plate and/or magnet. The female terminal of a port may be deepened in order to allow room for the plate and/or magnet.

The magnet length may be approximately 6 mm with a hole such as to fix the position. In another embodiment, a metallic ring may be included around the proxy label of the connector that may attract an opposite magnet for holding the connector in place or for some other function. In yet another embodiment the metal receptacle plate may include black Ni electroplating. In yet another embodiment, the adhesive may be a sticker. In an example, the sticker may be a sample from 3M (4016, 4611) and the like. Further, the sticker may be black, white, and the like. The assembly with magnetic properties may be standalone, a part of a cable, a part of a device and/or may include a warning mark over the magnetic areas.

Figure 2B:
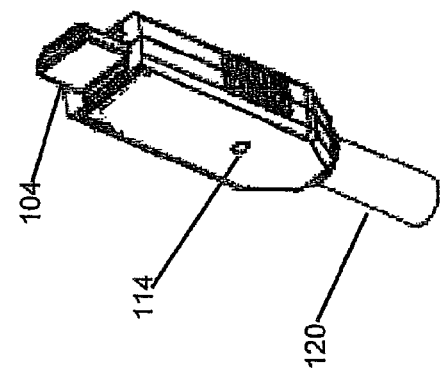
FIG. 2B depicts a perspective view of the assembled connector depicted in FIG. 2A.
Figure 2A:
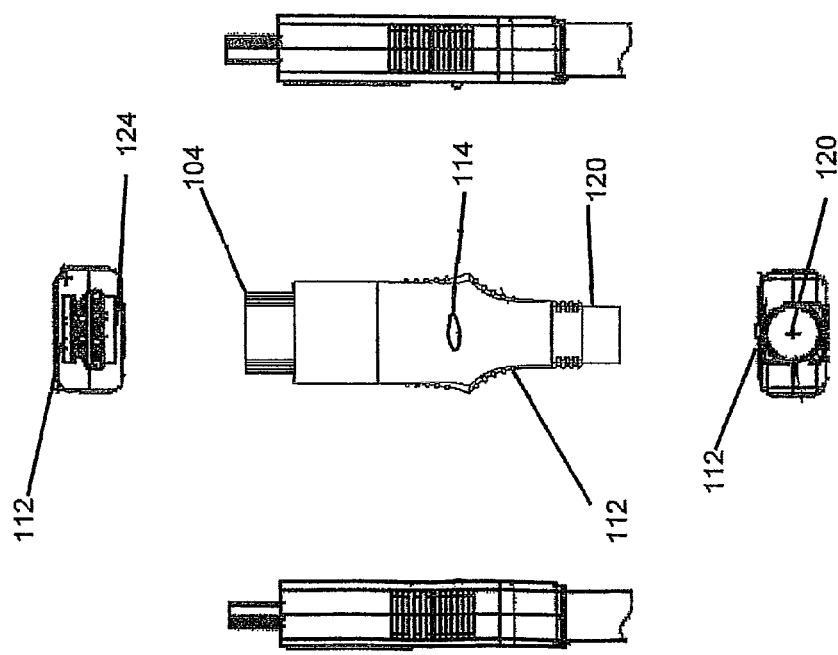
FIG. 2A depicts top, side, and end views of the assembled connector depicted in FIG. 1.

Referring to FIGS. 2A and 2B, which depict top, side, end, and perspective views of the assembled cable connector system from FIG. 1, dimensions for an embodiment of the cable connector system are presented. In an embodiment, as shown in FIG. 2A, the dimension of the ABS shell top 112 and the ABS shell bottom 124 may be approximately 51 mm. Similarly, the position of the LED indicator 114 from the cable 120 may be approximately 19 mm and the position of the LED indicator 114 from the HDMI plug 104 may be approximately 32 mm. Likewise, the size of the cable may be approximately 11 mm. Similarly, all other representative dimensions of the different components are shown in FIGS. 2A and 2B.

Figure 3:
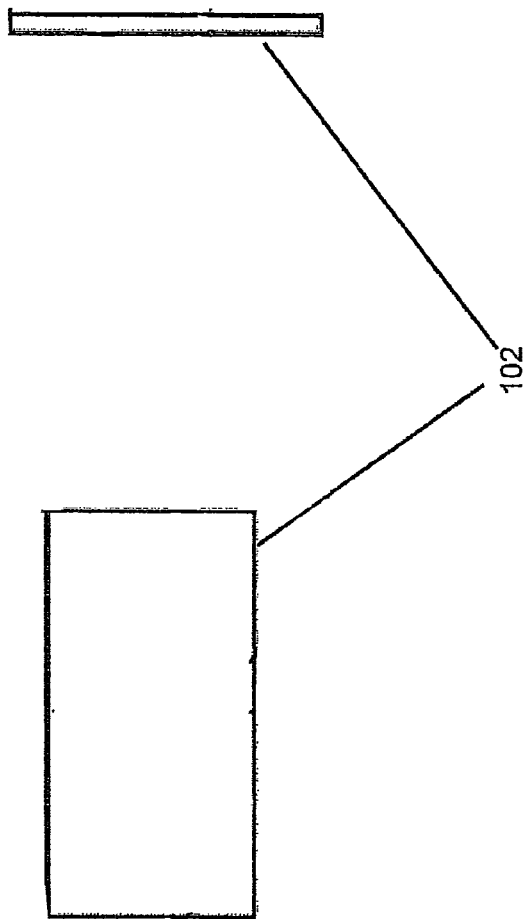
FIG. 3 depicts an embodiment of the magnet associated with the connector of FIG. 1.

FIG. 3 depicts dimensions for an embodiment of the magnet plate 102 from FIG. 1.

Figure 4:
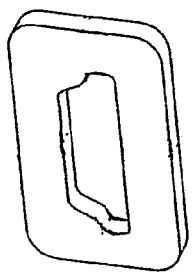
FIG. 4 depicts an embodiment of the magnetic plate depicted in the cable connector system of FIG. 1.

FIG. 4 depicts an embodiment of the magnetic plate for the HDMI receptacle as depicted in FIG. 1 including representative dimensions.

Figure 5:
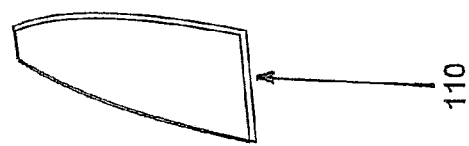
FIG. 5 depicts an embodiment of the epoxy label depicted in FIG. 1.

FIG. 5 depicts an embodiment of the epoxy label 110 included in the connector assembly 100 depicted in FIG. 1, including representative shape and dimensions.

Figure 6:
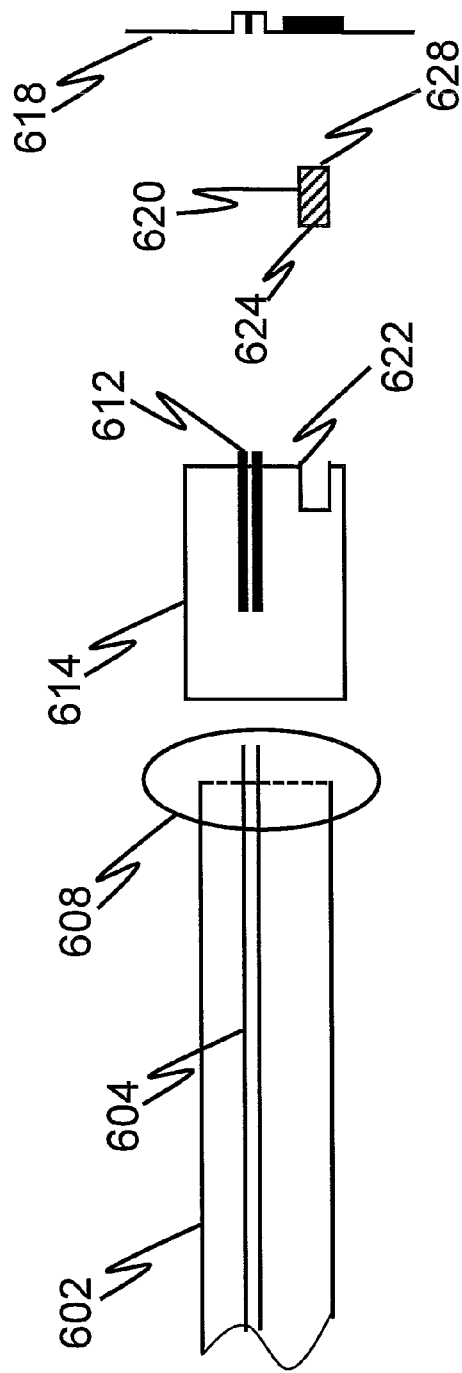
FIG. 6 depicts a side view of an embodiment of the magnetic cable connector system.

FIG. 6 depicts a cable assembly with a magnetic element in accordance with an embodiment of the present invention. The magnetic element may provide an enhanced quality of electrical connection between the cable assembly and a device to which the cable assembly is attached.

The cable system of FIG. 6 may include a cable 602. The cable 602 may include a data transmission wire 604 that may carry electrical signals. In an example, the data transmission wire 604 of the cable 602 may carry the low voltage electrical communication signals. The cable 602 may have a device connector end 608. Mechanically attached to the device connector end 608 may be a device connector 614. In an example, the device connector 614 may be attached to the device connector end 608 through a post molding process. The device connector 614 may have one or more pins 612 that may be electrically associated with the data transmission wire 604, such as to carry the electrical signals of the data transmission wire 604. The single pin 612 may carry the electrical signals associated with the data transmission wire 604. When the cable system is mated to a device, the one or more pins 612 may make contact with a receptacle that can receive the electric signal. The device connector 614 may be constructed with a device side 622 that may be oriented so as to mate with a device 618.

The device connector 614 may be associated with a magnetic element 620. The magnetic element 620 may be shaped so that it can mate to the device side 622. The magnetic element 620 may include a first side 624 that may be magnetically attached to the device side 622 of device connector 614. The magnetic element 620 may include a second side 628 for magnetically connecting to a device 618. The second side 628 may be positioned to magnetically connect with the device 618 when the magnetic element 620 is magnetically connected to the device side 622 of device connector 614. The magnetic attachment between magnetic element 620 and device connector 614 may be separable.

Alternatively, the shape of the magnetic element 620 may be such that it allows a mechanical coupling between the device connector 614 on one side and device 618 on the other side, wherein device 618 may be a port, a connector, a computer, a laptop, a PDA, a mobile phone, or some other type of electronic device.

The cable 602 may be of different types and may include HDMI, DVI, VGA (Video Graphic Array), USB (Universal Serial Bus), Firewire, cabling for 480 standard, cabling for 310 standard, cabling for 1080 standard, cabling for 1440 standard, quad standard and above, cabling for multiple screens or displays on one bit map, console cabling, game console cabling, computer cabling, stereo cabling, video game system cabling, multi-screen display, projector, microprojector, television cables, DVD cables, VCR cables, portable media player cables, component video cables, audio cables, S-video cables, cell phone cables, cables for a media server, cables for any computer used to power or in association with a home theater and the like.

Referring to FIG. 7A, a mechanical coupling formed between device connector 614 and the device 618 using the magnetic element 620 is depicted. The magnetic field created due to the magnetic element 620 may provide a mechanical association with the device connector 614 at one end. Similarly, the magnetic field created by the magnetic element 620 may provide a magnetic connection between the magnetic element 620 and the device 618 and therefore device connector 614 and pins 612 may mechanically mate to device 618 to facilitate transmission of data between the cable 602 and the device 618.

A portion of the device connector 614 and a portion of the device 618 may be made up of material having magnetic properties. Alternatively, a portion of the device connector 614, such as the device side 622, and the device 618 may comprise material capable of being attracted by a magnet. In an example, the device 618 may have an iron plate attached to the area proximate to a device port of the device 618 that may attract magnetic material 620.

The magnetic field created due to magnetic element 620 may be due to a permanent magnet. In an example, the magnetic field may be due to a material having natural magnetic properties. In an alternate embodiment, the magnetic properties associated with the magnetic element 620 may be artificially created. In an example, the magnetic element 620 may be an electromagnet.

Referring to FIG. 7B, a view of the cable system showing the device connector 614 disengaged from the device 618 depicts the magnet 620 magnetically attached to the device 618 but separated from the device connector 614. Alternatively, the magnetic element 620 may be magnetically separable from both the device connector 614 and the device 618. To ensure that after disengagement the magnetic element 620 remains magnetically connected to either the device connector 614 or the device 618, the force of magnetic connection to one of the device connector 614 and the device 618 may be greater than the force of magnetic connection to the other of the device 618 and the device connector 614.

Figure 8:
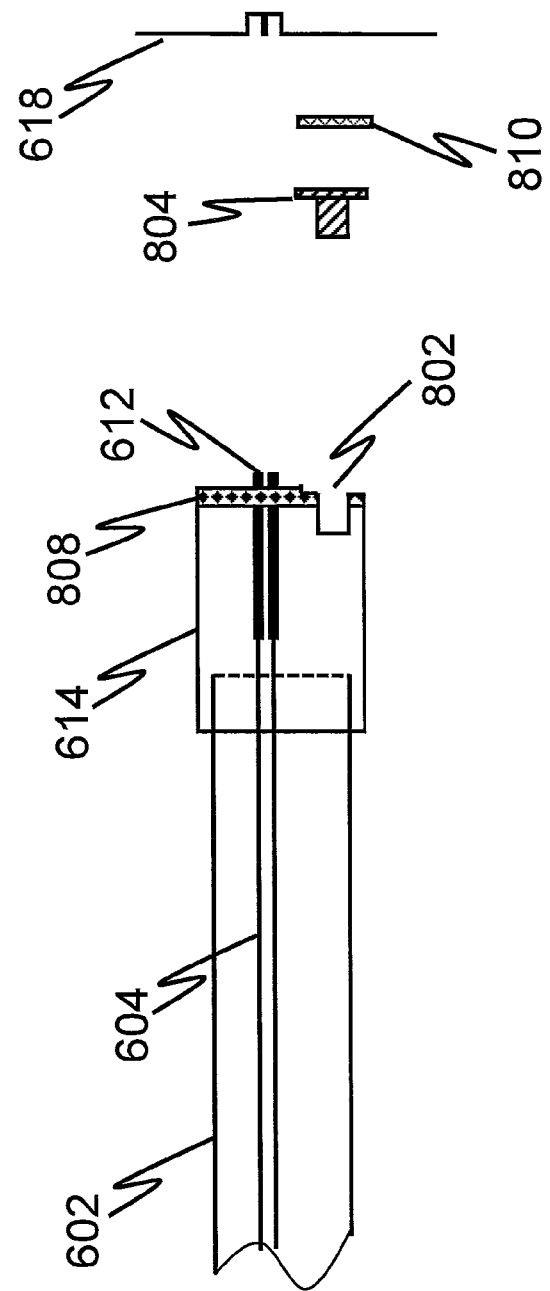
FIG. 8 depicts an alternate embodiment of the connector system of FIG. 6 including double-sided adhesive.

FIG. 8 depicts an embodiment of the cable system of FIG. 6 adapted to provide mechanical and magnetic connection between a magnetic element and a device connector, and further including double-sided adhesive to facilitate mating the magnetic element to the device. In particular, the magnetic element 804 may be provided with a shape suitable for associating or mating with a receptacle feature 802 of the device connector 614. In the example of FIG. 8, the magnetic element 620 may be provided with a protrusion or projection. In another embodiment, the magnetic element 804 may be provided with one or more depressions or a groove that may align with bumps or tabs on the device connector 614. It may be noted that the magnetic element 804 may be designed in accordance with the shape of the receptacle feature 802 to which it may be associated.

Further, the magnetic element 804 may be magnetically connected to a portion of the device connector 614. In the embodiment of FIG. 8, a portion of the device connector 614 that may facilitate magnetic connection to the magnetic element 804 may be a metal plate 802. The metal plate 802 may be affixed to the device side of the device connector 614. The resulting magnetic connection of the magnetic element 804 to the device connector 614 may cover only a portion of the magnetic plate 802 and/or only a portion of the magnetic material 804. FIG. 8 further depicts an adhesive element 622 that may be adapted to associate with the magnetic element 620. In an example, the adhesive element 622 may be shaped with a projection such that it easily glides inside the depression provided in the magnetic element 620.

Further in the embodiment depicted in FIG. 8, a double-sided adhesive element 810 may be attached to a first side of the magnetic element 804 so that at least a second side of the magnetic element 804 is uncovered to facilitate magnetic connection. A side of the double-sided adhesive element 810 that is opposite of the side attached to the magnetic element 804 may be exposed to facilitate attachment to the device 618.

Referring to FIG. 9A, a mechanical coupling formed between the device connector 614 and the device 618 using the magnetic element 804 and adhesive element 810 is depicted. The magnetic field created due to the magnetic element 804 may provide a mechanical association with the device connector 614 at one end. Similarly, the adhesion force provided by the double-sided adhesive element 810 may provide a connection between the magnetic element 804 and the device 618 and therefore device connector 614 and pins 612 may mechanically mate to device 618 to facilitate transmission of data between the cable 602 and the device 618.

FIG. 9A may also depict a method of attaching the exposed side of the adhesive element 810 to the device 618. To achieve this, the magnetic element 804 may be mated with the device connector 614. The double-sided adhesive element 810 may then be pressed onto the magnetic element 804, exposing an adhesive side of the adhesive element 810. The device connector 614 may be pressed onto a data port of the device 618, such that the exposed adhesive side of the adhesive element 810 adheres to at least one of the device 618 and the device data port.

Referring to FIG. 9B, a view of the cable system showing the device connector 614 disengaged from the device 618 depicts the magnet 804 attached to the device 618 through the double-sided adhesive element 810 and separated from the device connector 614. To ensure that after disengagement the magnetic element 804 remains connected to the device 618, the force of magnetic connection to the device connector 614 may be less than the adhesive force provided by the double-sided adhesive element 810.

The process of disengaging the device connector 614 from the device 618 with a force sufficient to break the magnetic connection may result in the double-sided adhesive element 810 maintaining its connection between the magnetic element 804 and the device 618 or the device data port. As a result, an intensified and improved electrical connection may be established for electrical/data/communication elements such as cables, data ports, USB ports, and other types of connection elements The magnetic field created due to magnetic element 804 may be due to a permanent magnet. In an example, the magnetic field may be due to a material having natural magnetic properties. In an alternate embodiment, the magnetic properties associated with the magnetic element 804 may be artificially created. In an example, the magnetic element 804 may be an electromagnet.

The metal plate 808 may be a metal strip such as a strip of steel or iron.

Figure 10:
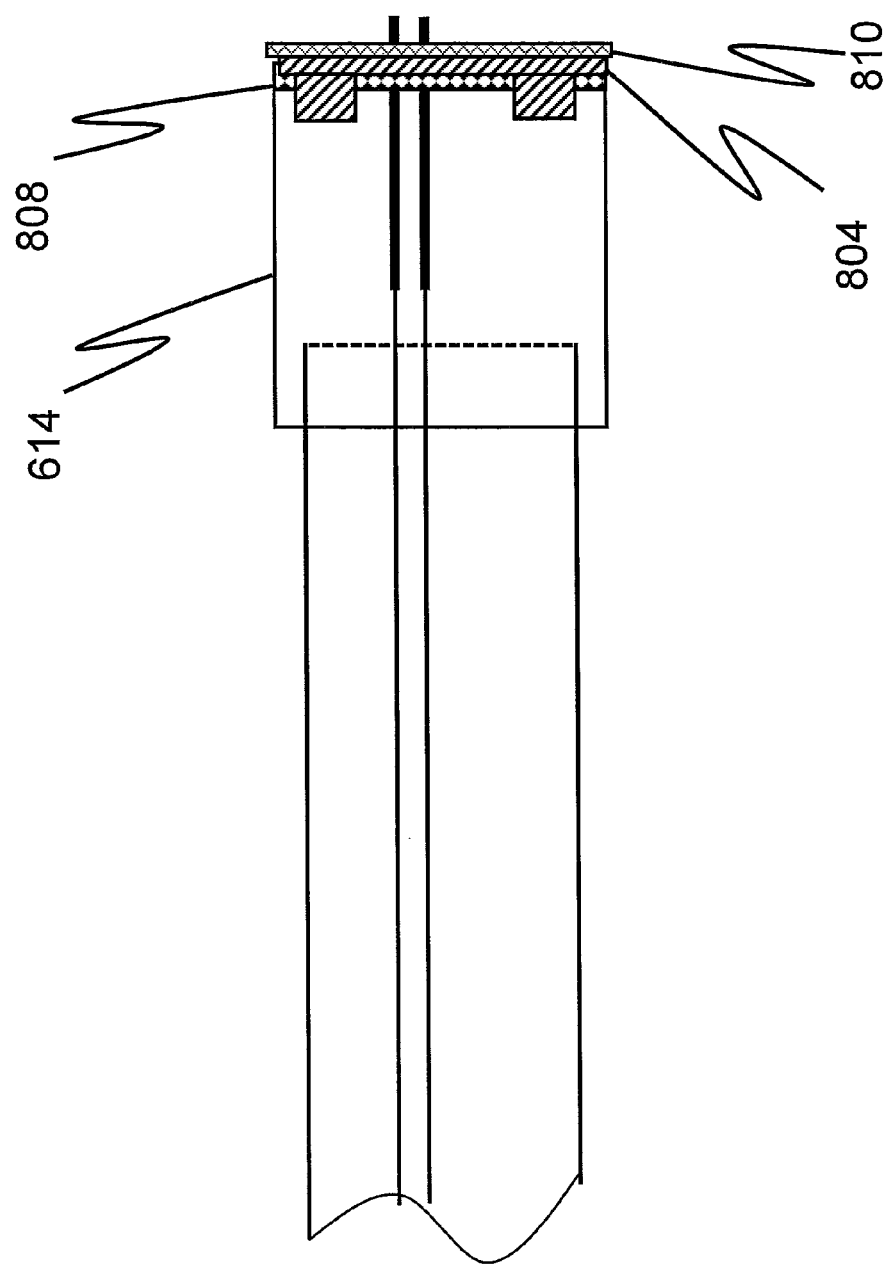
FIG. 10 depicts an alternate embodiment of the connector system of FIG. 9A including an expanded magnetic element and adhesive.

In the embodiment of FIG. 10, the magnetic element 804 and the adhesive element 810 may cover substantially the entire device side of the device connector 614.

The double-sided adhesive element may be adhesive tape, pressure activated glue and the like. The double-sided adhesive element may be constructed from foam tape comparable to double coated urethane foam tapes such as the 4000 series tapes from 3M. The double-sided adhesive element may include properties such as those associated with VHB Acrylic Foam Tape from 3M that may be pressure sensitive adhesive tapes for bonding metals and other high surface energy materials. Comparable foam tapes may include excellent temperature resistance and may be painted after bonding items. The double-sided adhesive element may be a general purpose acrylic with a closed cell acrylic foam carrier and may range in thickness from approximately 1.1 mm to approximately 1.5 mm, although thinner and thicker tape may be used. Tape color may be white, black, dark gray, or any other color. The double-sided adhesive element may be constructed from foam tape that is provided in a reel with a peel away backing.

Figure 11:
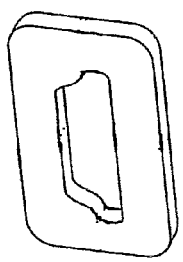
FIG. 11 depicts a die cut embodiment of a double-sided adhesive element.

FIG. 11 depicts an embodiment of the double-sided adhesive element that may be die cut to a shape similar to the magnetic plate for the HDMI receptacle depicted in FIG. 4

Figure 12:
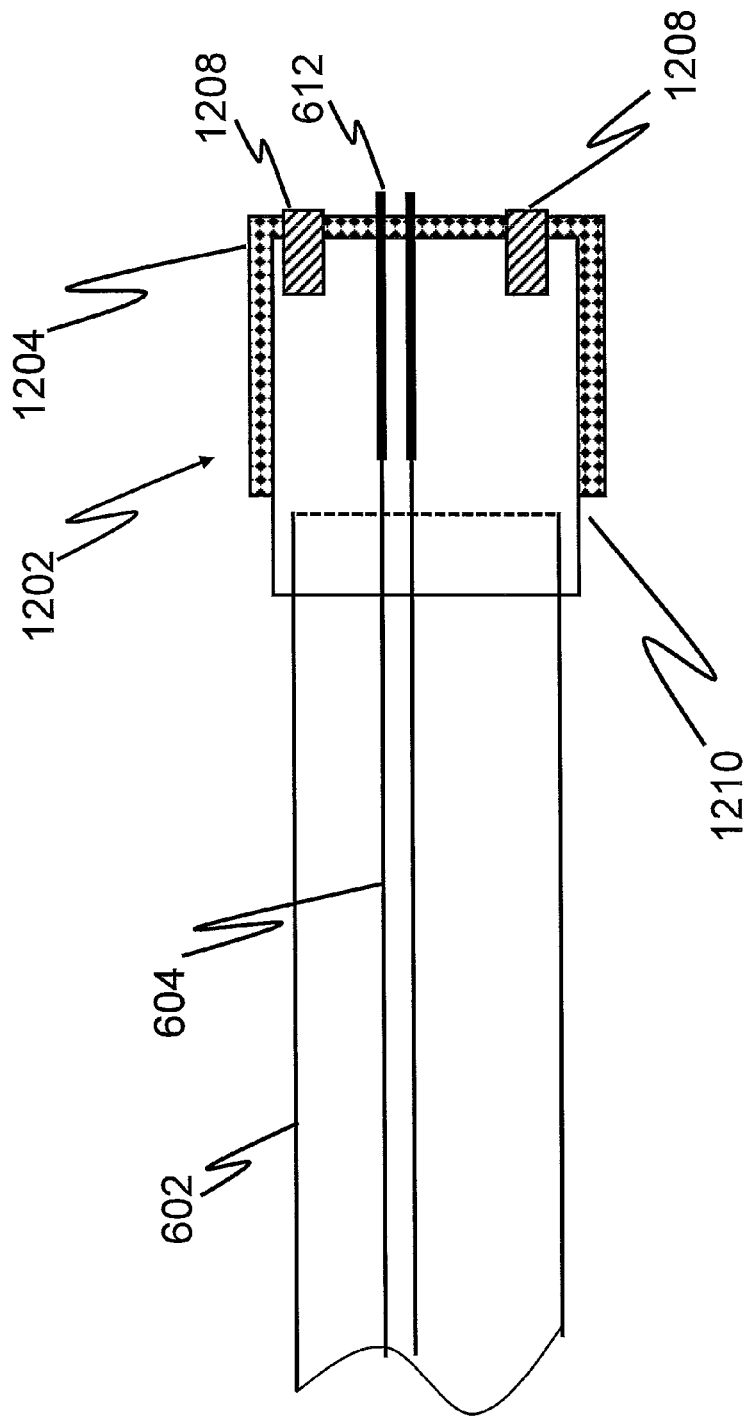
FIG. 12 depicts a connector system with a slidable cover.
Figure 13:
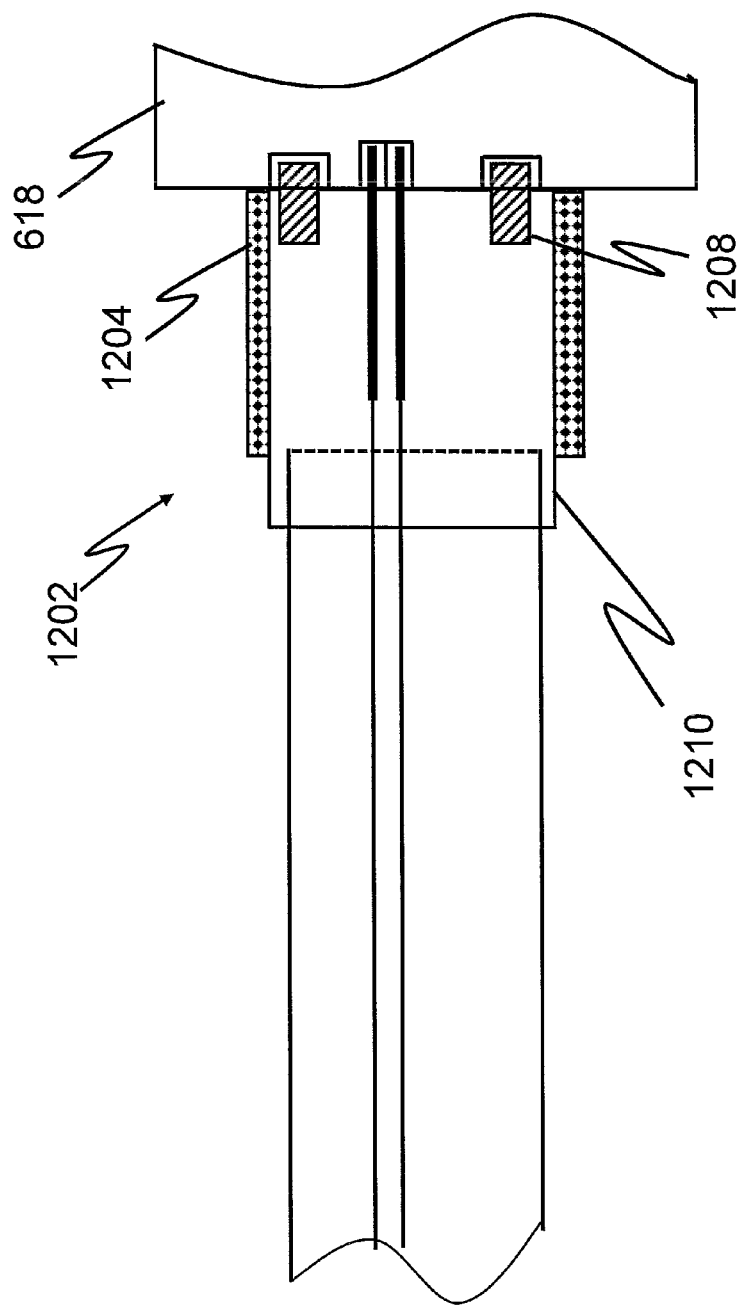
FIG. 13 depicts the connector system of FIG. 12 mated to a device.

FIGS. 12 and 13 depict the cable system of FIG. 6 with a device connector adapted to include a slidable housing that varies the exposure of the pins and/or a mechanical attachment feature of the device connector to enable an improved electrical and/or mechanical connection of the device connector to a device.

FIG. 12 includes the cable 602 and the cable wires 604 attached to device connector 1202 and pins 612 as depicted and described in the text associated with FIG. 6. The embodiment of FIG. 12 also may include device connector 1202 which may include a slidable housing 1204 and device mechanical attachment features 1208. The slidable housing 1204 may facilitate exposing pins 612 and/or attachment feature 1208 to facilitate an improved electrical and/or mechanical connection to a device data port. The slidable housing 1204 may normally remain in the extended position shown in FIG. 12 through the use of a spring type element exerts a small force between the device connector body 1210 and the slidable housing 1204.

FIG. 13 depicts how a force applied counter to the spring type element (not shown) may allow the slidable housing 1204 to retract relative to the pins 612 and/or the mechanical attachment features 1208. Such a force may be provided manually, such as by a user restraining the device connector body 1210 and pushing the slidable housing 1204 substantially in line with the pins 612. Alternatively, such a force may be provided as a result of the device connector 1202 being mated to a device.

Figure 14:
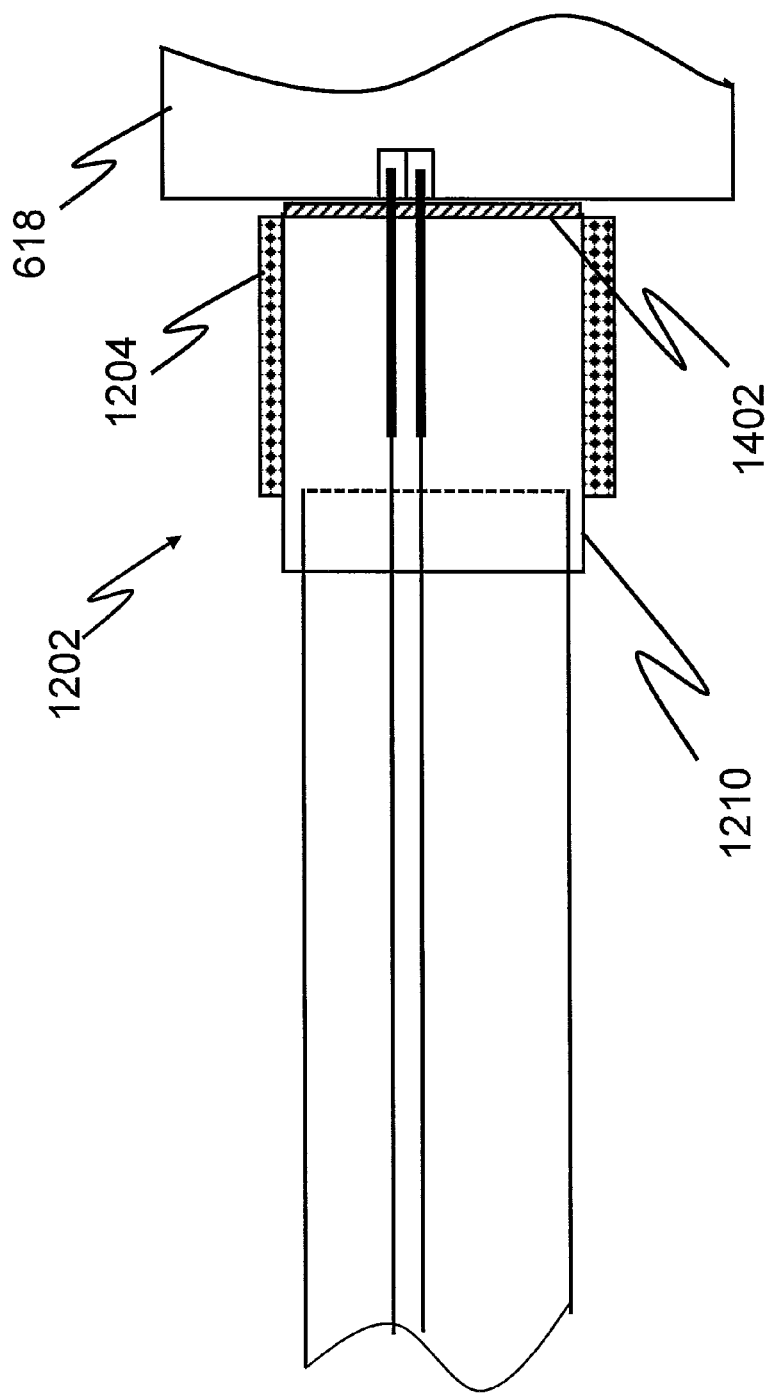
FIG. 14 depicts the connector system of FIG. 13 with a magnetic element.

FIG. 14 depicts an alternate embodiment of the system of FIGS. 12 and 13 adapted to include a magnetic element to provide mechanical connection between the device connector and the device. In the embodiment of FIG. 14, the slidable housing 1204 has been retracted to expose the pins. Magnetic element 1402 may be magnetically attached to device connector 1202 as described in the text associated with FIGS. 6 through 7B. Consequently, when slidable housing 1204 is retracted, magnetic element 1402 may be exposed to facilitate robust connection to the device 118. Alternatively magnetic element 1402 may be magnetically or mechanically connected to slidable housing 1204 using magnetic, adhesive, or other techniques described herein and elsewhere.

Figure 15:
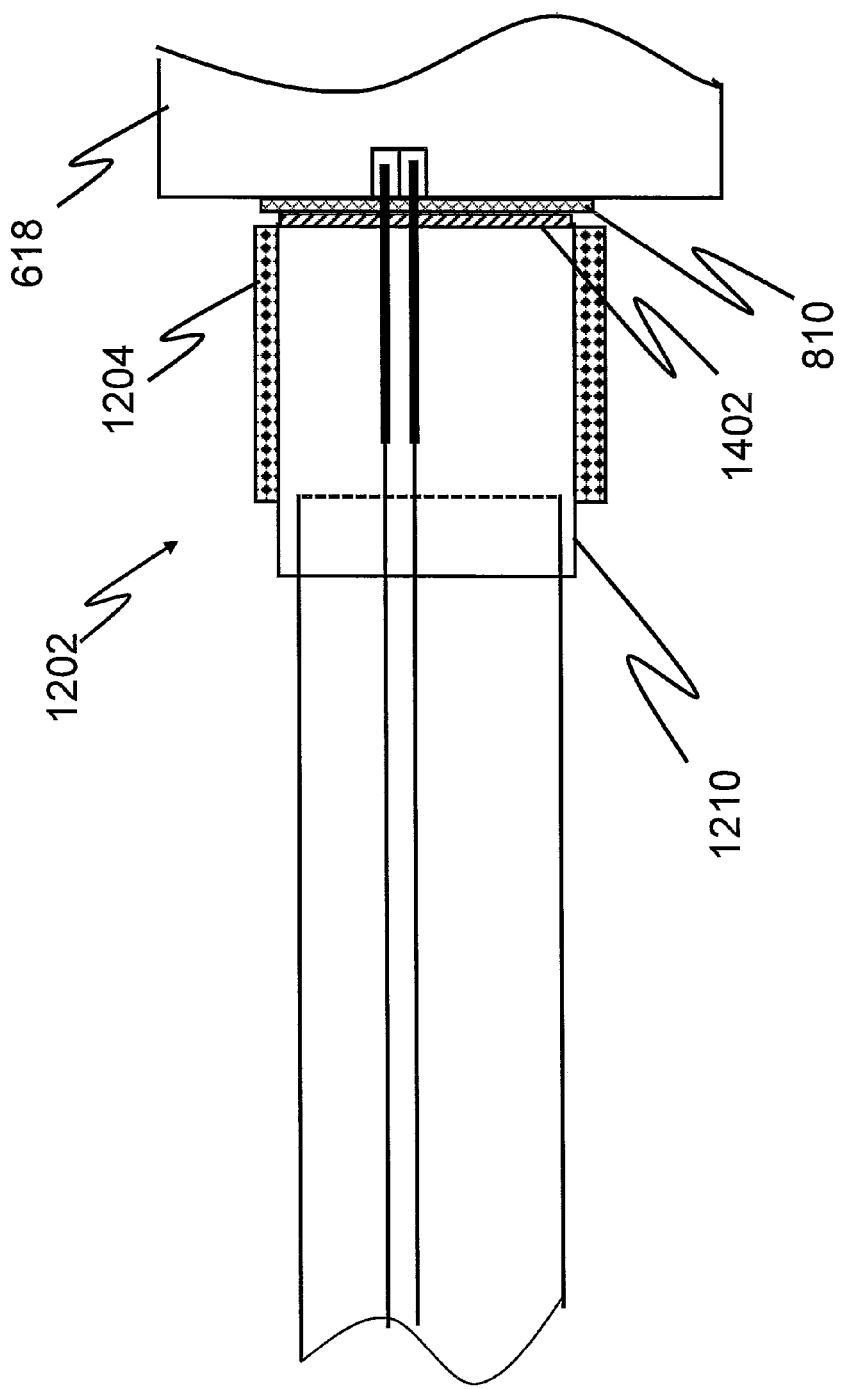
FIG. 15 depicts the connector system of FIG. 12 with a double-sided adhesive element.

Referring to FIG. 15, in yet another alternative embodiment of the system of FIG. 14, magnetic element 1402 may be adhered to device 618 using a double-sided magnetic adhesive element 810 as depicted and described in text associated with FIGS. 8 through 10.

In an embodiment, a magnetic connector, such as an HDMI magnetic connector, may be able to accommodate variations found in component devices. The accommodating magnetic connector may comprise a sliding sleeve that allows the magnets to move and fill any gap between the end of the connector and a device. There may be several advantages associated with the adjustable magnet approach. For example, the adjustable magnet approach enables adjusting the distance between opposing magnets, or magnets and one or more opposing metallic plates, to ensure surface contact and lack of an air gap. In another example, when the magnet package is in the mated position, the sleeve may overlap the opposing magnet, or plate, and provide a return path for the magnetic field lines that bridge the seam between the two sides. In yet another example, even without considering the magnetic retention force, the metal sleeve may fill the gap between the connector and the device, reducing the lever arm and the amount of torque on the connector. Furthermore, the sleeve may enclose the opposing side of the magnet assembly and may help even more to reduce the connector's deflection from torque. The component device may include the magnetic connector with the sliding sleeve. The sliding component may not actually be a magnet, but may have magnetic properties, and may mate with a magnet.

The sliding component may be part of the cable or part of the port to which the cable may be mated. The sliding component may or may not be magnetic or have magnetic properties. The port or cable, as applicable, with which the sliding component mates may or may not be magnetic or have magnetic properties. The gap adjustment may be used with or without a magnet. The gap adjustment may improve the fit and create a tighter connection between a cable and a port. The addition of a magnet or magnetic properties may serve to increase the strength of the connection. The pins located within an HDMI port may vary by as much as 4 mm and the gap adjustment property of the cable and/or port may allow for a tighter connection than in the absence of the gap adjustment property.

Figure 16:
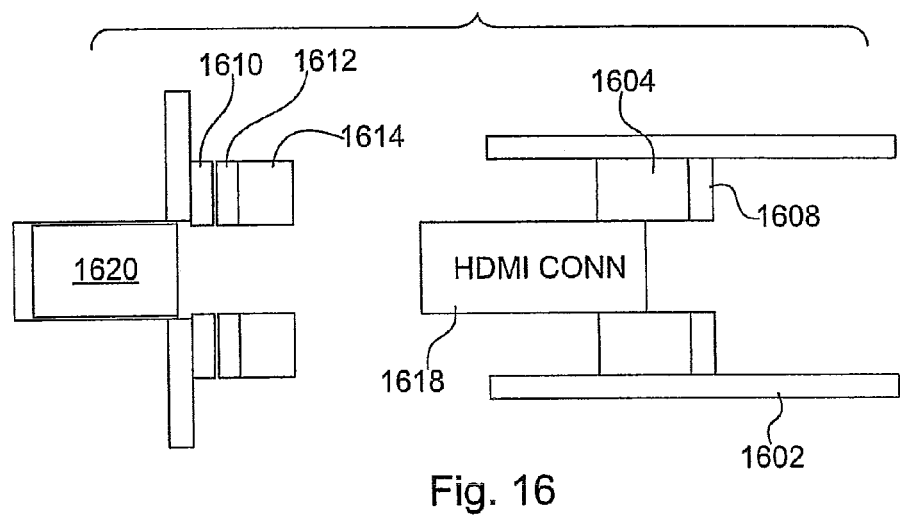
FIG. 16 depicts a sliding sleeve with magnetic engagement.

Referring to FIG. 16, an embodiment of a sliding sleeve with magnetic engagement is depicted. In this embodiment, the sleeve 1602, magnet 1604, and back plate 1608 move together over an HDMI connector 1618. The sleeve 1602 and back plate 1608 may comprise a ferromagnetic material, such as 1010 steel. The connection port 1620 may be fitted, either retro-fitted or integrally fitted, with a magnetic material. The component side connection may comprise an adhesive 1610, such as a VHB adhesive, a back plate 1612, and a magnet 1614. The back plate 1612 may comprise a ferromagnetic material. The HDMI magnetic connector 1618 may integrate a sliding sleeve to a connector which performs at least one of the following functions: 1. Adjust distance for optimum connector engagement, such as by accommodating gaps; 2. Provide torque relief by leveraging on component side stack up; and 3. Provide a return path for the magnetic flux.

Figure 17A:
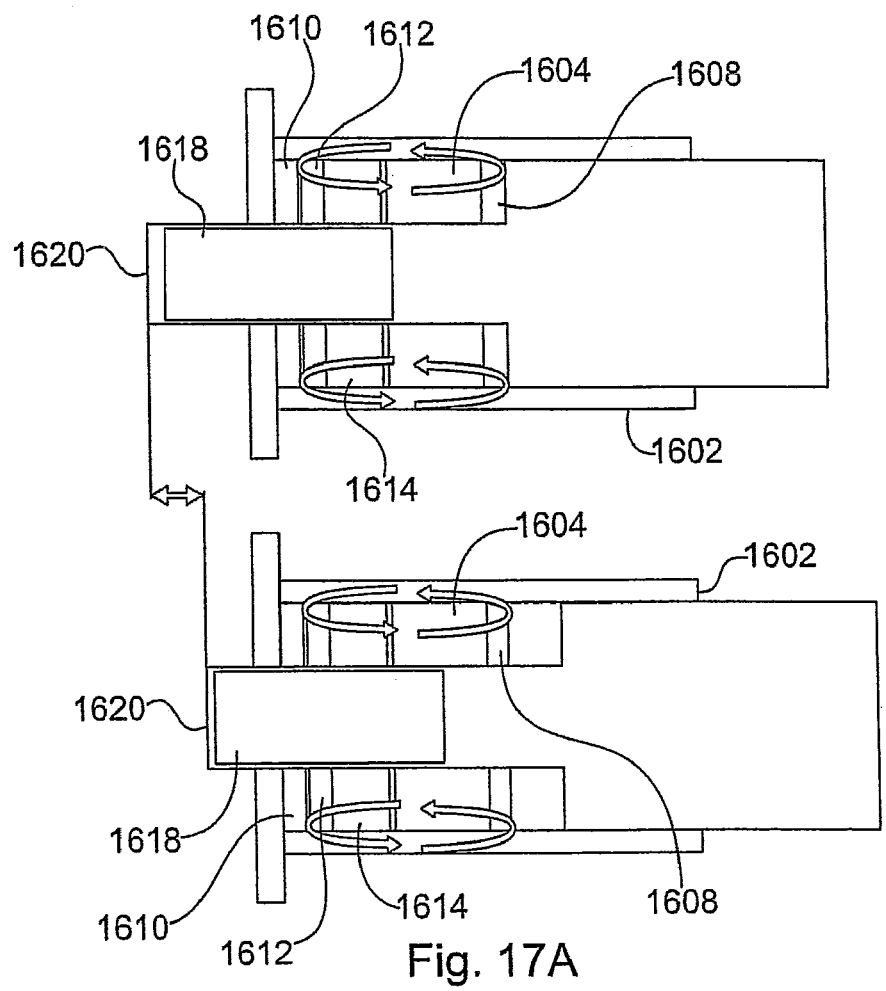
FIG. 17A depicts an embodiment of the sliding sleeve connector with a gapless connection.
Figure 17B:
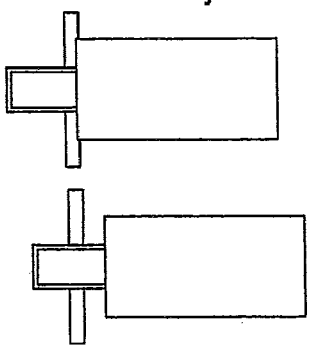
FIG. 17B depicts a prior art connector without a sliding sleeve.

Referring to FIG. 17A, because the sliding sleeve can expose more or less of the connector, the connector engagement may be able to adjust the distance for optimum connector engagement, and in embodiments, make connections without gaps. For example, FIG. 17B depicts a connector without a sliding sleeve connecting to two different component devices, each with a different size connection port. In FIG. 17B, top, the connector is matched in sized with the connection port and there is no gap between the device and the connector. In FIG. 17B, bottom, the depth of the connection port cannot accommodate the length of the connector. Therefore, there is a gap between the device and the base of the connector. In FIG. 17A, the sliding sleeve may enable accommodating a gap so that the connector may be used with various devices. The gap may be of any size, such as up to a 4 mm gap. In FIG. 17A, top, the sleeve remains in a retracted position. In FIG. 17B, bottom, the sleeve is moved forward over the connector to shorten the length of connector exposed. When the connector engages the connection port, no gap is made.

Figure 18:
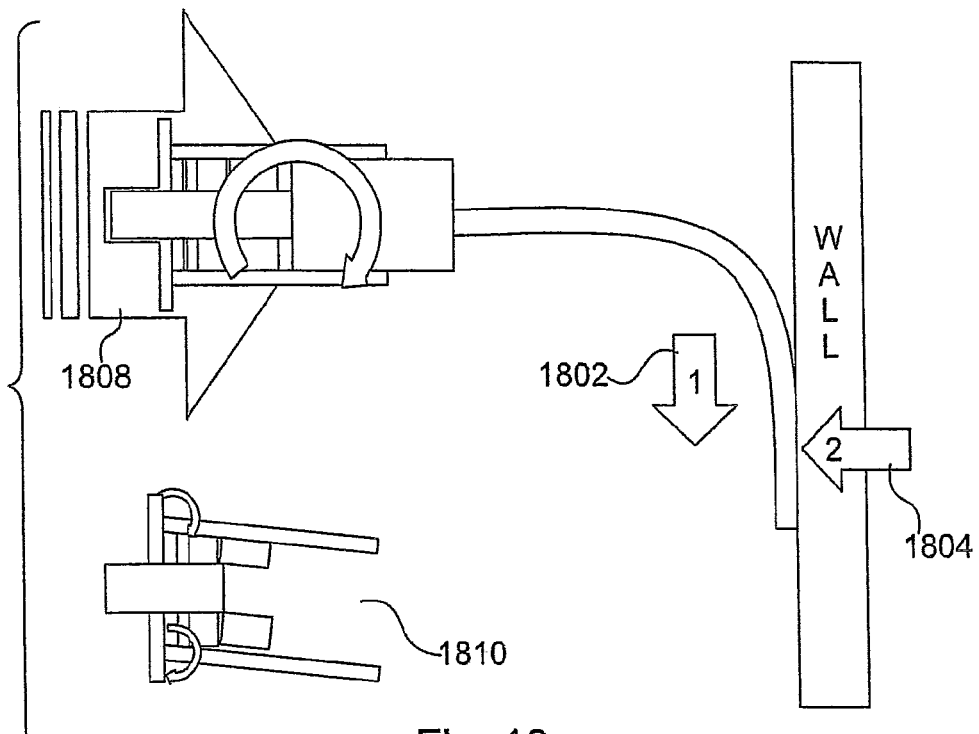
FIG. 18 depicts an application that imparts torque on the connection, and a view of a sliding sleeve connector reducing torque.

Referring to FIG. 18, the metal sleeve may fill the gap between the connector and the device, reducing the lever arm and the amount of torque on the connector. Furthermore, the sleeve may enclose the opposing side of the magnet assembly and may help even more to reduce the connector's deflection from torque. Torque may be experienced by the connector due to loading, such as cable dead hang weight 1802, wall-induced torque 1804, and pre-load 1808. View 1810 depicts how flexibility of the sleeve and contents may transfer the torque away from the connector to the component stack (which may include the adhesive, plate and magnet) to the component wall.

Figure 19:
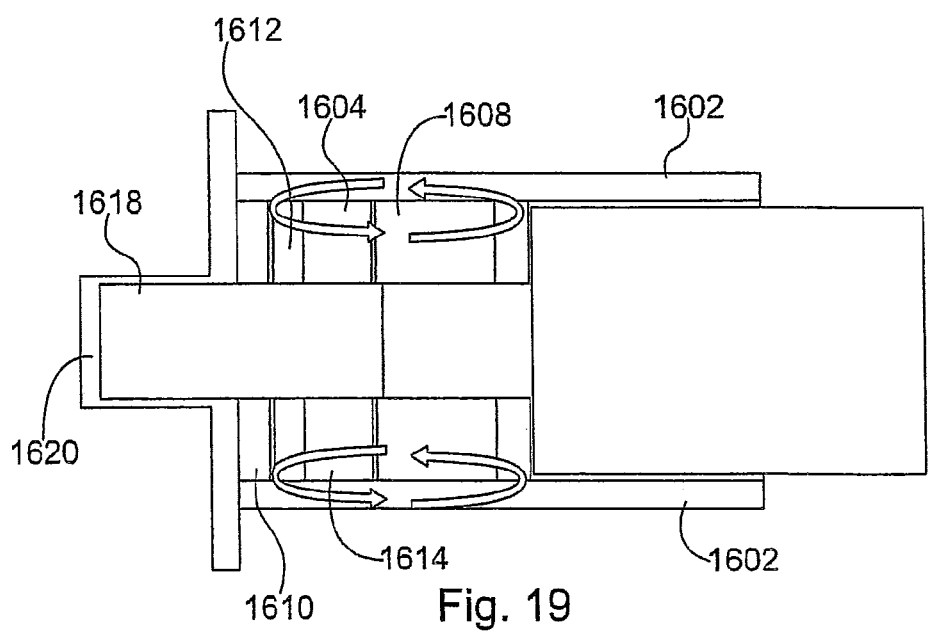
FIG. 19 depicts an embodiment of the sliding sleeve connector with a flux return path.

Referring to FIG. 19, the sleeve may provide a flux return path 8002. When the magnet package is in the mated position, the sleeve may overlap the opposing magnet, or plate, and provide a return path for the magnetic field lines that bridge the seam between the two sides. The connector may include an adhesive, ferromagnetic backing and a magnet.

Figure 20:
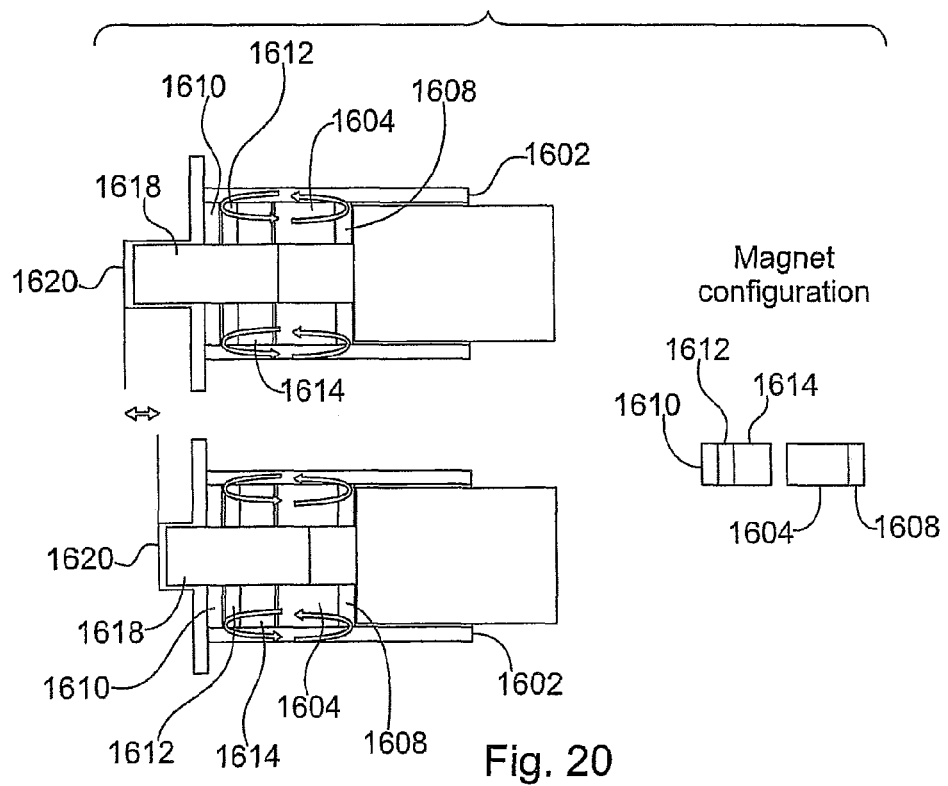
FIG. 20 depicts a configuration of a sliding sleeve connector and the corresponding connection port.
Figure 21:
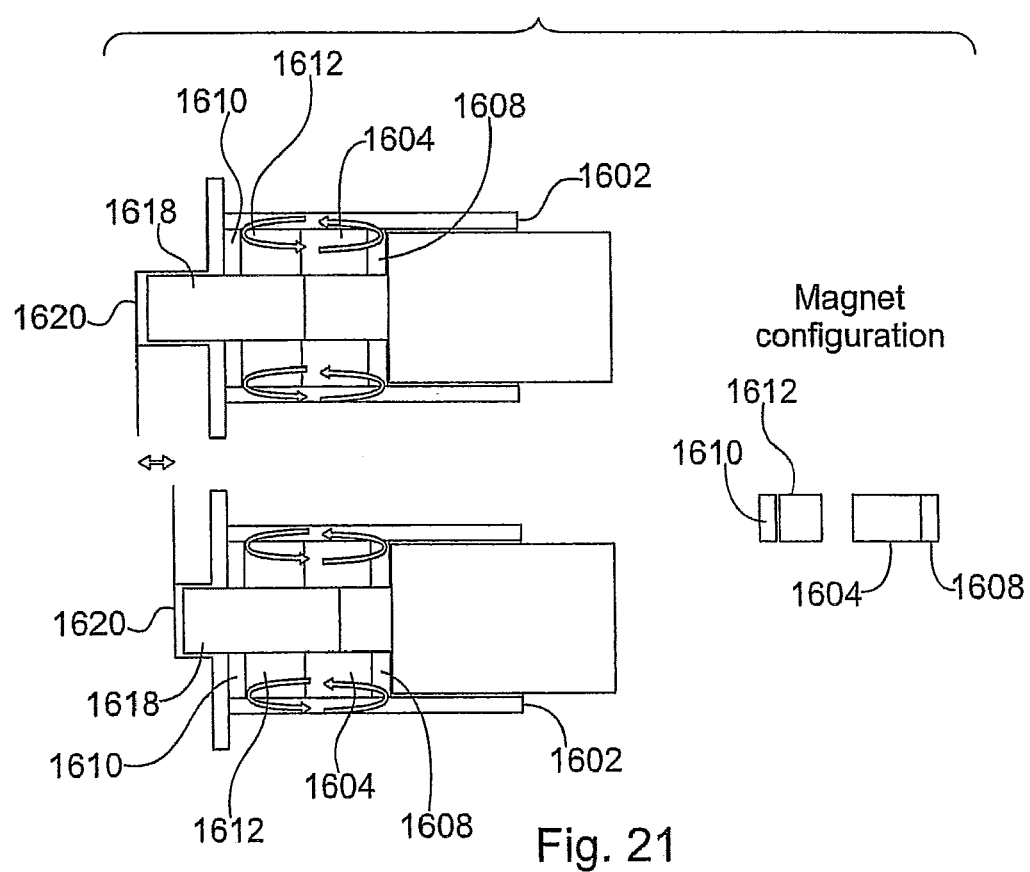
FIG. 21 depicts a configuration of a sliding sleeve connector and the corresponding connection port.

FIGS. 20 and 21 depict two configurations of sliding sleeve connectors and the corresponding connection port. In FIG. 20, the configuration left to right from connection port to connector may be adhesive 1610, back plate 1612, and magnet 1614 on the connection port, then magnet 1604 and back plate 1608 on the connector. In FIG. 21, the connection port has no magnet, so the configuration left to right from connection port to connector may be adhesive 1610 and back plate 1612 on the connection port, then magnet 1604 and back plate 1608 on the connector. The adhesive may be a VHB adhesive. The back plate may be ferromagnetic.

Figure 22:
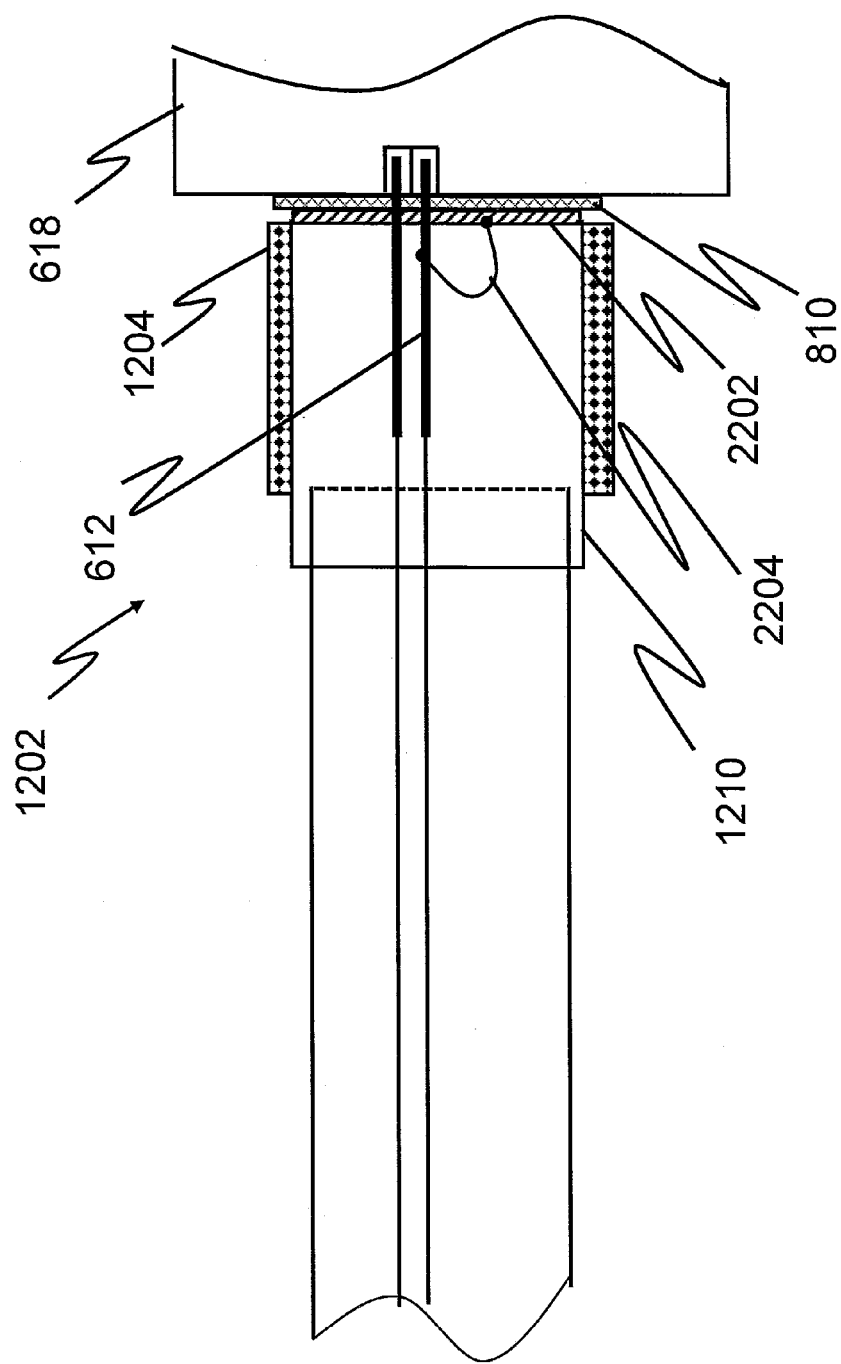
FIG. 22 depicts an electromagnetic element included with a cable connector system.

FIG. 22 depicts an alternate embodiment of the system of FIG. 15 wherein an electromagnetic element that is energized through a pin of the device connector replaces the magnetic element. In embodiments, instead of being magnetic as described herein, the connector and/or port may be electromagnetic or combination of electromagnetic and magnetic. Further, the electromagnet may be powered off the line. Further, in an embodiment, the electromagnet may be powered by electricity flowing through the cable. In an example of this embodiment, the electromagnet may be used to restore or increase the strength of an existing magnet. In another example of this embodiment, the electromagnet may contain a magnetic core that maintains magnetic properties when the electromagnet is not powered.

As depicted in FIG. 22, an electromagnetic element 2202 may be positioned to facilitate mechanical connection of the device connector 1202 and the device 618. The electromagnetic element 2202 may be powered through an electromagnet connection 2204 within the device connector 1202. The electromagnet connection 2204 may connect the electromagnetic element 2202 to one of the pins 612. Energy to power the electromagnetic element 2202 may be provided by the device 618 through a pin 612 that is dedicated to providing the electromagnet power. The pin 612 that provides electromagnet power may be connected to a wire within the cable to provide the electromagnet power to one or more other devices connected to the cable. In addition to the device 618 providing electromagnetic power, one of the other devices connected to the cable may alternatively be the source of the electromagnet power. Alternatively, electromagnet power pin 612 may not provide any connection to the cable within the device connector 1202, so that the electromagnetic power is provided from the device 618 to a pin 612 through the electromagnet connection 618 to the electromagnetic element 2202.

Wires, connections, and pins providing the electromagnetic power may be properly shielded to suppress creation of a magnetic field when electrical current flows to the electromagnetic element 2202. The electromagnetic element 2202 may be shielded to suppress interference with the data or other signals in the cable.

FIG. 22 also depicts optional configurations of the cable system as described herein including a slidable device connector housing, double-sided adhesive, and the like. The electromagnetic element and electromagnetic power sourcing as herein described may be substituted for the magnetic element in all other cable system configurations described herein with respect to FIGS. 6 through 15 and elsewhere. The cable connector system of FIG. 22 may be integrated with elements such as resilient pin support material, a pin alignment platform, a pin alignment layer, magnetic elements, slidable housing, removable magnetic elements, adhesive applied magnetic elements, magnetically attractive elements, and the like as described in the embodiments of FIGS. 6-15 and FIGS. 28 and 29. The materials and the configurations of the materials, connectors, device connectors, pins, cables, devices, device ports, and the like may be applied to a cable connector system that also includes resilient pin support material, a pin alignment platform, a pin alignment layer, and the like. Any combination of the materials and configurations of cable connector system herein described are included in the scope of this disclosure. Therefore, as a non-limiting example of a combination, a cable connector system may include a cable connected to pins that are supported by a resilient material and are aligned by an alignment platform all of which is housed in a device connector with a slidable housing and is magnetically attachable to a device through a magnetically attractable element that is secured to the device by double-sided adhesive tape and an electromagnetic element powered through the device connector.

Electromagnetic simulations of the function of the sliding sleeve design may be performed to define the optimized configurations of the device. One of the goals of electromagnetic simulation may be to maximize the retention (attraction) force and resistance to torque of the connector retention system. Based on an electromagnetic simulation analysis, the following conclusions may be made: 1) Optimal performance may be obtained by adding some ferromagnetic shims between the cup and the permanent magnet of the attraction device and by reducing the height of the permanent magnet by a similar amount; 2) A permanent magnet may be substituted with a ferromagnetic plate with little or no loss of attractive force. Additionally, this may be cheaper and easier to manufacture; 3) The torque requirement may be achieved with mechanical help, such as with a sleeve sliding over a permanent magnet array. The permanent magnet array may provide the desired retention force; and 4) a substantial gain could be achieved by increasing the total thickness of the attraction device while reducing the plug by the same amount.

Figure 23:
FIG. 23 depicts a table reporting the force, in Newtons, for four different configurations of sliding sleeve.

Referring to FIGS. 23 and 24, a table 2300 and a table 2400 are shown reporting the force, in Newtons, for four different configurations of sliding sleeve. Using the baseline, as in FIG. 24 as a basis for comparison, the primary differences are: the sleeve is not ferromagnetic in configuration #2, the attraction plate comprises 1010 steel rather than N50 in configuration #3, and there is a shim in configuration #4. Referring to FIGS. 23 and 24, the configuration with the lowest force is configuration #2 where there is no sleeve and there are slight improvements over the base configuration with the modifications made in configuration 3, where the cup to permanent magnet ratio is changed, and configuration 4, where the attraction device is all ferromagnetic.

Figure 25:
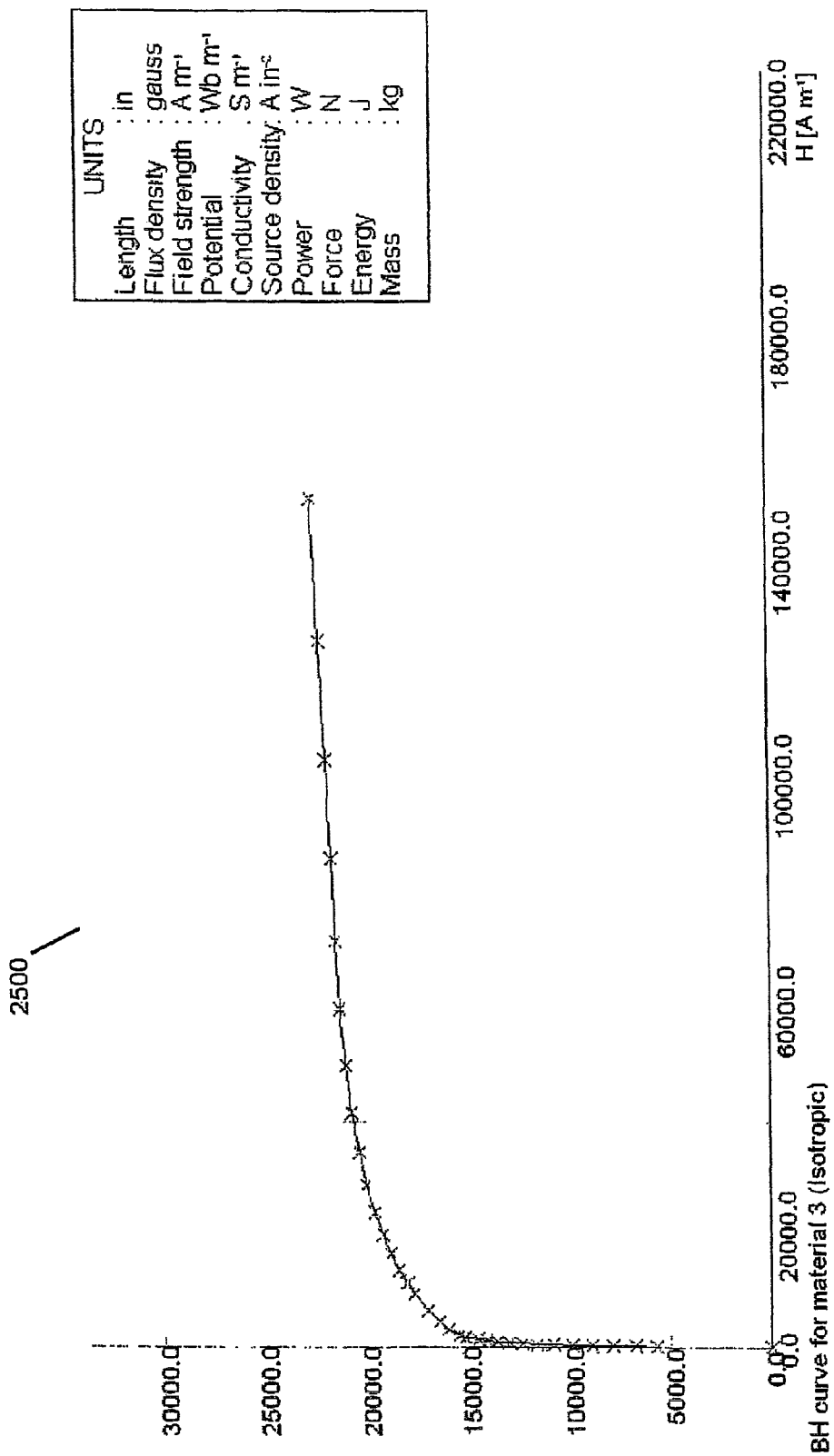
FIG. 25 depicts a BH graph for the case where the plate and sleeve material is AISI 1010 steel.

Referring to FIG. 25, a BH graph 2500 is shown where a measurement of the magnetic field, or flux density, in Gauss units (B) is plotted along the y-axis against magnetic field intensity in oersted units (H, Am−1) is made for the case where the plate and sleeve material is AISI 1010 steel.

Figure 26:
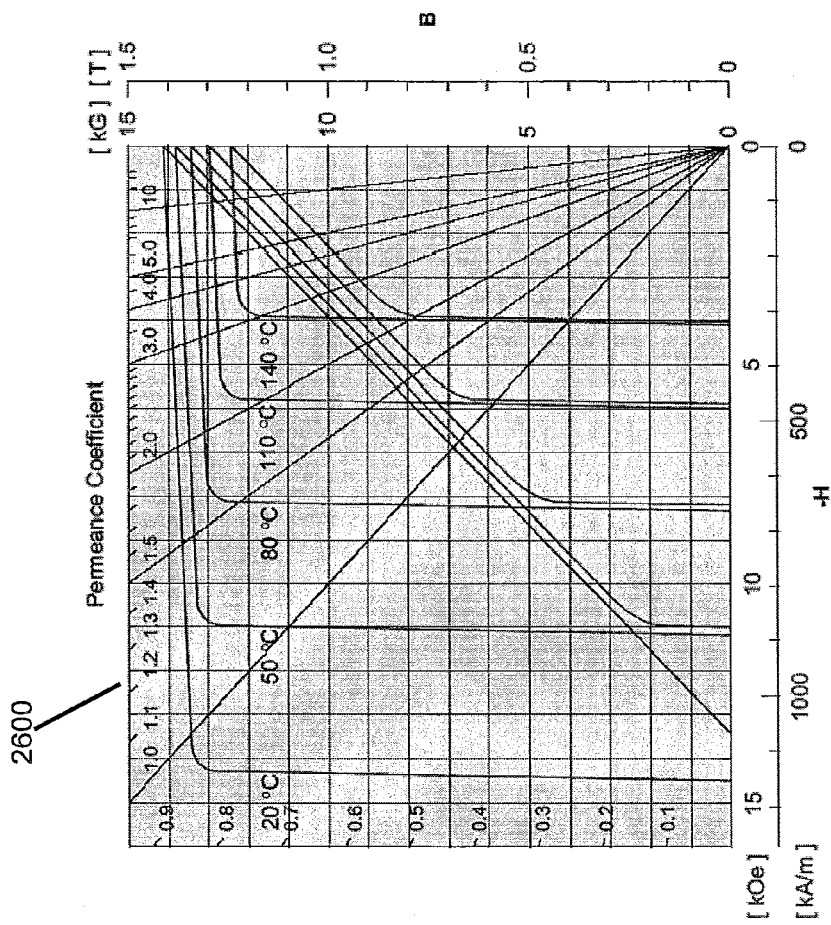
FIG. 26 depicts a BH graph for the case where the magnetic material is N50.

Referring to FIG. 26, a BH graph 2600 is shown where a measurement of the magnetic field, or flux density, in Gauss units (B) is plotted along the y-axis against magnetic field intensity in oersted units (H, Am−1) is made for the case where the magnetic material is N50. The magnet is an Nd—Fe—B magnet. On this graph, demagnetization curves at elevated temperatures are depicted.

Referring to FIG. 27, a summary of the materials analysis data shown in the graphs of FIGS. 25 and 26 is shown. For both AISI 1010 and N50, density ($\rho$[kg/m$^3$]), Young's modulus (Y [N/mm$^2$]), Poisson's ratio ($\nu$), yield strength ($\sigma_y$ [MPa]), ultimate strength ($\sigma_u$ [MPa]), coefficient of thermal expansion (CTE [μm/mK]), thermal conductivity ($\lambda$[W/mK]), and specific heat ($C_p$ [J/kg K]).

Figure 28:
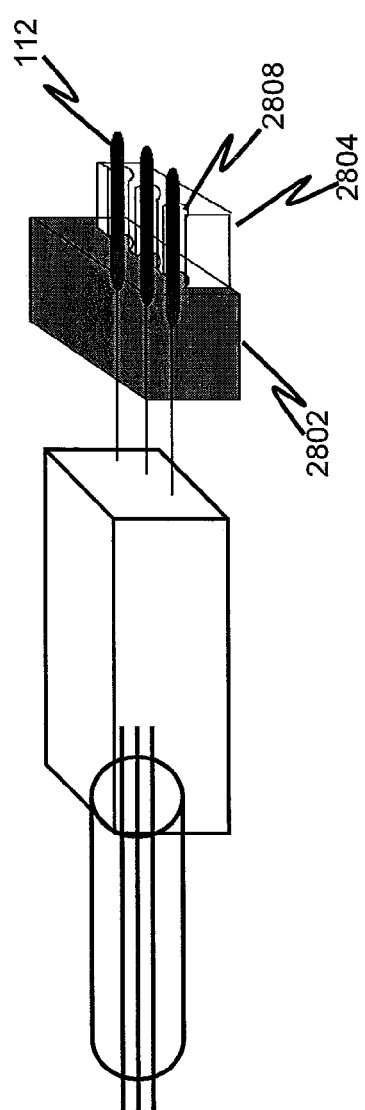
FIG. 28 depicts a device cable connector with a flexible tip and a pin alignment platform.
Figure 29:
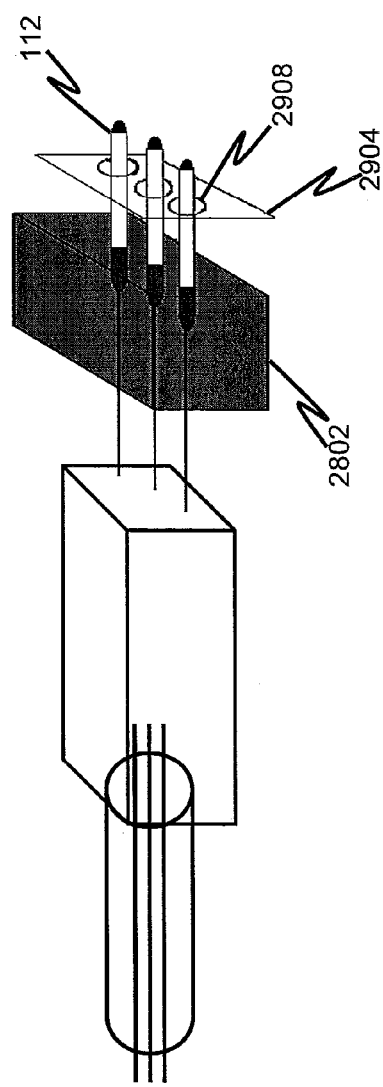
FIG. 29 depicts a device cable connector with a flexible tip with a pin alignment layer.

FIGS. 28 and 29 depict a device cable connector that includes a resilient material supporting the pins so that the pins can move a small amount to allow for easier connection to a device. The pins may be aligned by a platform through which the pins extend, further providing support and limiting the range of freedom of the pin movement. Alternatively, the pins may be aligned by a layer through which the pins protrude, so that the pins can move within the confines of openings in the layer. The resilient material may reduce the possibility of the cable tip or pins breaking through accidental or sudden jerking motions, such as a cable being tugged at an angle. By situating the tip in a flexible material the cable connector may be less likely to snap, break or otherwise be damaged through any accidental motion.

The one or more data pins 112 may be mounted in a resilient material 2802. Examples of the resilient material 2802 may include silicone rubber, polyurethane elastomer, foam, and other types of resilient materials. The data pins 112 mounted in the resilient material 2802 may allow the data pins 112 to flexibly move a small amount from side to side and generally in any direction within a plane that is parallel to the center of axis of the pin.

Referring to FIG. 28, the device cable connector may be provided with a rigid pin alignment platform 2804. This alignment platform 2804 may be provided with a plurality of guide holes 2808. The guide holes 2808 may facilitate flexible and unhindered movement of the data pins 112. The guide holes 2808 may be shaped and sized such that the data pins 112 may actuate from one side to another, within a predetermined tolerance. For example, the guide holes 2808 may be sized so that the data pins 112 may move at least 0.75 millimeters from one side to another in one of the guide holes 2808.

FIG. 29 depicts a device cable connector with resilient pin support material adapted from the embodiment of FIG. 28. The device cable connector may include a rigid pin alignment layer 2904, as shown in FIG. 29.

The rigid pin alignment layer 2904 may also include a plurality of guide holes 2908 through which the data pins 112 may be aligned. Similarly to the explanation above for guide holes 2808, the guide holes 2908 may be shaped and sized such that the data pins 112 may actuate from one side to another, within a predetermined tolerance.

The cable connector system of FIGS. 28 and 29 may be integrated with elements such as magnetic elements, slidable housing, removable magnetic elements, adhesive applied magnetic elements, magnetically attractive elements, and the like as described in the embodiments of FIGS. 6-15 and FIG. 22. The materials and the configurations of the materials, connectors, device connectors, pins, cables, devices, device ports, and the like may be applied to a cable connector system that also includes resilient pin support material, a pin alignment platform, a pin alignment layer, and the like. Any combination of the materials and configurations of cable connector system herein described are included in the scope of this disclosure. Therefore, as a non-limiting example of a combination, a cable connector system may include a cable connected to pins that are supported by a resilient material and are aligned by an alignment platform all of which is housed in a device connector with a slidable housing and is magnetically attachable to a device by means of a separable magnetic element that may be adhered to the port through a double-sided tape.

Figure 30:
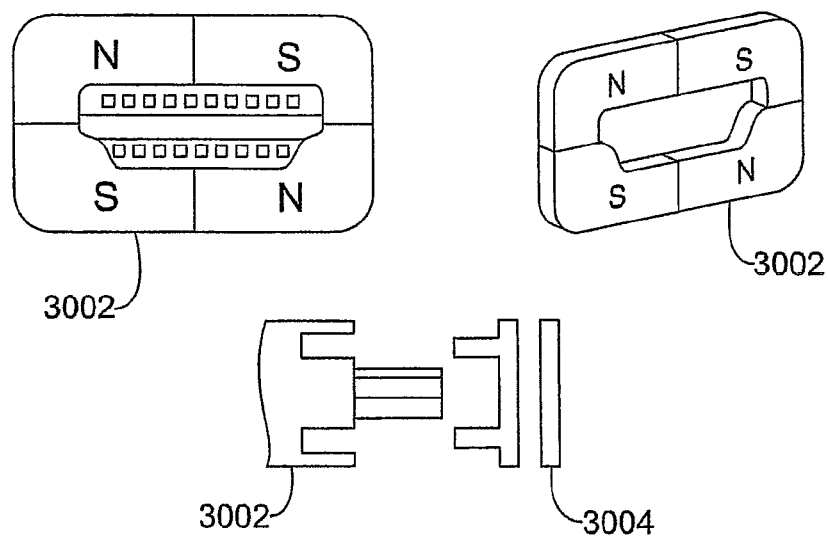
FIG. 30 depicts an exemplary production magnet array in accordance with an embodiment of the present invention.

Referring to FIG. 30, an exemplary production magnet array 3002 is illustrated in accordance with an embodiment of the present invention. The array 3002 includes a set of magnets that may be arranged in a grid like pattern as shown in the figure. The magnets may be arranged in various manners with various configurations of polarity. The magnets used may be customized for type, size, material, shape, and other types of parameters. The magnet array 3002 may be customized to fit or surround the connector on a cable. The magnet array 3002 may be customized to fit or surround a device port. The grid like pattern may facilitate varying, correcting or optimizing the direction of polarity. Subsequently, this may further help in maximizing the available surface area of contact and may increase the magnetic force between the cable connector and the port. The magnet array 3002 may be attached to a cable connector. The magnet array 3002 may be attached to a device port. The cable connector may have magnetic properties. The device port may have magnetic properties.

In embodiments, a shunt plate 3004 may be provided. The shunt plate 3004 may be machined for specific parameters and requirements. The machined shunt plate 3004 may slide into recesses in the connector and/or the magnet array. As shown in FIG. 30, the shunt plate 3004 may slide into recesses in the connector. In embodiments, a magnet array 3002 may be attached to the shunt plate.

Figure 31:
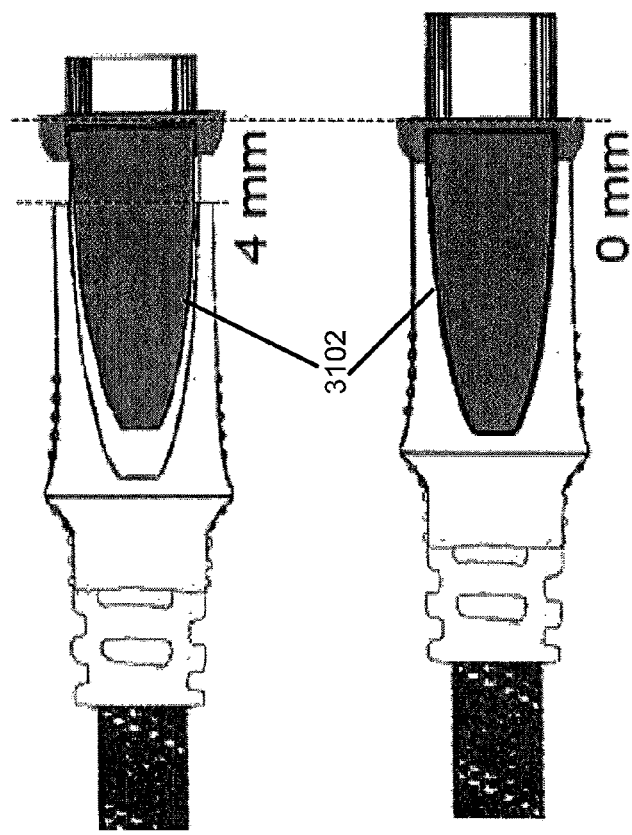
FIG. 31 depicts a movable magnet array in accordance with an embodiment of the present invention.

FIG. 31 depicts a movable magnet array 3102 in accordance with an embodiment of the present invention. The magnet array 3102 may be attached to the cable connector in such a manner that the position of the magnet array can be adjusted. In an embodiment the position of the magnet array 3102 may be varied along an axis parallel to that of the cable connector. In an embodiment the position of the magnet array 3102 may be varied along other axes. As depicted in FIG. 31, the magnet array 3102 may be moved along an axis parallel to the connector a distance of 0 mm to 4 mm. The array 3102 may be moved other distances and along the same, different and/or multiple axes. In order to permit such movement the magnet array may be attached to a jelly-like substance. In other embodiments other means may be used to permit movement of the magnet array. The moveable magnet array 3102 may be attached to a device port instead of a cable connector. The moveable magnet array 3102 may be replaced with a material having magnetic properties, such as a metal or the like.

Figure 32:
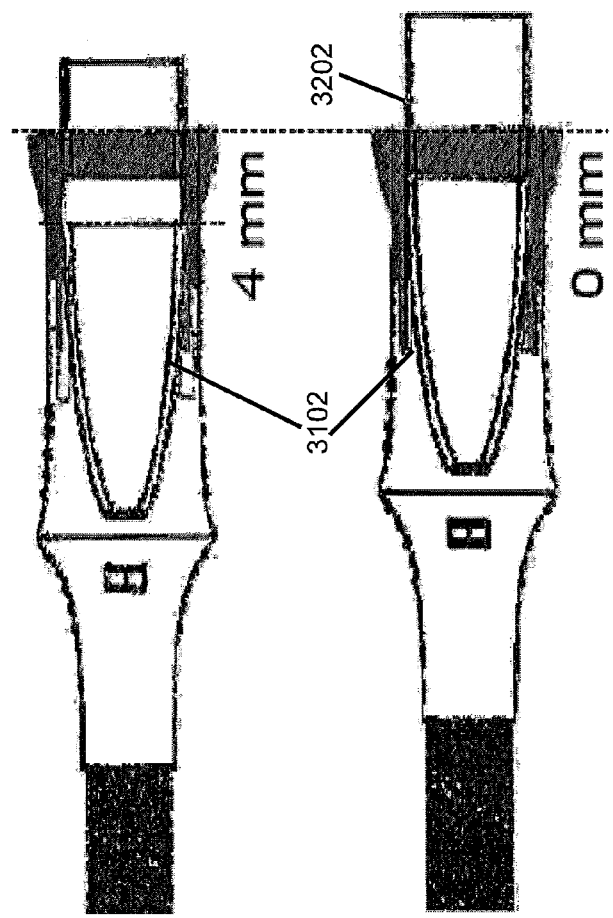
FIG. 32 depicts a movable magnet array in accordance with another embodiment of the present invention.

FIG. 32 depicts movable sides of the magnet array 3102 in accordance with another embodiment of the present invention. Please note that reference will be made to FIG. 31 to describe FIG. 32. As shown in the figure, the sides of the magnet array may move forward to engage the steel plate onto a component of the device. This results in accommodating or filling the existing gap between the cable connector and the device port. In embodiment, the moveable magnet array 3102 may be attached to the device port and opposed to the cable connector.

In embodiments, a connector may be modified to provide space or room for a thicker block of magnets and the shunt plate. This modification may further facilitate concentrating the magnetic force, thereby strengthening the magnetic connection between the connector and the port.

In other embodiments, an optional flare 3202 or extended structure may be provided to the movable sides. As shown in FIG. 32, the optional flare may facilitate increasing the effective surface area of contact for the magnets. The exposed surface of the extended flare may increase with the distance the magnet array 3102 is extended.

Figure 33:
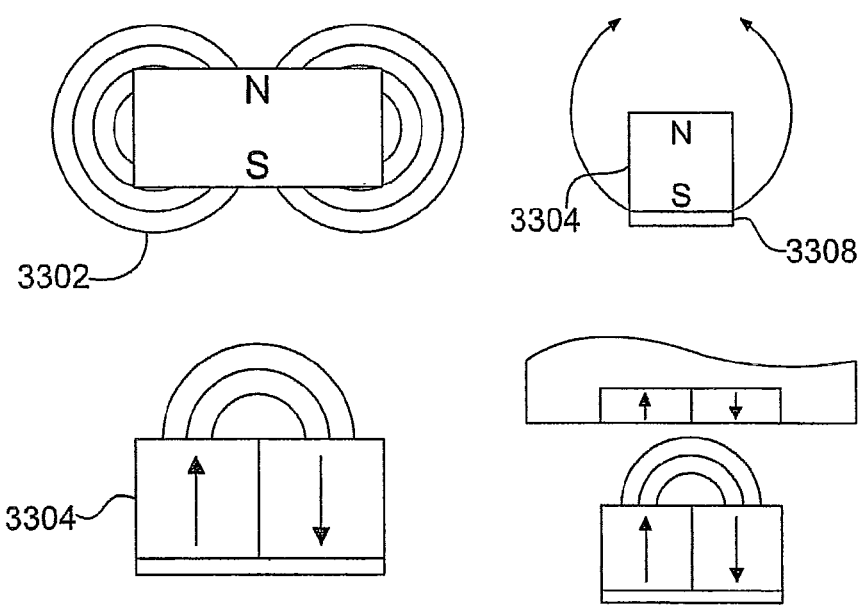
FIG. 33 depicts a use of a shunt plate in a magnet array in accordance with an embodiment of the present invention.

Referring to FIG. 33, a shunt plate 3308 may be used with the magnet array 3304. The shunt plate 3308 may be manufactured such that it is placed behind the magnets. FIG. 33 illustrates the change in magnetic flux lines 3302 as a result of the shunt plate 3308. The shunt plate 3308 may focus the magnetic flux in the forward direction. Further, the shunt plate 3308 may facilitate increasing the attraction forces in the magnet array 3304 and reducing the range of attraction. Furthermore, the shunt plate 3308 may facilitate reducing stray flux lines in the magnetic region that may otherwise weaken the strength of the field.

The magnet array and shunt solution may be optimized with magnetic design and analysis software known in the art. In embodiments, a magnetic Finite Element Analysis (FEA) may be required to obtain the optimized solution. In another embodiment, a repelling detent may be used with the design so that the motion of the movable bottom or the sides may be arrested or restricted to a specific direction. In other embodiments, a magnetizing connector shell may be used with the design. In embodiments, various adhesives that may be compatible with the connector material may be used. The metal plates in the connectors may be mechanically modified or grinded to mitigate interferences such as an uneven or beveled area in the ports. This may subsequently allow the connector to slide deeper into the port and minimize the existing gap.

In an embodiment, a lever lock connector mechanism may be provided. The lever lock connector mechanism may include a mechanical lever. The mechanical lever may be built into cable connector for a tight fit. Alternatively, the mechanical lever may be built into cable connector adapter for a tight fit. Moreover, the mechanical lever may be built into dongle for a tight fit. In embodiment, the lever lock connector mechanism may be created by stripping the cable jacket and placing a clamp around the jacket. The clamp, with hinge and other mechanisms, may be placed in the gap. Further, the teeth of the clamp may slide around the wire.

Figure 34:
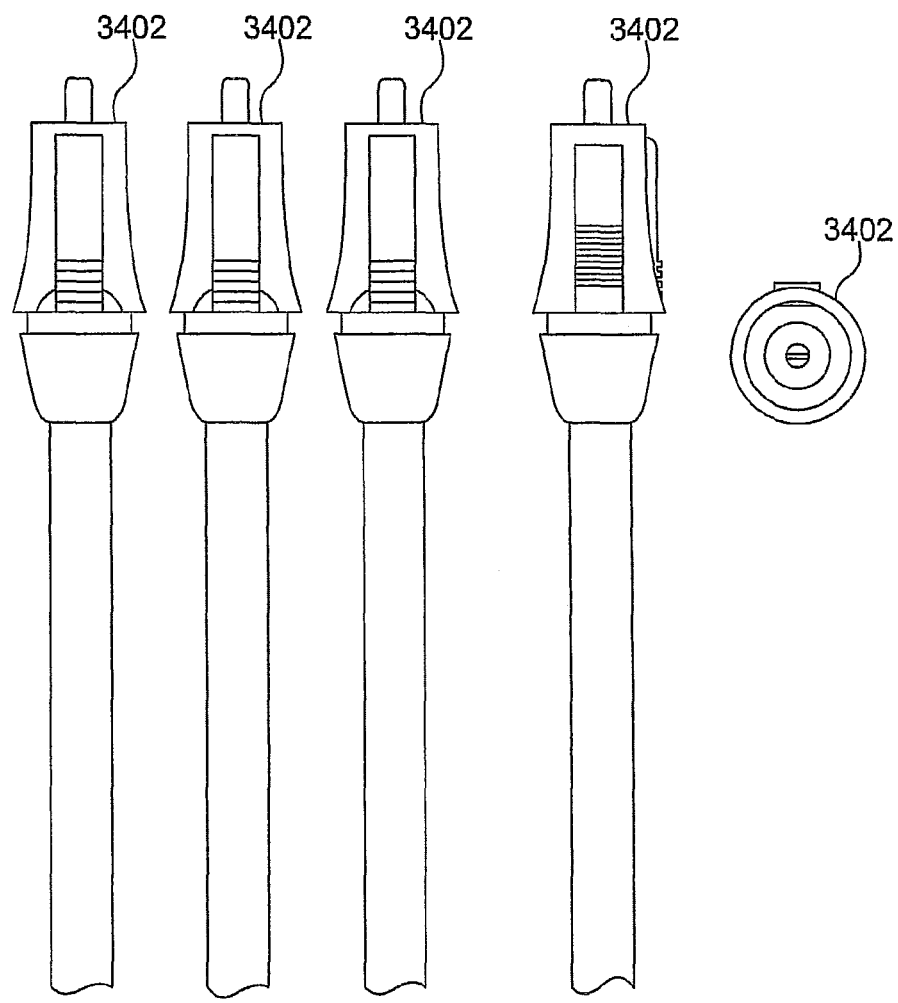
FIG. 34 depicts an embodiment of the lever lock mechanism of various connectors.
Figure 35:
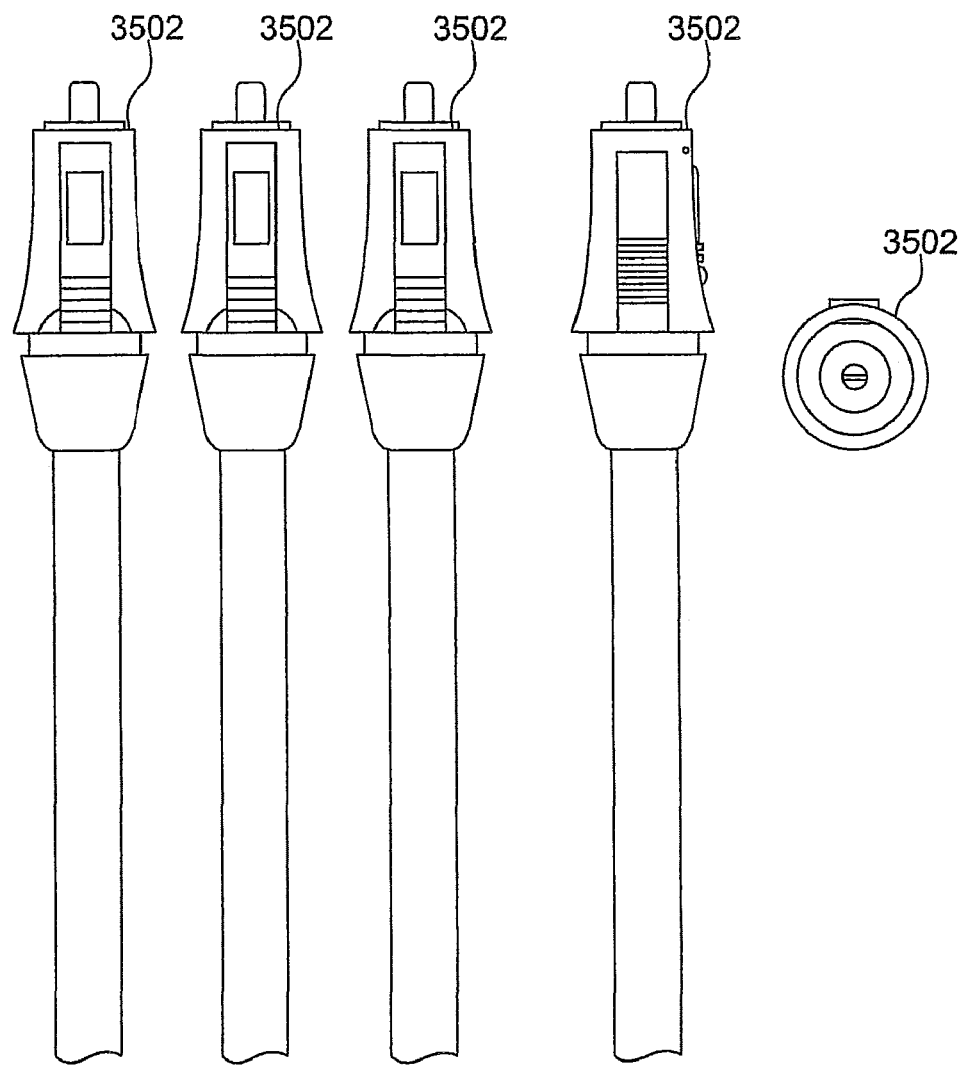
FIG. 35 depicts an alternate embodiment of the lever lock mechanism of various connectors.
Figure 36:
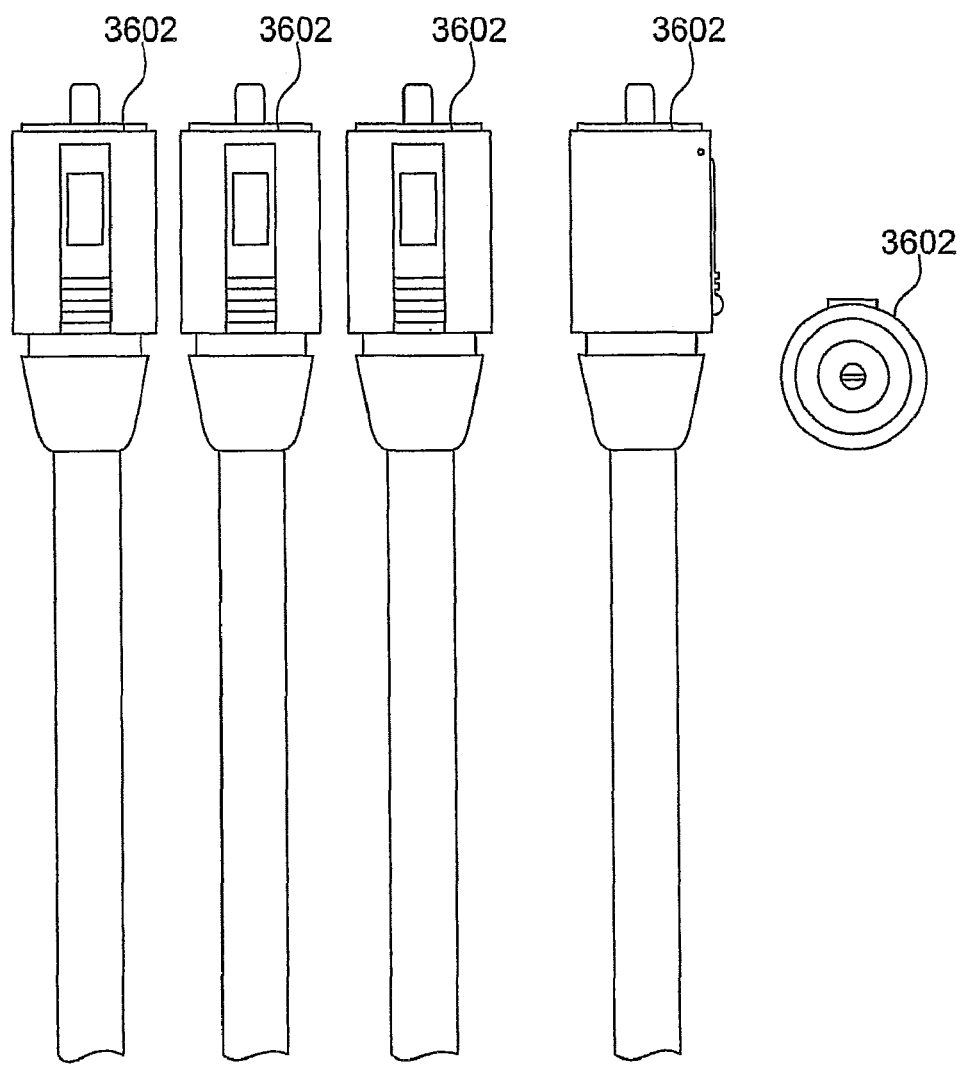
FIG. 36 depicts another embodiment of the lever lock mechanism of various connectors.

In another embodiment, the lever lock connector mechanism 3402 may include a lever. The lever may be pressed for loosening the clamp. As a result, when the lever is released, the clamp holds the cable in place. The lever lock connector mechanism 3402 may include a sheet of Teflon or plastic. In yet another embodiment, the connector housing may be adapted based at least on the manufacturing point of view, such as the internal cavity of connector housing to hold the connector and cable clamp. In yet another embodiment, the lever lock mechanism 3402 may be for a component cable, such as a component video cable. The connector mechanism 3402 may be as depicted in FIG. 34. In alternate embodiments, the connector mechanism 3502 may be as depicted in FIG. 35. In yet other embodiments, the connector mechanism 3602 may be as depicted in FIG. 36.

In another embodiment, the connector housing may be constructed from glass filled nylon. The lever itself may be constructed from a metal, including, without limitation, steel. The lever locking mechanism may be that of a cam. When the lever is in the "up" position the connector may be open and may slide on and off devices easily. When the lever is in the "down" position the connector may be locked and may not easily slide off a device.

In embodiments, a flexible or jointed connector may be provided. The connector may be flexible and/or may contain at least one joint that may allow the connector to fit into or reach tight spaces. In an alternate embodiment, the connector may include a joint that has the ability to bend, flex or ratchet so that an angle is created that allows the cable to plug into the device. Moreover, the arrangement described above may be accomplished through the use of an adapter and/or dongle that can be added to a cable. The adapter may have the ability to bend, flex or ratchet so that an angle is created that allows the cable to plug into a device.

The cable may include a processor or a microprocessor. For example, the cable may include an integrated circuit. The cable connector may include a processor or microprocessor. In another embodiment, the cable connector may include an integrated circuit.

The dongle and/or adapter attached to the cable may include a processor or microprocessor. In an alternate embodiment, the dongle and/or adapter attached to the cable may include an integrated circuit.

The term "processor" is used to refer to any method or system for processing in response to a signal or data and should be understood to encompass microprocessors, integrated circuits, computer software, computer hardware, electrical circuits, active components, passive components, application specific integrated circuits (ASIC), field programmable gate arrays (FPGA), personal computers, chips, and other devices capable of providing processing functions and combinations of any of the foregoing.

The processor and/or integrated circuit may be active or passive. Alternatively, the processor and/or integrated circuit may be parasitic and draw power off the line. The processor and/or integrated circuit may draw less than 300 mA.

The processor and/or integrated circuit may adjust certain attributes or parameters of the cable based on the length of the cable. Further, the length of the cable may be adjustable. Alternatively, the processor and/or integrated circuit may increase the viable length of a cable.

The processor, microprocessor and/or integrated circuit may be associated with impedance matching. Further, the processor and/or integrated circuit may optimize impedance matching between devices connected by cables connecting any two or more devices. For example, impedance matching may be done between a LCD and a computer. In this case, the LCD is the first device and the computer may be the second device. The processor and/or integrated circuit may adjust certain attributes or parameters of the cable based on impedance. Moreover, the processor and/or integrated circuit may match impedance. For example, the processor may match the impedance of a USB port in a computer to the HDMI port of a display.

In embodiment, the processor and/or integrated circuit may be associated with equalization of data. Further, the processor may be an equalization processor that may equalize data. The processor and/or integrated circuit may enable two or more cables to be connected to form a larger cable. The processor and/or integrated circuit may enable one cable to connect to, or supply a signal to, two or more devices, including, without limitation, a DVD player and a television.

The processor and/or integrated circuit may be associated with signal strengthening, such as signal amplification. The processor and/or integrated circuit may increase the strength of a signal. Alternatively, the processor and/or integrated circuit may increase the strength of the data that is transmitted. The processor and/or integrated circuit may enable two or more cables to be connected to form a larger cable.

The processor and/or integrated circuit may adjust certain attributes or parameters of the cable based on noise, cable length characteristics, interference, and the like. Moreover, the processor and/or integrated circuit may correct noise, attenuation, interference, and the like that may creep due to environment factors in the cable. The processor and/or integrated circuit may adjust certain attributes or parameters of the cable based on degradations due to wear and tear. The processor and/or integrated circuit may correct for degradations due to wear and tear associated with the cable. The processor and/or integrated circuit may adjust certain attributes or parameters of the cable based on reflections. Further, the processor and/or integrated circuit may correct reflections associated with the cable. Additionally, the processor and/or integrated circuit may prevent reflections. Moreover, the processor and/or integrated circuit may adjust attributes or parameters of the cable based on the external environment of the cable. The adjustments may be made in real time as the external environment changes. In an alternate embodiment, the processor may compensate for changes in electromagnetic interference as a vacuum is brought into the vicinity of the cable.

The processor and/or integrated circuit may enable switching between multiple circuits. The processor may select the correct circuit. In this embodiment, the multiple circuits may be in a single cable or may span multiple cables. In another embodiment, the processor and/or integrated circuit may test integrity.

The cable may have an indicator and/or display. In another embodiment, the cable may have a user interface. The user interface may consist of one or more screens and/or LEDs. In another embodiment, the indicator and/or display may be an LCD or other screen. In yet another embodiment, the indicator and/or display may consist of one or more LEDs. The LEDs may be multicolored LEDs. The use of at least one LED may be made in cables to communicate information or provide feedback to an end user.

In yet another embodiment, information may be communicated by the at least one LED. Further, the information communicated by the LED may be status information, diagnostic information, identification information, information regarding the status of at least one variable and the like. The LED may blink to indicate processing. In an embodiment, a solidly lit LED may indicate that the cable is properly connected. The color of the LED may indicate information. For example, green may be for go, yellow for hold and red may mean the cable is not working properly. In an embodiment, an illuminated LED may indicate that the cable has power. There may be more than one LED, such as to create an equalizer. The LED may communicate that the microprocessor is bad, cable is good, cable is bad, data channel is working, and the like. The LED may provide feedback regarding levels.

The LED may be controlled by or associated with a processor, microprocessor and/or integrated circuit. Further, the processor, microprocessor and/or integrated circuit may cause the LED to glow solid when a handshake between two devices is initiated. The cable may include one or more items from the group consisting of an LED, a processor, a microprocessor, an integrated circuit, a magnetic connector, a locking connector and the like.

The LED may be controlled by a passive circuit that may include a resistor and a diode connected between a hot plug detect pin and a ground pin. When the hot plug detect pin energizes the diode, the LED may illuminate indicating that the cable is properly connected.

The cable may include a button which may request an action. Further, pressing the button may initiate a self-test. In an alternative embodiment, pressing the button may cause a processor, microprocessor and/or integrated circuit in a cable connector to check for a valid connection and communicate result via the LED.

The LED may be a low power LED. Further, the low power LED may be of different design and specification as known in the art. In a specific embodiment, the low power LED may be similar in structure and performance that may be available from different manufactures of LED. In an example, the low power LED may be similar in structure and performance to one available from Cotco.

In an embodiment, The LED may be white. In another embodiment, the LED may of different colors.

In an embodiment, one or more LEDs may be included in a light pipe. The light pipe may be of different colors or coated with a color layer, so that the LED will appear to be a different color than the actual color of the LED. In an example, the LED may be white. Further, the light pipe may be coated with red color. In this case, the LED may glow in red color in spite of the LED being white in color. Additionally, the light pipe may be based on the connector housing.

Figure 37:
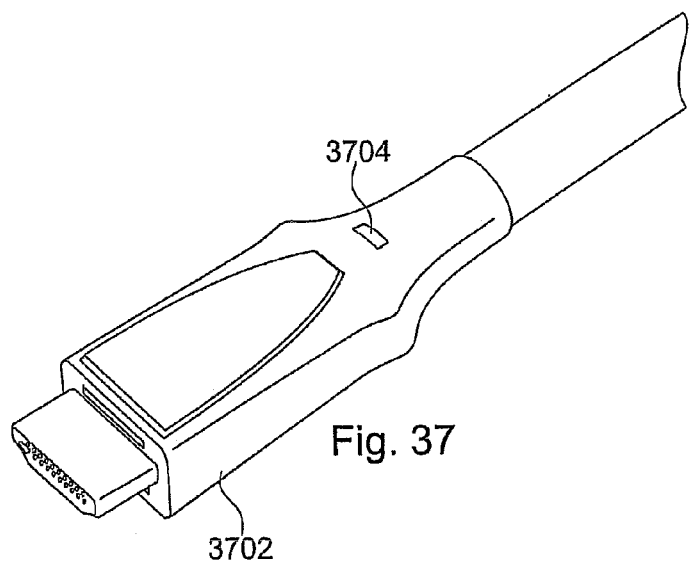
FIG. 37 depicts an embodiment showing the configuration of the LED and the connector.
Figure 39:
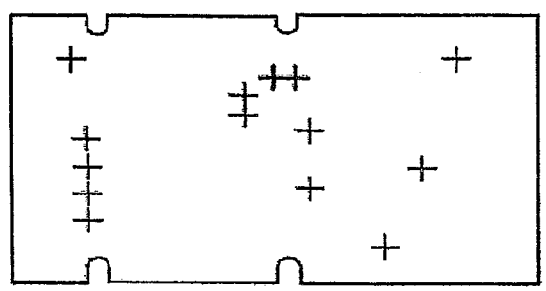
Figure 40:
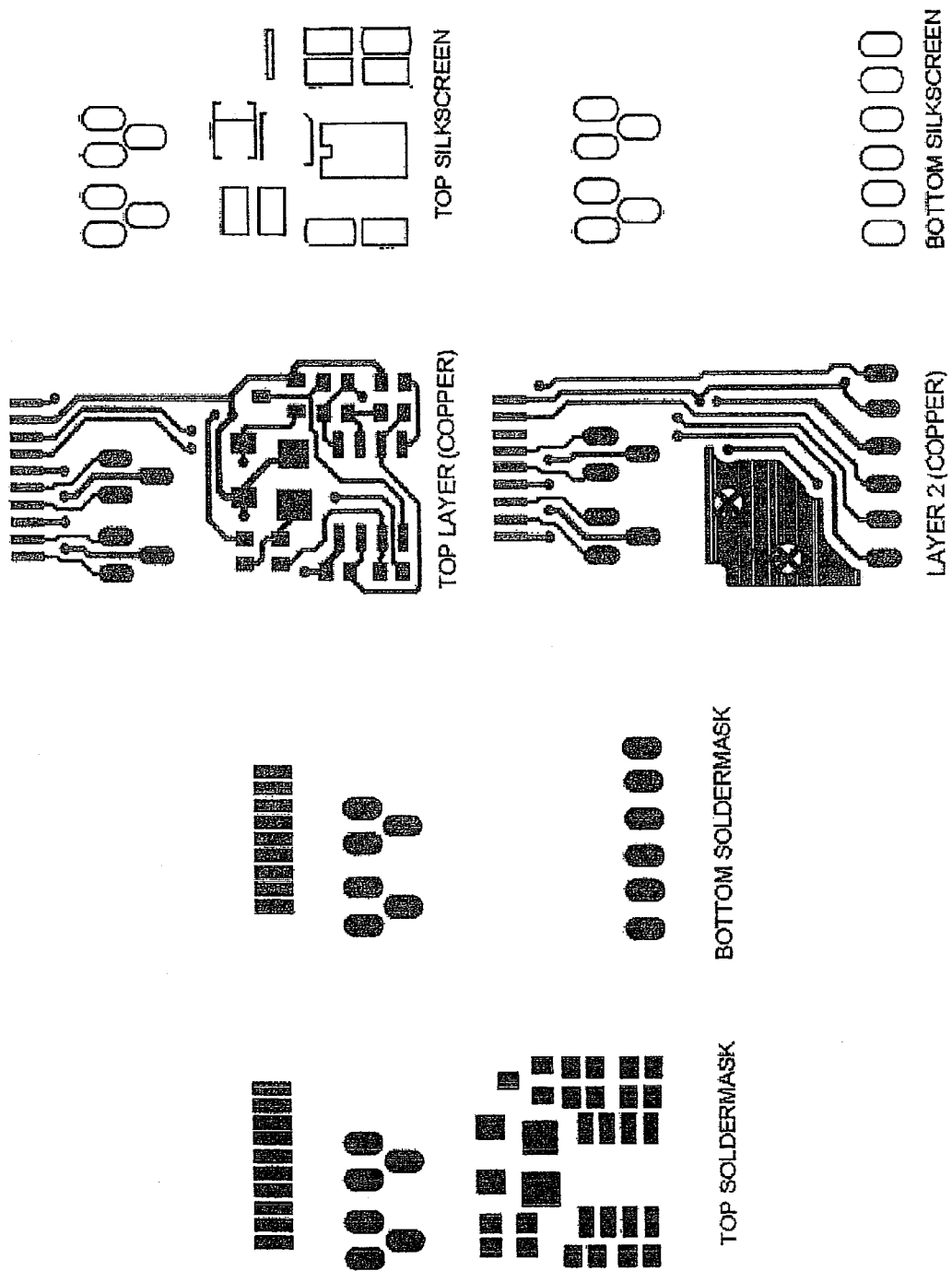
Figure 41:
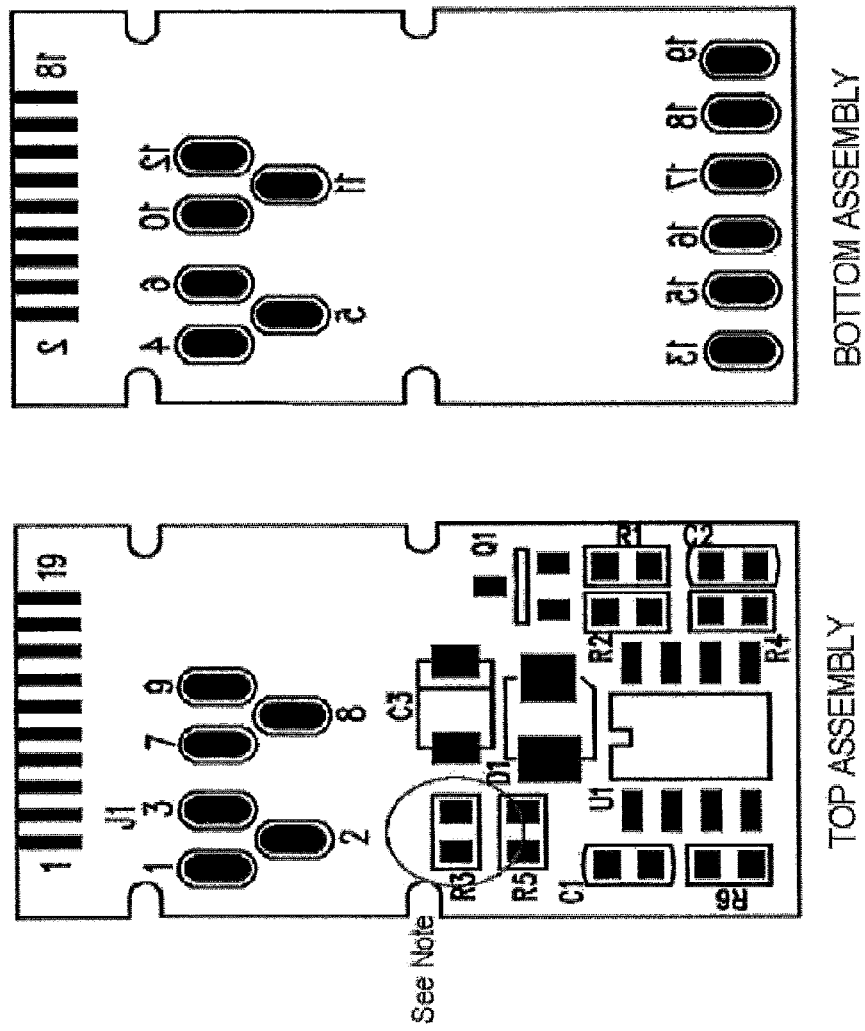
Figure 42:
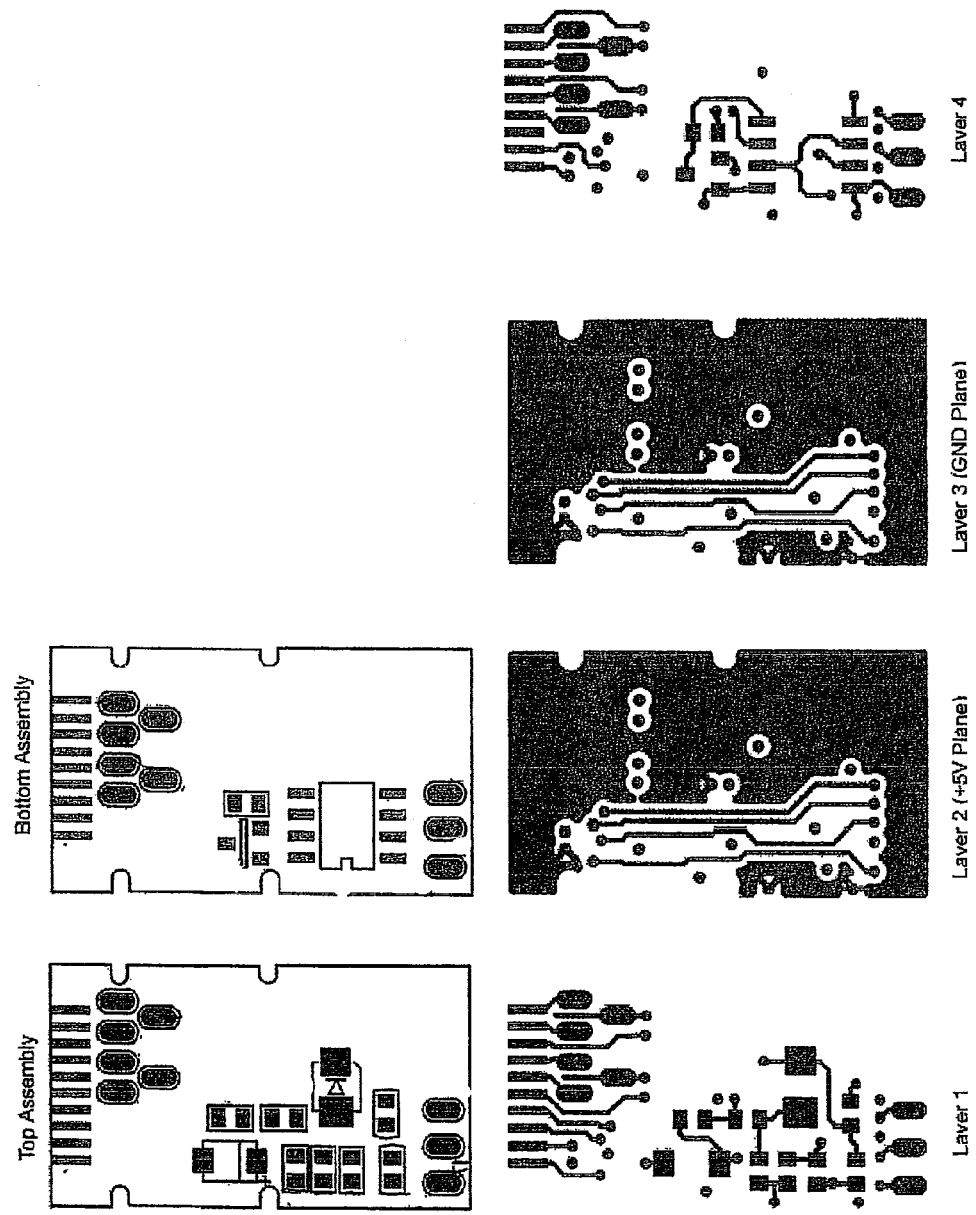
Figure 43:
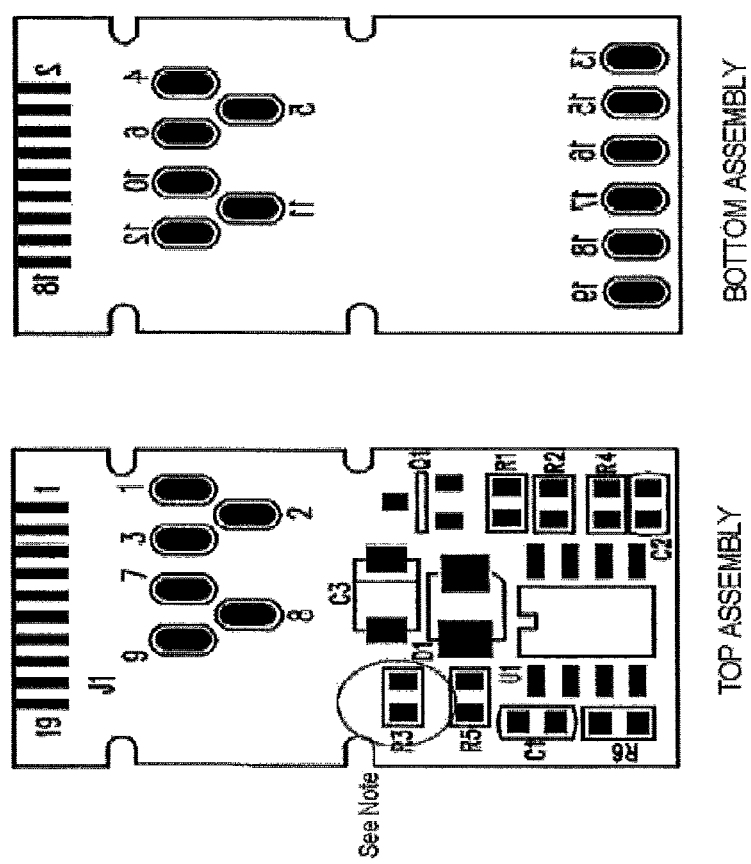
Figure 45:
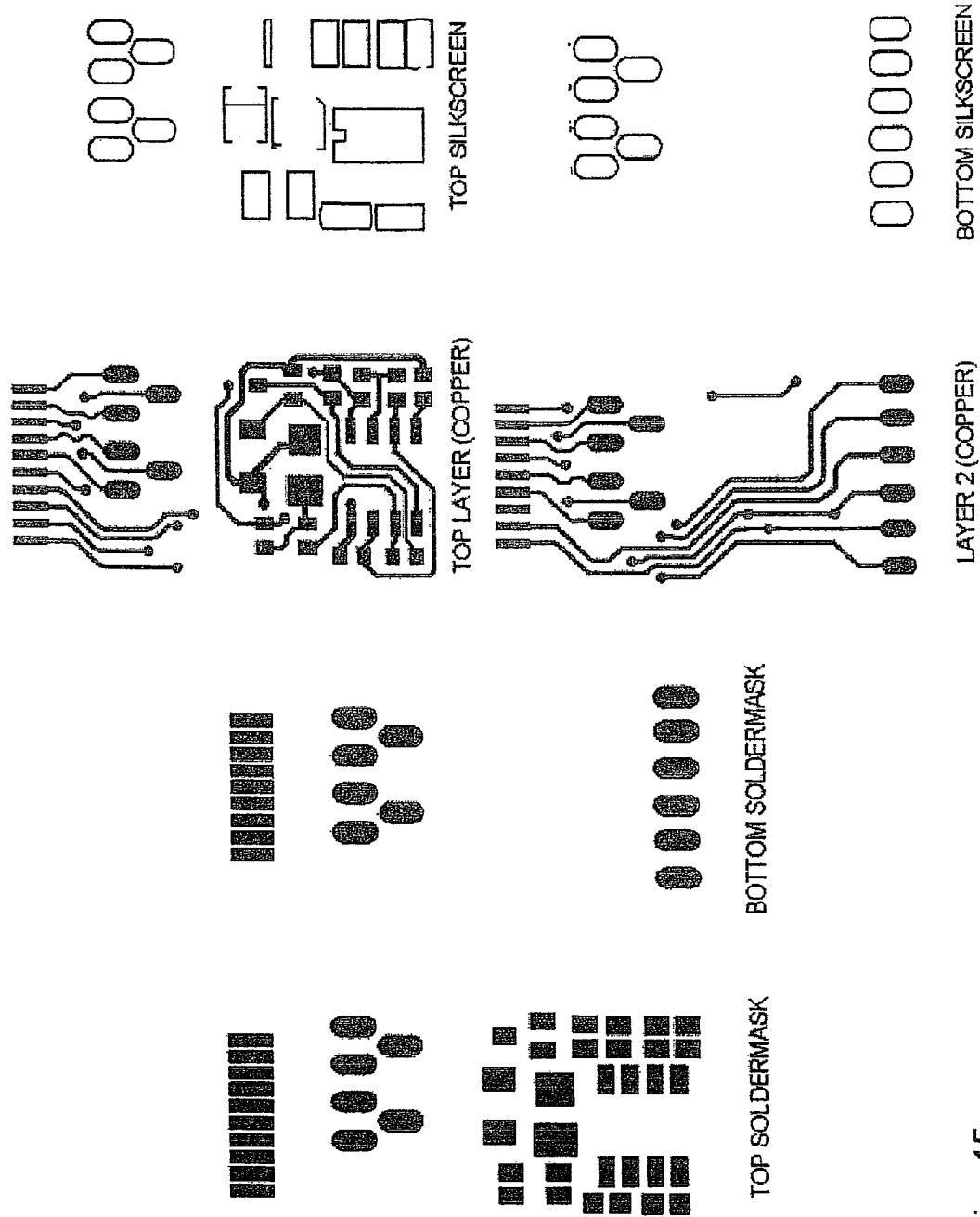

The configuration of the LED and connector may be as depicted in FIG. 37. The magnet 3702 may be a metal or other material with magnetic properties. The properties of at least one LED 3704 may be comparable to model LM1-PBL1-01-N1 from CREE®TT.

The cable may include a user interface. The user interface may include a button, a touch screen or area, a dial, a switch, a capacitive switch and the like. In an example, the user interface may provide an interaction between the cable and a user.

The user interface may be used to change a processor mode. The processor may include different modes that may allow a user to change attribute, properties, and/or data properties and/or signal properties and the like of the associated cable. In an example, the user interface may change the signal processing mode. In another example, the user interface may change the electromagnetic interference control parameters. In yet another example, the user interface may change the radio frequency interference control parameters. Additionally, the user interface may change voltage, current, or power regulation. Moreover, the user interface may increase or decrease voltage, current, or power of the associated signal.

The user interface may be used to check cable performance. Further, the cable performance may be associated with checking signal strength, a noise level, a validity of the connection, a voltage, a current, or power, other features, attributes and parameters, and the like, of the cable. In an example, the user interface may be used to check cable performance by checking the attenuation level of the signal.

The user interface may change the processor and/or monitor mode and an indication may be presented to the user that may provide information related to either the change in the processor and/or monitor mode. In an example, the indication may be provided through an LED. The LED may blink in a corresponding pattern. In an example, the LED may change to a corresponding color, in another example, the LED may change to a corresponding color and blink in a corresponding pattern. In yet another example, the LED may vary its status in order to provide the indication.

The magnetic connector mechanism may provide a retrofit adapter, a connector, a dongle and the like. In this embodiment, this arrangement may enable a cable of one type to be used as another. In an example, an HDMI adapter may be attached to a USB cable, allowing the USB cable to be used as an HDMI cable, in another example, an HDMI adapter may be attached to a DVI cable allowing the DVI cable to be used as an HDMI cable. Additionally, this arrangement may allow for upgrading cables.

The magnetic connector mechanism may include a retrofit adapter, connector, or dongle that may enable a cable-device configuration to obtain the functionality of the cable. Further, the obtained functionality may include a dongle, a processor, a display, such as an LED display, as described herein.

The retrofit adapter, connector and/or dongle may enable a cable and/or a port of a device to obtain the magnetic connector functionality described herein.

The retrofit adapter, connector and/or dongle may enable a cable and/or a port of a device to obtain the lever lock functionality described herein.

The retrofit adapter, connector and/or dongle may enable a cable and/or a port of a device to have all or a subset of the functionality described herein, including without limitation, the inclusion of indicators, LEDs, user interfaces, processors, integrated circuits and the like.

The cable, connector, adaptor and/or dongle may be characterized by a single-layer board and/or a multi-layer board. Further, the one or more boards and wiring configuration may facilitate heat transfer and/or reduce interference and crosstalk. Additionally, the one or more boards and wiring configuration may include a hole for heat transfer. In addition, the one or more boards and wiring configuration may include a hole with a solder pass. The solder pass may facilitate heat transfer.

The board configuration may be a double board configuration. The two boards may sandwich a metal plate between them. The metal plate and board may be held together by glue, adhesive tape or the like. A hole may be drilled through the assembly and solder passed through the assembly, which may assist with heat transfer. The solder and/or metal plate may transfer heat to a casing, such as a metal casing or thermally conductive plastic casing. The solder and/or metal plate may be isolated from the circuits on the boards.

In another embodiment, there may be a single board which may be attached to a metal plate and configured in a manner similar to that described for the two board configuration.

The cable, connector, adapter and/or dongle may be configured such that the power wires and data wires are separated. In another embodiment, the wiring configuration may utilize twisted pair wiring. The twisted pair wiring may reduce electromagnetic interference.

The wiring configuration may minimize the interference of other wires, such as power wires and data wires, with a given wire. Additionally, the wiring configuration may include and/or create a faraday cage. Further, the formation of a faraday cage may result in reduction of interference by external factors. In an example, the factor may be due to power wires.

In yet another embodiment, the data wires and power wires may be different lengths. The data wires and power wires may be soldered to different boards or different regions of a board. In an example, this may have the effect of reducing cross-talk. In yet another embodiment, the data wires may be connected at the connector end, rather than at the cable end. In yet another embodiment, two or more of the wires may be configured in one or more twisted pairs or twisted wire arrangements. In yet another embodiment, one or more of the layers may be an active shielding layer or a passive shielding layer. In yet another embodiment, one or more of the layers may be characterized by a field-reflective surface on part of a board. In an example, the board may be a multi-layer board and the surface may be a laminate in a metallic layer. Additionally, the layer configuration may create a faraday cage.

In yet another embodiment, a data layer may be masked by a metallic surface. In such an arrangement a static charge may be used for shielding.

In yet another embodiment, the connector, adapter and/or dongle may be encased in ferrite and/or may contain a chamber the contents of which are encased in ferrite. The ferrite may be an additive to a nylon material. The ferrite may be applied by spraying, splashing, dipping, potting or otherwise.

FIGS. 38-45 depict various embodiments of printed circuit board wiring configurations that may be used in the HDMI connector embodiment depicted in FIG. 1.

Alternatively, the processor, components, LED, display, and the like may be interconnected with wires instead of a printed circuit board. In such a configuration of the cable connector system, the wires and components may be potted for mechanical strength and stability.

In embodiments, different types of cables and devices may be provided. The different types of cables may include HDMI, DVI, VGA, USB (Universal Serial Bus), Firewire, cabling for 480 standard, cabling for 310 standard, cabling for 1080 standard, cabling for 1440 standard, quad standard and above, cabling for multiple screens or displays on one bit map, console cabling, game console cabling, computer cabling, stereo cabling, video game system cabling, multi-screen display, projector, micro-projector, television cables, DVD cables, VCR cables, portable media player cables, component video cables, audio cables, S-video cables, cell phone cables, cables for a media server, cables for any computer used to power or in association with a home theater and the like. The different types of device ports may include ports for HDMI, DVI, VGA, USB, Firewire, cabling for 480 standard, cabling for 310 standard, cabling for 1080 standard, cabling for 1440 standard, quad standard and above, cabling for multiple screens or displays on one bit map, console cabling, game console cabling, computer cabling, stereo cabling, video game system cabling, multi-screen display, projector, micro-projector, television cables, DVD cables, VCR cables, portable media player cables, component video cables, component cables (including, without limitation, component cables using RCA connectors), audio cables, S-video cables, cell phone cables, cables for a media server, cables for any computer used to power or in association with a home theater and the like.

Portions of the cable connector system may include shielding. Further, the shielding may include ferrite shielding, mylar shielding, copper shielding and the like. In this embodiment, the shielding may filter electromagnetic interference, radiofrequency interference and the like. The shielding may be spray-on ferrite, spray-on electromagnetic interference shielding on the inside of a connector. The shielding may be put inside the actual connector. Additionally, a ferrite skin may provide shielding.

The shielding may be flexible. Additionally, the shielding may be an AVI material like nylon.

The shielding may be applied by spraying, dipping, potting, vapor deposition, coating and the like. The shielding layer may be coated on the inner layer of connector housing, the shielding may be triple layer copper and mylar shielding. Further, in embodiments, the shielding may be composite cable jacket shielding. The properties of the shielding may include silver coated copper electromagnetic wave shielding coating which may be made with high conductivity silver coated copper powder such as B-62030 by Shenzhen Xin Sheng Feng Technology Co., Ltd.

Figure 46:
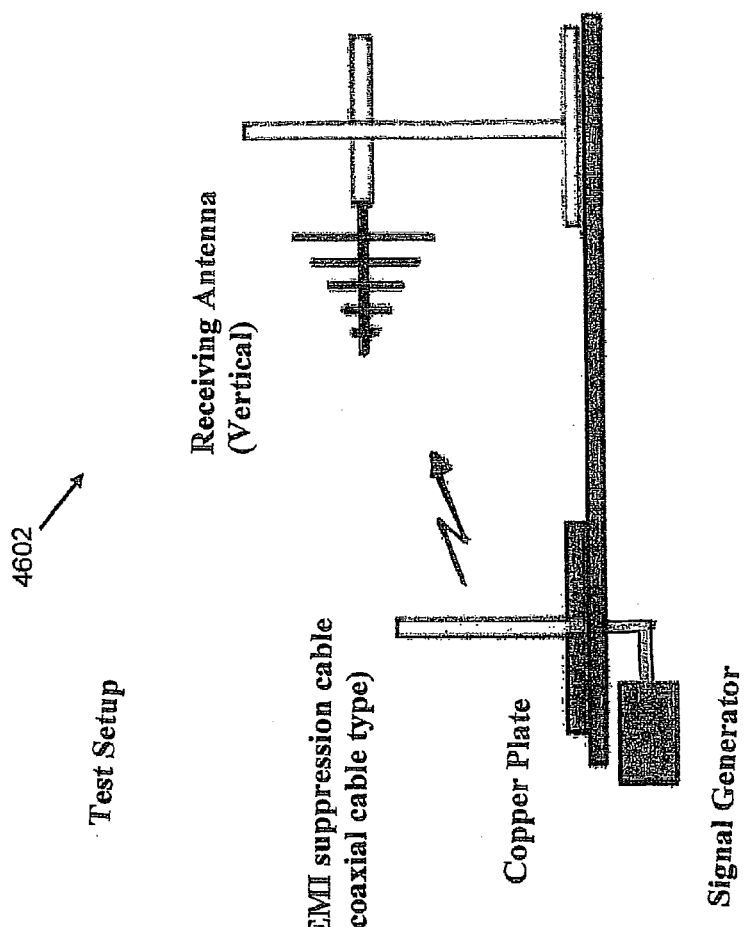
FIG. 46 depicts a test setup for optimizing shielding.
Figure 47:
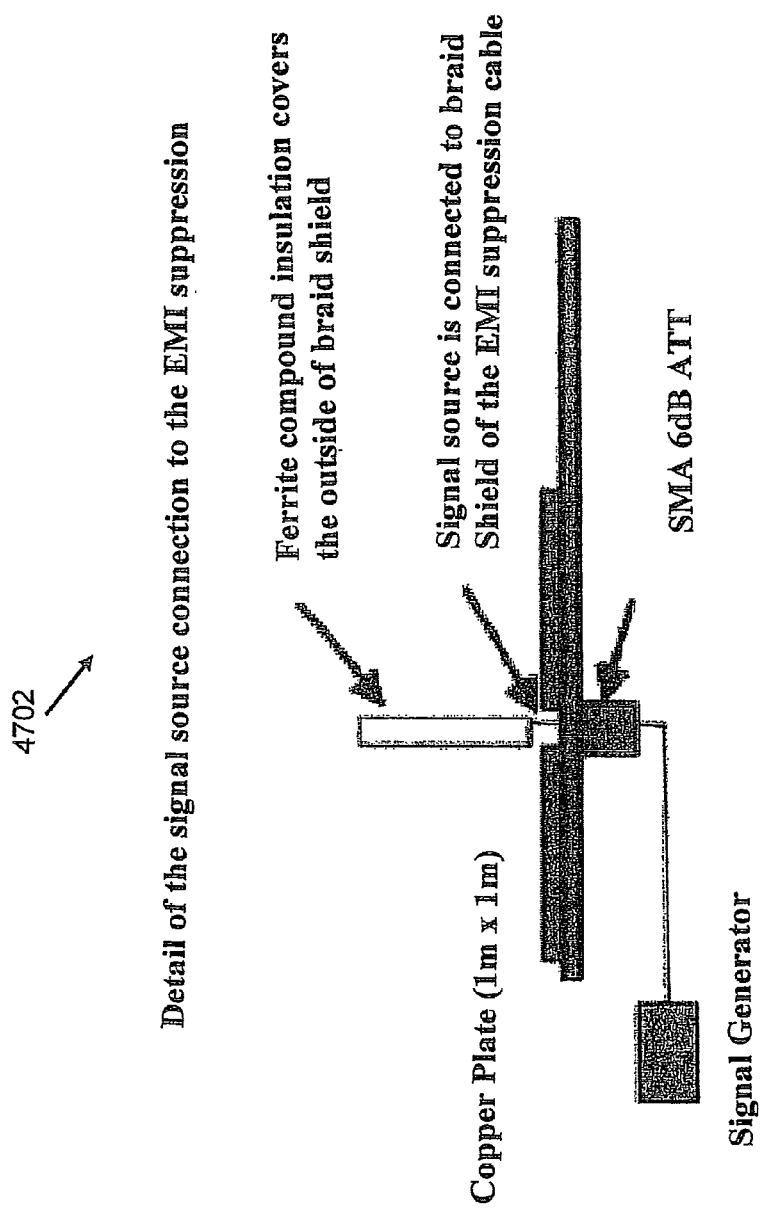
FIG. 47 depicts a configuration of signal source connection to perform the test depicted in FIG. 46.
Figure 48:
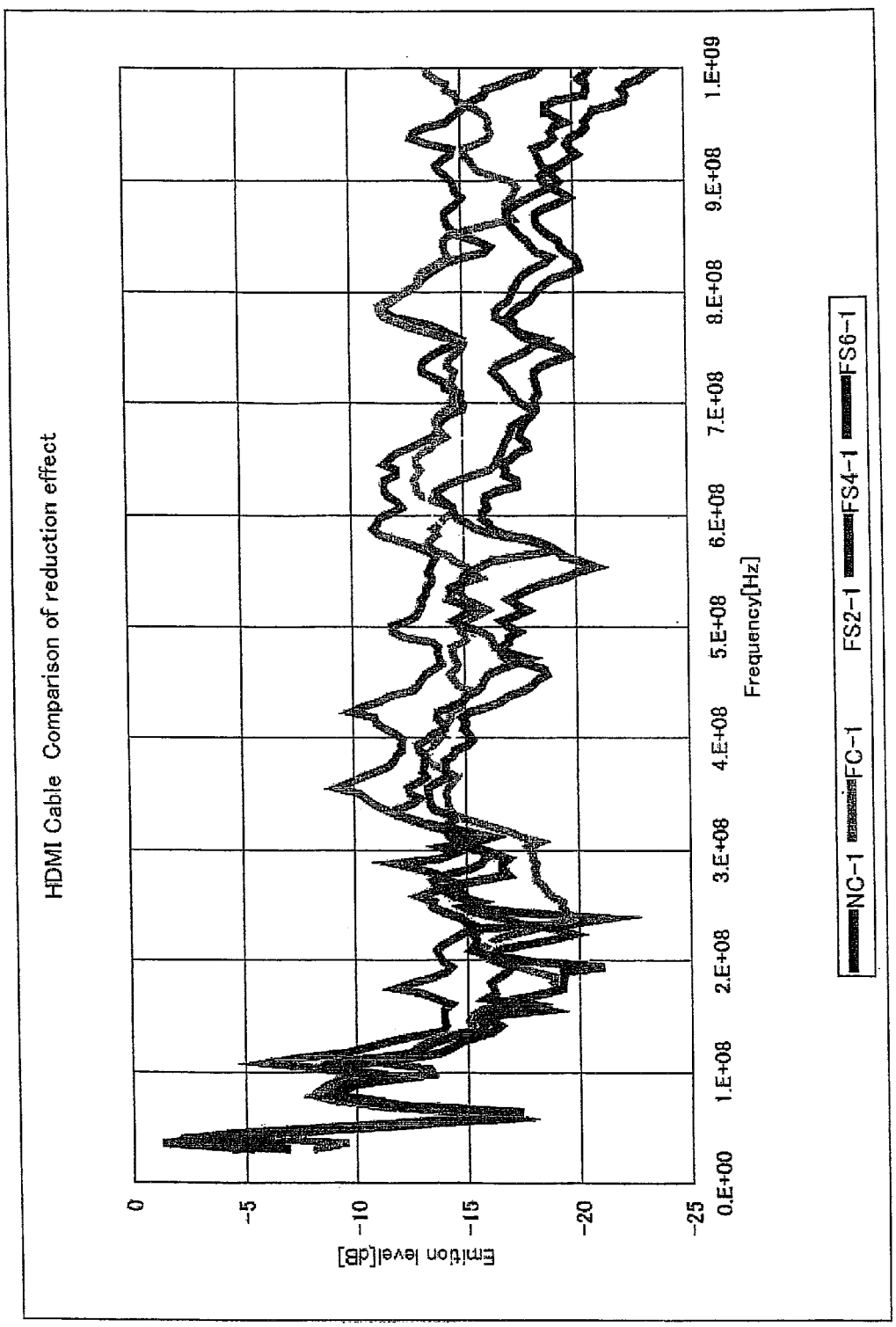
FIG. 48 depicts representative test results of an embodiment of the invention.

The shielding may be optimized. The optimization may be done by measuring the cable in an anechoic chamber 4602 according to the schematic presented in FIG. 46. There may be a vertical straight cable at the center of a turntable and a signal source output may be connected to one end of the braid shield of the cable. Common mode electric current may be made to flow through the braid shield. The cable may then radiate electromagnetic radiation which may be measured. The configuration may be as depicted in the system 4702 represented in FIG. 47. Alternatively, the shielding may be optimized by measuring samples that may include a normal cable, a 1-turn core attachment cable, a ferrite compound insulation with thickness of 0.2 mm, a ferrite compound insulation with thickness of 0.4 mm, a ferrite compound insulation with thickness of 0.6 mm. The results may be as depicted in FIG. 48 as shown by a graph 4802.

The electromagnet interference suppression may be more than 5 dB at 350 MHz to 1 GHz range. In a specific embodiment, the optimal ferrite shielding may be a ferrite compound insulation with thickness of 0.6 mm.

The cable connector system may include a resistor bridge. The resistor bridge may assist with impedance matching between the two ports and or two connectors. The resistor bridge may assist with preventing reflections. The resistor bridge may assist with filtering reflections.

In an embodiment, a splitter may allow the expansion of a cable from one cable and/or connector to any number of cables and/or connectors. In another embodiment, a splitter may include one or more magnetic connectors, lever locking mechanisms, processors or integrated circuits for impedance matching, equalization and signal strengthening. In yet another embodiment, a splitter may be parasitic and draw power off the line. In yet another embodiment, a splitter may be powered by a power source external to the cable. In yet another embodiment, a splitter may be a Y cable, or in the case of splitting a connector into more than 2 connectors may function as multiple Y cables joined together. In yet another embodiment, a splitter may contain a processor or may be associated with a processor, such as a processor of a cable. In yet another embodiment, the processor may rebroadcast a signal. The rebroadcast may be one to one, one to many, many to many and the like.

In an embodiment, a connection hub and/or bus may allow for the connection of multiple devices to one or more display devices. In another embodiment, the hub and/or bus may include ports for various cables, including, without limitation, HDMI cables, as well as power receptacles. The hub and/or bus may include instructions or visual or other cues to assist a user with correctly connecting various devices. In an example, the hub may display the configuration steps for connecting the cable to an external device. Additionally, in embodiments, the ports of the hub and/or bus may be color coded so that a user can easily determine which port is for which device. In an example, the port may be colored coded, to say red color, for connecting it to computer. Alternatively, the port may be color coded with another color, say green, for connecting it to television. The hub and/or bus may be rack mountable. Additionally, the hub and/or bus may allow for the selection and/or configuration of various distances.

In yet another embodiment, the hub and/or bus may include one or more magnetic connectors, lever locking mechanisms, processors or integrated circuits, display devices, LEDs. In yet another embodiment, the hub and/or bus may be a power strip with magnetic connectors. Alternatively, the hub and/or bus may include a power strip with magnetic connectors. In yet another embodiment, the hub and/or bus may have the ability to color sound to bring out different sounds and or colors. A sound processor that may facilitate the differential expression of various sounds. In addition, a color processor may facilitate the differential expression of various colors. In yet another embodiment, the magnetic and/or lever lock connectors of the hub and/or bus may be configurable or adjustable to better fit the cables.

The cable may include a strain gauge and/or strain jacket. Further, the strain gauge and/or strain jacket may be associated with the processor.

The cable may allow for thermal management. In another embodiment, the cable may allow heat to dissipate from the casing. In yet another embodiment, the cable may contain a multi-layered board. In an example, one layer may also be an active electromagnetic interference suppression layer that may cause a signal to be applied to the material or a passive electromagnetic interference suppression layer. In another example, the layers may be configured in such a manner as to create a faraday cage protection.

The cable may be characterized by high style and design that may be cool looking. The cable may be tricked out. In another embodiment, the cable may match one or more of the products it is being used in connection with. The cable may match the products by having an arrangement for lighting of the cable that may change color to match the product the cable is being used with. In a specific embodiment, the cable may glow green when associated with an X-Box, white when associated with a Wii and blue when associated with a Sony device. In embodiments, having a cable match a product may help with organization of cables and identification of which cable is plugged into or associated with which device. Additionally, if a cable runs from a switching device, the color of the cable may be indicative of which media source is sending information through the cable or is selected to send information through the cable.

The appearance of a cable may be controlled. In an embodiment, a cable may be colored. In an embodiment, a cable may be translucent. In an embodiment, a cable may contain lighting. Further, the lighting may be parasitic and draw power off the line. In addition, the lighting may be powered by an external power source. Moreover, the lighting may change color. Further, in this embodiment, cabling may bend underneath a gaming console, thereby illuminating the console from underneath. Alternatively, the cable may power a light source that illuminates the console.

The processor may vary the appearance of the cable connector system based on the data flowing through the cable or other data detected or provided to the processor. The processor may vary the output of an LED in response to interpretation of music and display colors, flashes and the like in keeping with music's rhythm and beat. Further, in embodiments, cabling may bend underneath a gaming console, thereby illuminating the console from underneath and a processor may vary the output of an LED in response to interpretation of music and display colors, flashes and the like in keeping with music's rhythm and beat changing the light illuminating the console.

The cable connector system may be the cable of a pair of headphone or ear buds or may be the headphones or ear buds themselves. Further, the appearance of LEDs in the cabling, headphones and/or ear buds may be varied in response to the data flowing through the cable or other data detected or provided to a processor. In addition, the ear buds and/or headphones may be used in connection with portable media players, stereos, TVs, computers and the like. The effects discussed herein may be achieved through the use of a dongle.

The connector, adapter and/or dongle may enable the control or powering of at least one other device, in addition to a device plugged into the cable. For example, if the connector is plugged on a computer, if the computer is attached to a stereo, the connector may enable controlling of the stereo.

In another embodiment, an HDMI cable may have at least one separate power wire branched off the cable. The branching may occur at or through the use of a connector, adapter and/or dongle. In addition, one or more separate power wire branches may be used to power at least one other device. Further, one of the devices may include at least an LED. Additionally, in embodiments, the separate power wire branch may be used to charge one or more devices. The one or more devices may be devices such as but not limited to mobile devices. In an example, the mobile device may be a cell phone. In another example, the mobile device may be a portable DVD player.

In an embodiment, magnetic connector mechanism may take power from that flowing through the cable from one or both of the ports the cable is plugged into or the power may come from an external source. The external source may be a wall outlet, battery, a device, solar source and the like.

The cable connector system may include at least one transformer, resistor, capacitor and the like or other means for adjusting, modifying, regulating and the like the voltage, current and resistance of any circuit flowing through the cable. Further, the circuit may be a circuit carrying electricity to power the cable connector system or a device. Additionally, the circuit may be a circuit carrying a media signal or other information.

The cable may be associated with cable characteristics. The cable characteristics may include bandwidth, refresh rate, number of layers and the like. In an example, the cable may have 3 or 4 layers. The cable characteristics may include quality of gold for connectors and other components, in an example the quality of gold may be 18 or 24 carat. The cable characteristics may include platinum for connectors. The cable characteristics may include gauge, in an example the gauge may either be 22 or 24. The cable characteristics may include an antibacterial coating. In an embodiment, various materials for the outer jacket of cable may be used, in an example the outer jacket of the cable may include PCB-free materials. In another example, the outer jacket of cable may include halogen-free materials. In yet another example, the outer jacket of cable may include polyethylene. The cable may be associated with cable characteristics such as nitrogen gas injected dielectric into the cable for insulation.

In embodiments, cable may contain a high speed, pure alloy. The cable may use solid silver conductors, silver plated copper conductors, or some other type of conductors. The cable may be available in various colors, such as blue, teal, green, magenta, white, yellow, and other custom colors. In addition the cable may be available in various lengths. In an example, the cable may be either 2 m or 4 m in length. Additionally, the cable may be available in various configurations and standard configurations. In an example, the standard configurations may be >4.95 Gbps, 26 AWG, >6.57 Gbps, 26 AWG and/or >10.2 Gbps, 24 AWG. The cable may have five shielding layers and a ferrite skin.

Figure 49:
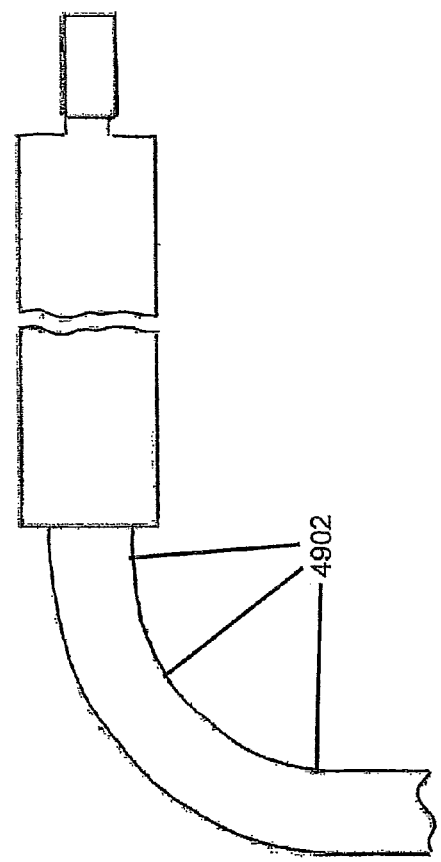
FIG. 49 depicts an embodiment showing the angle of bending of the cable.

Further, in embodiments, the cable may be rigid, flexible or the cable may be characterized by a maximum permitted angle of bending. In an example of this embodiment, a recommended maximum angle 4902 of bending may be as depicted in FIG. 49.

The cable connector system may be associated with marketing and/or advertising. The marketing and/or advertising campaign may include a 'try me' campaign. As a part of the campaign, the cable connector system's packaging may include a try me button. The packaging may also include a power source such as a battery like a 5V battery or a solar cell. Using the try me button and power source, the packaging may enable a potential user to try the product before purchasing, by viewing the cable connector system's operation while it is inside the package. Moreover, the try me campaign may show the various states of the indicator LED. In an example, a self-test may be performed on the push of the button. In another example, a demonstration of product features may be given when the button is pushed.

The marketing and/or advertising campaign may be associated with a product display for comparison. The product display for comparison may have a display where the actual cable is used to deliver media from a source to a display device. Additionally, the display may allow a user to select between various cables for delivery of the media, such that the user may compare the delivery quality of the various cables. Moreover, the display may include diagnostic software or equipment to facilitate the comparison. In this embodiment, diagnostic information may be displayed on the display device, enabling the user to compare technical specifications of various cables. Additionally, the product display and comparison may have a cut away, cross-sectional view and/or combination view of the cable connector system, or some other type of view. The product display and comparison display may allow for following the data through the wire. In addition, the display may allow for seeing the LED light.

The marketing and/or advertising campaign may include a product display for trying the magnetic connector. The product display for trying the magnetic connector may have a cable attached to a display with a HDMI port so a user can try the connector. Examples of the cable connector system may include a regular cable, a cable with magnetic connectors and/or a cable with lever lock connectors, and the like. In another example, retrofit versions of cables may be provided. The retrofit versions may include dongles, adapters and the like. In yet another example, the product display for trying the magnetic connector or lever lock connector may include a typical cable and allow for comparison of the magnetic connector or lever lock connector with a typical connector.

In another embodiment, the marketing and/or advertising campaign may be associated with environmentally friendly packaging and products. The environmentally friendly packaging may use material such recycled plastic, corn starch, PET-based, RoHS, 6P, halogen free, phthalates free, recyclable packaging, RPET packaging and the like. Further, in an example, the RPET packaging may be RPET blister or recycled APET, and the like such as plastic sheets that may be comparable to plastic sheets available from Mineron (HK) Co Ltd. The products, including without limitation the cabling, connectors, adapters and/or dongles, may be made of environmentally friendly materials, including the environmentally friendly materials described herein. The products and/or packaging may be free from bromine, beryllium, cadmium and the like.

In yet another embodiment, the marketing and advertisement campaign may be associated with targeting the cable connector system to a particular device or brand of device. This may be achieved by optimizing the cable connector system for a particular device, such as a DVD player, all Sony devices or a Sony DVD player, and the like. In another example, the cable connector system may be targeted to a particular device or brand of device by featuring on the package so as to identify the cable connector system as one that was tested with and/or optimized for a particular device and allowing consumer to identify the device that works with the consumer's media source and display device. In yet another example, the cable connector system may be targeted to a particular device or brand of device by providing the cable connector system in colors matching the devices.

The cable connector system may be sold in either kits or bundles that may include instructions. In an example, the cable connector system may be sold in a bundle of cables that may be of different types. The cable connector system may be bundled including two or more HDMI cables to achieve the desired bandwidth for a particular device. In another embodiment, the cable connector systems may be bundled with devices, such as televisions, monitors, DVD players, consoles, computers and the like.

The cable connector system may be supplied ready to be mounted in a TV. Alternatively, the cable connector system may be supplied as a subcomponent of a TV. The cable connector system configurations may be provided in a product kit that may include a flat panel TV wall mount & other cables. The cable connector system may be provided in a product kit that may include a flat panel TV wall mount with cable guides built into the mounting brackets to provide integrated cable management, optionally with other cables.

The cable connector system may be associated with a community. For example, an online forum may be created where cables could be discussed, reviewed, purchased, sold, auctioned, traded, bartered, and the like.

Figure 50:
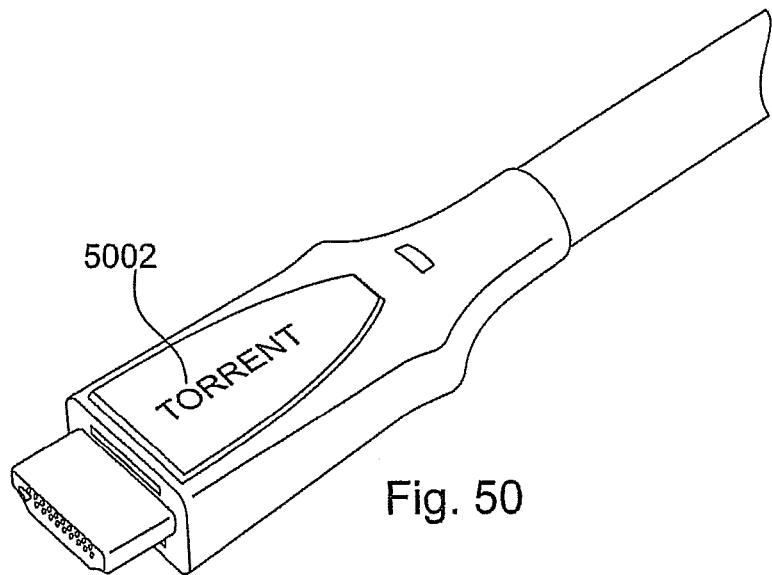
FIG. 50 depicts an embodiment showing branded cables.

In an embodiment, different business models may be associated with licensing the brand. A business model may include a point of purchase strategy or a private label. Further, the private label may be for retailer such as Best Buy, Circuit City, RadioShack, or some other type of retailer. In another example, the private label may be for consumer electronics companies such as Sony, Samsung, Phillips, LG, and the like. Further, in embodiments, the cable connector system may be branded as depicted in brand display 5002 of FIG. 50.

In another embodiment the business model may be associated with big box retailers.

Figure 51A:
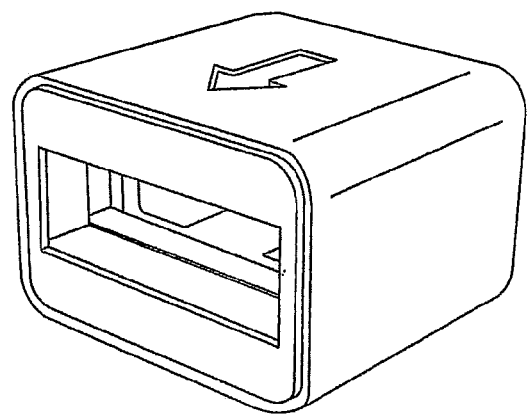
FIGS. 51A and 51B depicts an FEM model of a connector.
Figure 51B:
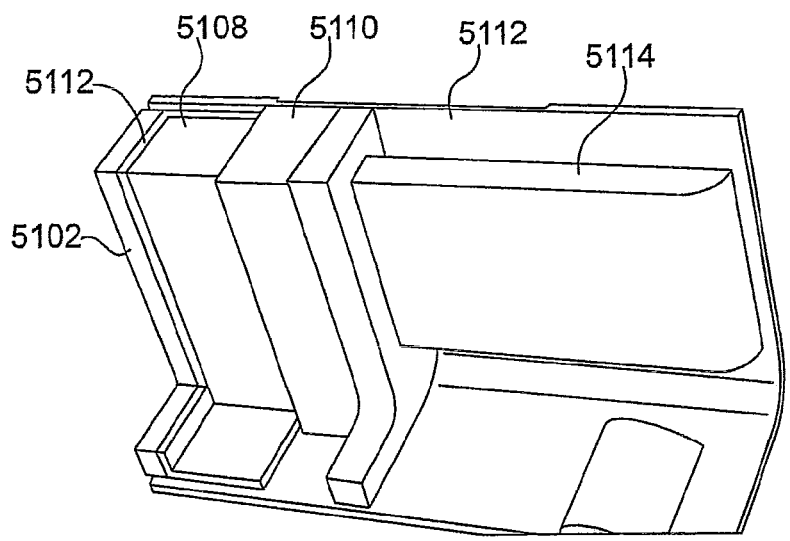

Referring to FIGS. 51A and 51B, an FEM model of the connector is depicted. The model may consider all elements relevant for simulation of the magnetic behavior. FIG. 51B depicts a cutaway of the connector. The connector comprises a cup 5102, an adhesive 5104, an attraction permanent magnet 5108, a main permanent magnet 5110, the sleeve 5112, and a back plug 5114. The reference coordinate system may be defined as follows: The origin is located at the symmetry planes of the system with Z=0 at the magnetic gap center, and the X & Y axes are in the gap plane. The following units are used in the model: SI with mm for length and a value of 9.81 m/s2 is used for gravity acceleration.

Figure 52:
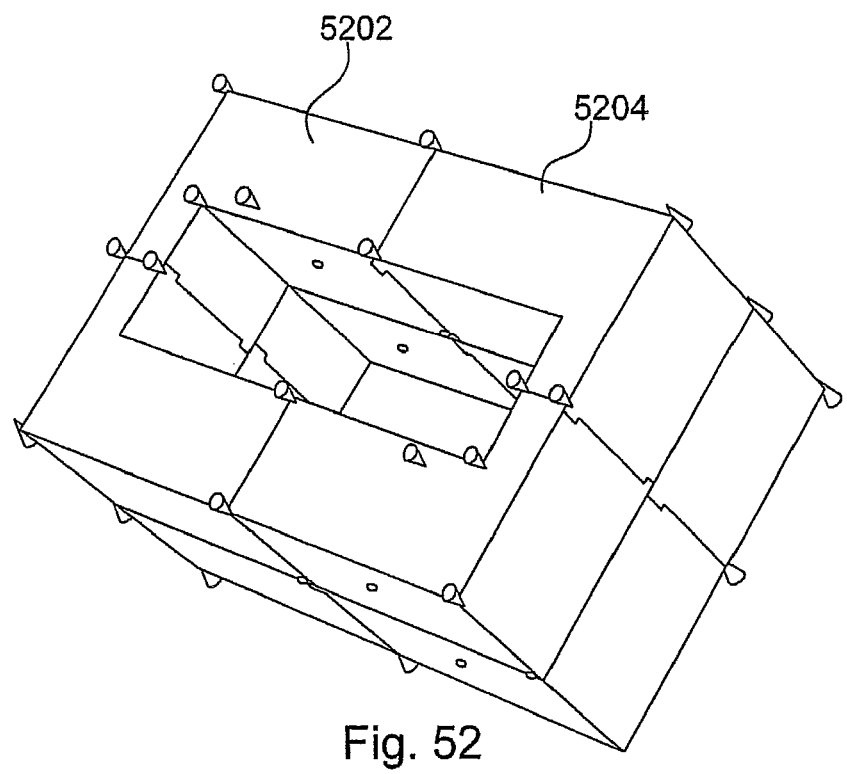
FIG. 52 depicts a model for permanent magnet orientation.

Referring to FIG. 52, a model for permanent magnet orientation is depicted. The model's concept is two permanent magnet arrays 5202, 5204, such as Halbach type, in attraction mode. In this model, the magnetization direction is given by the arrows. A ferromagnetic cup (not shown) is holding the permanent magnets on the attraction device side. The permanent magnets on the plug side are backed by a ferromagnetic plate (back plug, not shown). For model checking, the 3D model force data may be checked against an analytical estimation.

Referring to FIGS. 53 to 63, the scope of the electromagnetic (EM) analysis may be to assess the force and torque of the system for various magnetic retention concepts. For example, for the system shown in FIG. 53, the materials and force data table 5402 are given in FIG. 54, where the force modeled is 50 N. Note that a 0.5 mm trade of the permanent magnet height between the plug (+0.5 mm) and attraction device (−5 mm) may result in a loss of 0.4 Newtons while a −0.5 mm trade of the permanent magnet height between the plug (−0.5 mm) and attraction device (+0.5 mm) may result in a gain of 2.5 Newtons.

Figure 55:
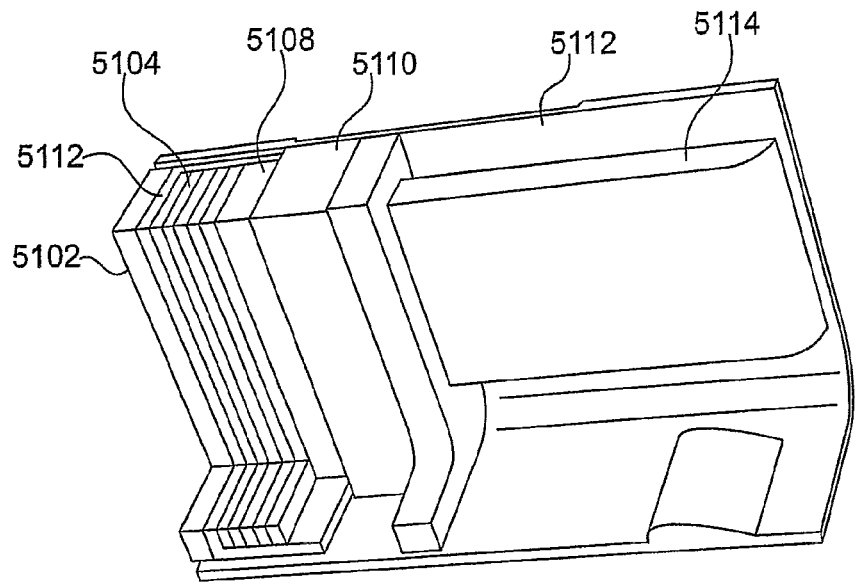
FIG. 55 depicts a model for EM analysis.
Figure 57:
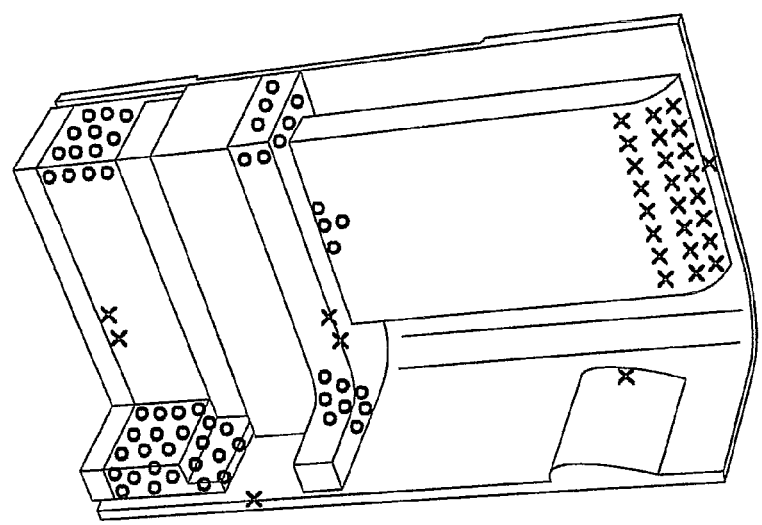
FIG. 57 depicts surface contour data for the model of FIG. 55.
Figure 56:
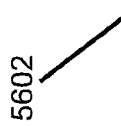
FIG. 56 depicts the materials and force data for the model of FIG. 55.
Figure 58:
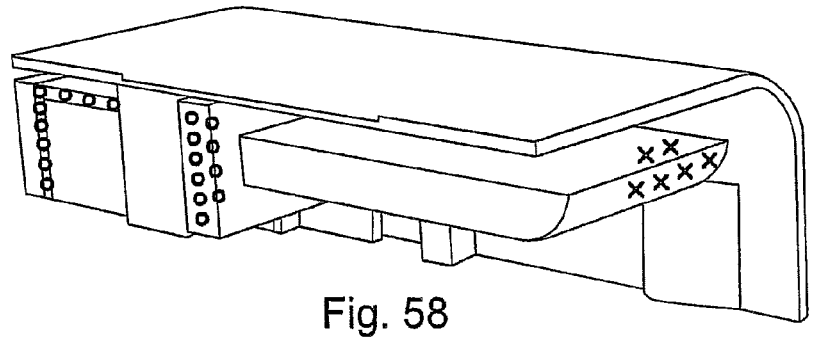
FIG. 58 depicts surface contour data for the model of FIG. 55.

Referring to FIG. 55, attraction force may be slightly optimized by increasing the ferromagnetic material of the attraction device while reducing the permanent magnet volume by the same amount, as shown in the figure. An optimal permanent magnet thickness may be 1 mm. In FIG. 55, the model adds a back plat 5104 comprising 1010 steel to the model in FIG. 53. The materials and force data are given in the table 5602 of FIG. 56, where the force modeled is 53 N. Surface contour data for this model are shown in FIGS. 57 and 58. In these figures and those that follow, the 'x' designations indicate the extreme blue color on a surface contour chart and the 'o' designations indicate the extreme red color on a surface contour chart.

Figure 53:
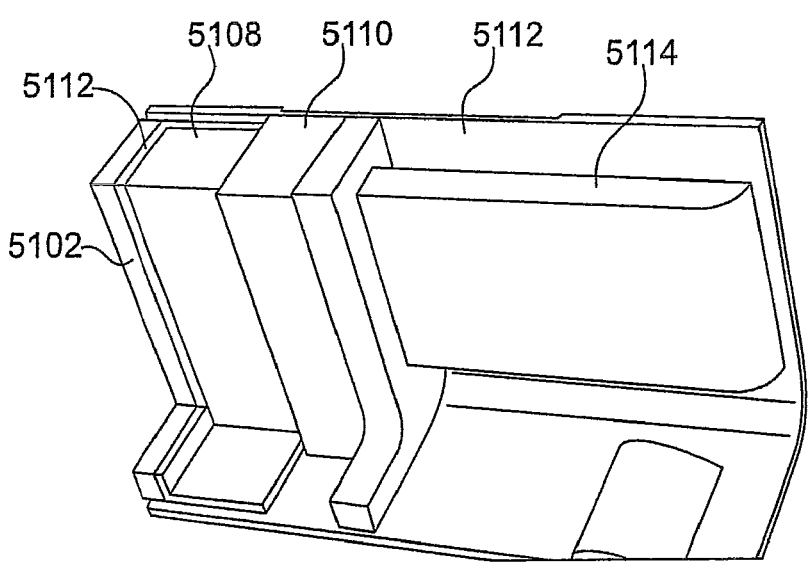
FIG. 53 depicts a model for EM analysis.
Figure 54:
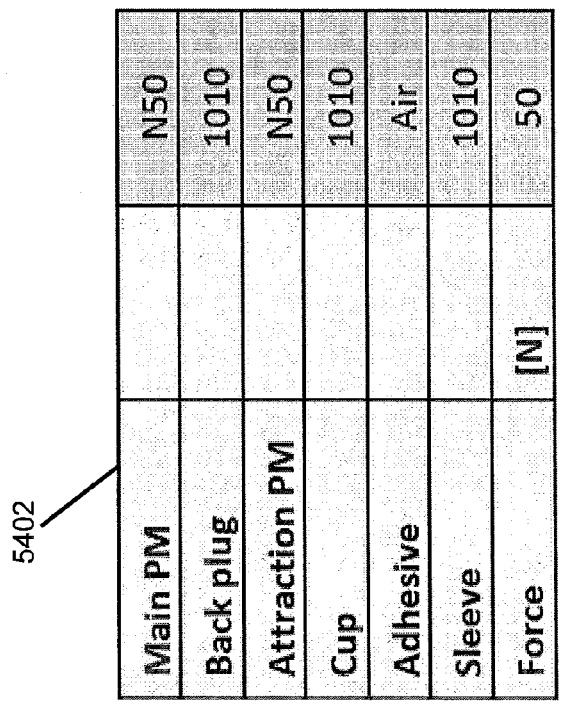
FIG. 54 depicts the materials and force data for the model of FIG. 53.
Figure 60:
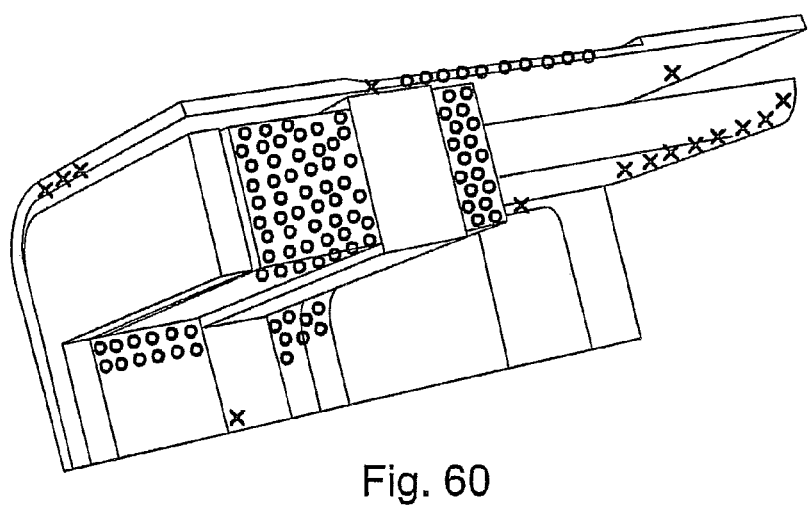
FIG. 60 depicts surface contour data for the model of FIG. 59.
Figure 59:
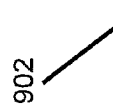
FIG. 59 depicts the materials and force data for a non-ferromagnetic sleeve model.

Referring to FIG. 59, when the sleeve is non-ferromagnetic, the force drops down to 42.5 Newtons as shown in the table 5902. The difference between this model and the one depicted in FIG. 53 is the absence of the ferromagnetic sleeve. Surface contour data are depicted in FIG. 60.

Figure 61:
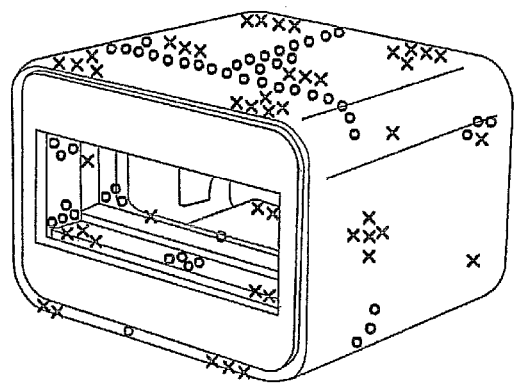
FIG. 61 depicts the materials and force data for a model where the attraction plate comprises 1010 steel.
Figure 62:
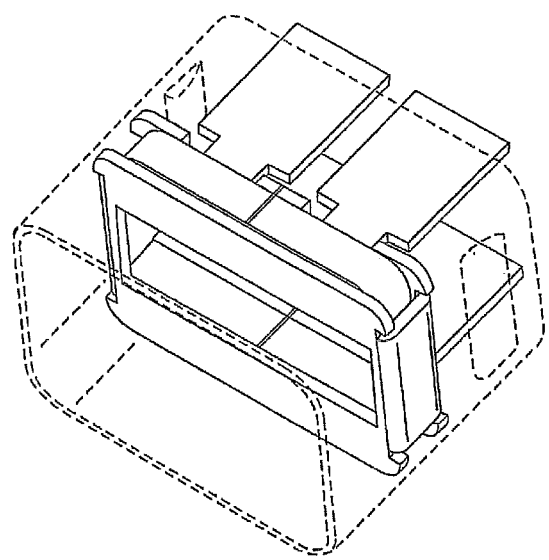
FIG. 62 depicts a full view of the connector modeled in FIG. 61.
Figure 63:
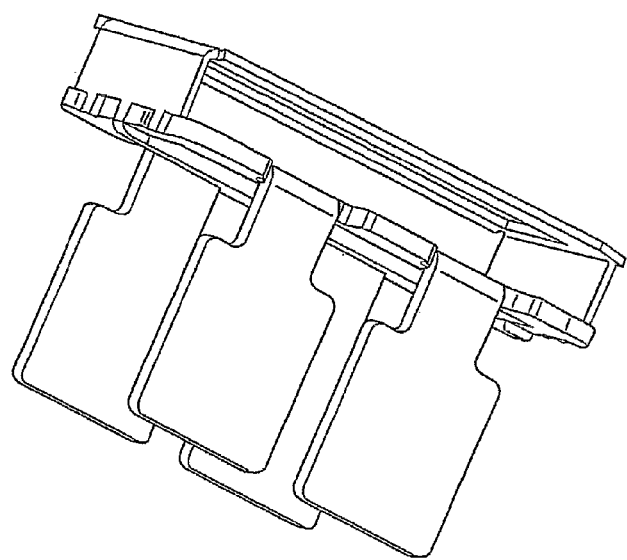
FIG. 63 depicts the connector of FIG. 61 with the sleeve cutaway for clarity.
Figure 64:
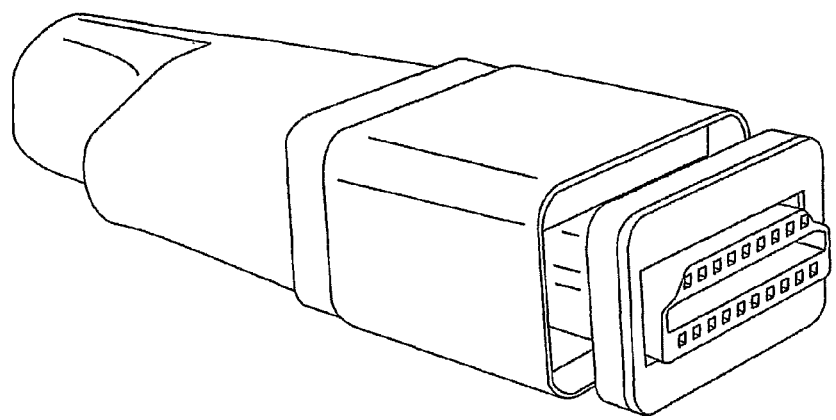
FIG. 64 depicts an HDMI cable embodiment of the connector.

Referring to FIG. 61, the difference between this model and the one depicted in FIG. 53 is that the attraction plate comprises 1010 steel as opposed to N50. In this model, the force increases to 52 Newtons as shown in the table 6102. FIG. 62 depicts a full view of the connector and FIG. 63 depicts the same connector with the sleeve cutaway for clarity. FIG. 64 depicts an HDMI cable embodiment of the connector.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A system, comprising:
a cable including a data transmission wire wherein the cable has a device connector end;
a device connector mechanically attached to the device connector end, the device connector having at least one pin electrically associated with the data transmission wire;
the device connector having a slidable housing, wherein the slidable housing slides to increase and decrease an exposure of a data pin of the device connector; and
a magnetic element having a shape suitable for mating with a device side of the device connector, wherein a first side of the magnetic element is magnetically connected to a portion of the device connector and a second side is positioned to magnetically connect to a device, wherein the magnetic element is separable from the device connector.

2. The system of claim 1, wherein the system comprises a High Definition Multimedia Interface cable.

3. The system of claim 1, wherein the device connector is a HDMI connector.

4. The system of claim 1, wherein the device connector includes an integrated circuit.

5. The system of claim 1, wherein the magnetic element is attached to a non-sliding portion of the housing.

6. The system of claim 1, wherein the slidable housing slides to increase and decrease an exposure of the magnetic element.

7. The system of claim 1, wherein the device connector includes a processor.

8. The system of claim 7, wherein the processor performs signal equalization.

9. The system of claim 1, wherein a processor provides status information.

10. The system of claim 9, wherein the status information is provided by a display.

11. The system of claim 10, wherein the display includes at least a LED.

12. A device connector, comprising:
a pin of a device connector, the pin including an end for engaging a device port, wherein the pin includes a receptacle end for forming an electrical connection with a data transmission wire of a cable that includes a device connector end for mechanically attaching to a cable exit end of the device connector;
a slidable portion of the device connector for sliding relative to the pin along the axis of the pin; and
a magnetic element associated with the slidable portion of the device connector for magnetically connecting the slidable portion of the device connector to the device.

13. The device connector of claim 12, wherein the magnetic element comprises multiple attached magnets.

14. The device connector of claim 13, wherein the multiple magnets can move relative to each other while maintaining physical and magnetic connection therebetween.

15. The device connector of claim 14, wherein the multiple magnets move in response to a torque applied to the device connector.

16. A system, comprising:
a cable including a data transmission wire and a power wire wherein the cable has a device connector end;
a device connector mechanically attached to the device connector end, the device connector having at least one pin electrically associated with the data transmission wire and at least one pin electrically associated with the power wire;
the device connector having a slidable housing for enhanced connection quality, wherein the slidable housing slides to increase and decrease an exposure of a data pin of the device connector; and
an electromagnet attached to the device connector and disposed to magnetically couple to at least one of a device and a device port, wherein the electromagnet is powered by an electrical signal passed from the device port to the at least one pin electrically associated with the power wire.

17. The system of claim 16, wherein the electromagnet is attached to a non sliding portion of the housing.

18. The system of claim 16, wherein the slidable housing slides to increase and decrease an exposure of the electromagnet.

* * * * *

UNITED STATES PATENT AND TRADEMARK OFFICE
CERTIFICATE OF CORRECTION

PATENT NO. : 8,342,857 B2  
APPLICATION NO. : 12/963802  
DATED : January 1, 2013  
INVENTOR(S) : Craig Palli et al.

Page 1 of 1

It is certified that error appears in the above-identified patent and that said Letters Patent is hereby corrected as shown below:

Cover of the Patent, Column 1, Item (76) Inventors, Line 2, delete "Reno, NV" and insert -- San Francisco, CA --

Signed and Sealed this
Fifth Day of March, 2013

Teresa Stanek Rea
*Acting Director of the United States Patent and Trademark Office*